United States Patent
Yamazaki et al.

(10) Patent No.: US 7,054,088 B2
(45) Date of Patent: May 30, 2006

(54) INFORMATION RECORDING AND REPRODUCING APPARATUS AND METHOD, AND SIGNAL DECODING CIRCUIT FOR PERFORMING TIMING RECOVERY

(75) Inventors: Akihiro Yamazaki, Kawasaki (JP); Takao Sugawara, Kawasaki (JP); Motomu Takatsu, Kawasaki (JP); Masaru Sawada, Kawassaki (JP)

(73) Assignee: Fujitsu Limited, Kawasaki (JP)

( * ) Notice: Subject to any disclaimer, the term of this patent is extended or adjusted under 35 U.S.C. 154(b) by 66 days.

(21) Appl. No.: 10/273,485

(22) Filed: Oct. 18, 2002

(65) Prior Publication Data

US 2003/0137765 A1 Jul. 24, 2003

(30) Foreign Application Priority Data

Jan. 21, 2002 (JP) .............................. 2002-011018
Mar. 29, 2002 (JP) .............................. 2002-095505

(51) Int. Cl.
*G11B 5/35* (2006.01)
(52) U.S. Cl. .......................................... 360/65; 360/39
(58) Field of Classification Search ................. 360/51, 360/53, 48, 26, 46
See application file for complete search history.

(56) References Cited

U.S. PATENT DOCUMENTS

| | | | | |
|---|---|---|---|---|
| 5,572,558 A | * | 11/1996 | Behrens | 375/376 |
| 5,754,352 A | * | 5/1998 | Behrens et al. | 360/51 |
| 5,917,668 A | * | 6/1999 | Behrens et al. | 360/51 |
| 6,285,219 B1 | * | 9/2001 | Pauls | 327/3 |
| 6,542,039 B1 | * | 4/2003 | Ogura | 331/11 |

* cited by examiner

*Primary Examiner*—David Hudspeth
*Assistant Examiner*—Varsha A. Kapadia
(74) *Attorney, Agent, or Firm*—Greer, Burns & Crain, Ltd.

(57) ABSTRACT

A timing recovery unit detects a phase offset and a frequency offset from a head area of reproduction data and initially corrects them. The timing recovery unit stores data in which a head reproduction signal has been made to be discrete by a fixed clock into a buffer. A phase offset detector detects the phase offset from the data head area in parallel with the operation for writing the data into the buffer. At the same time, a frequency offset detector detects the frequency offset from the data head area in parallel with the operation for writing the data into the buffer. A correction value of the detected phase offset and a correction value of the detected frequency offset are initially set into a digital PLL. While the data is read out from the buffer, a frequency lead-in and a phase lead-in are executed in the head area.

14 Claims, 47 Drawing Sheets

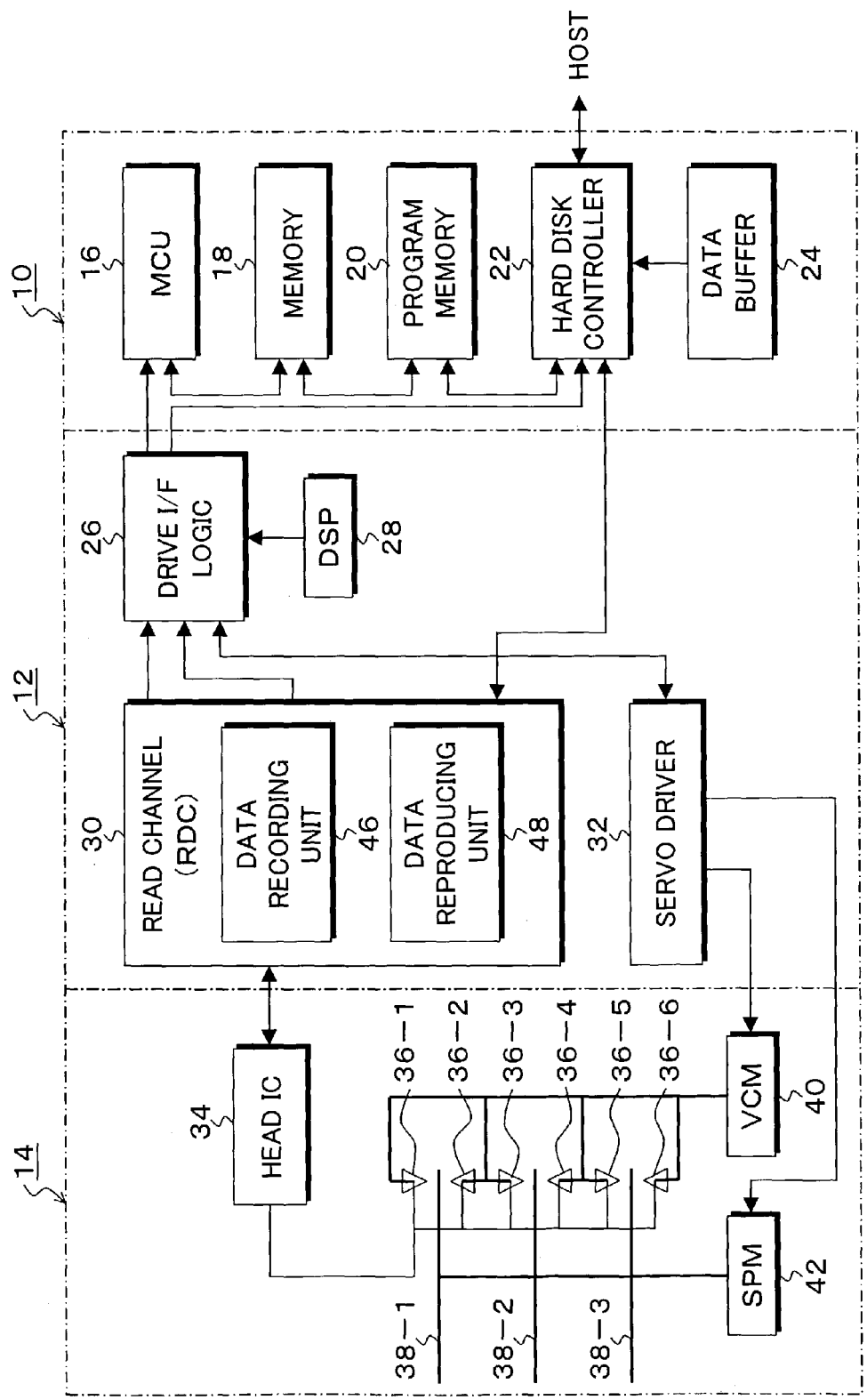

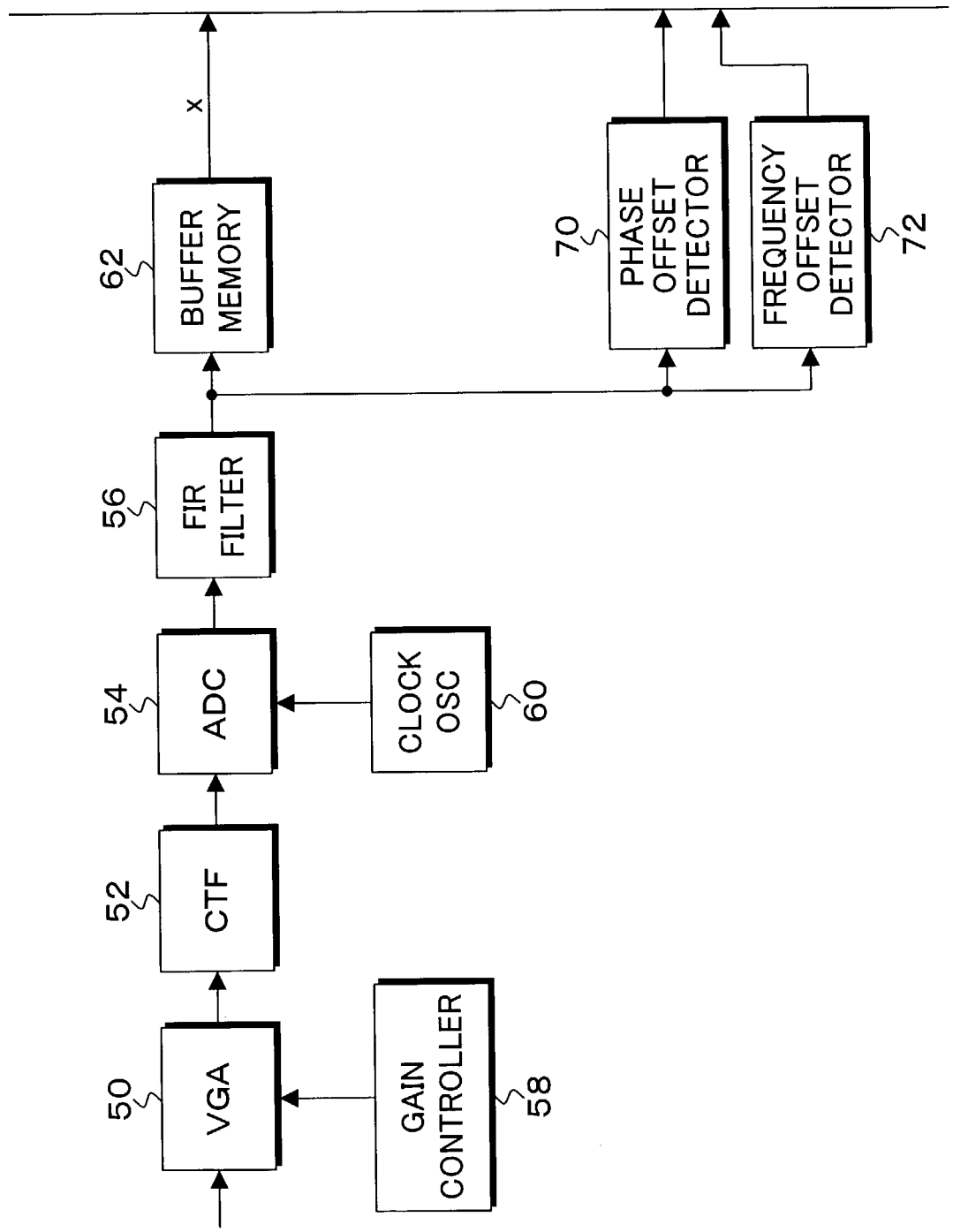

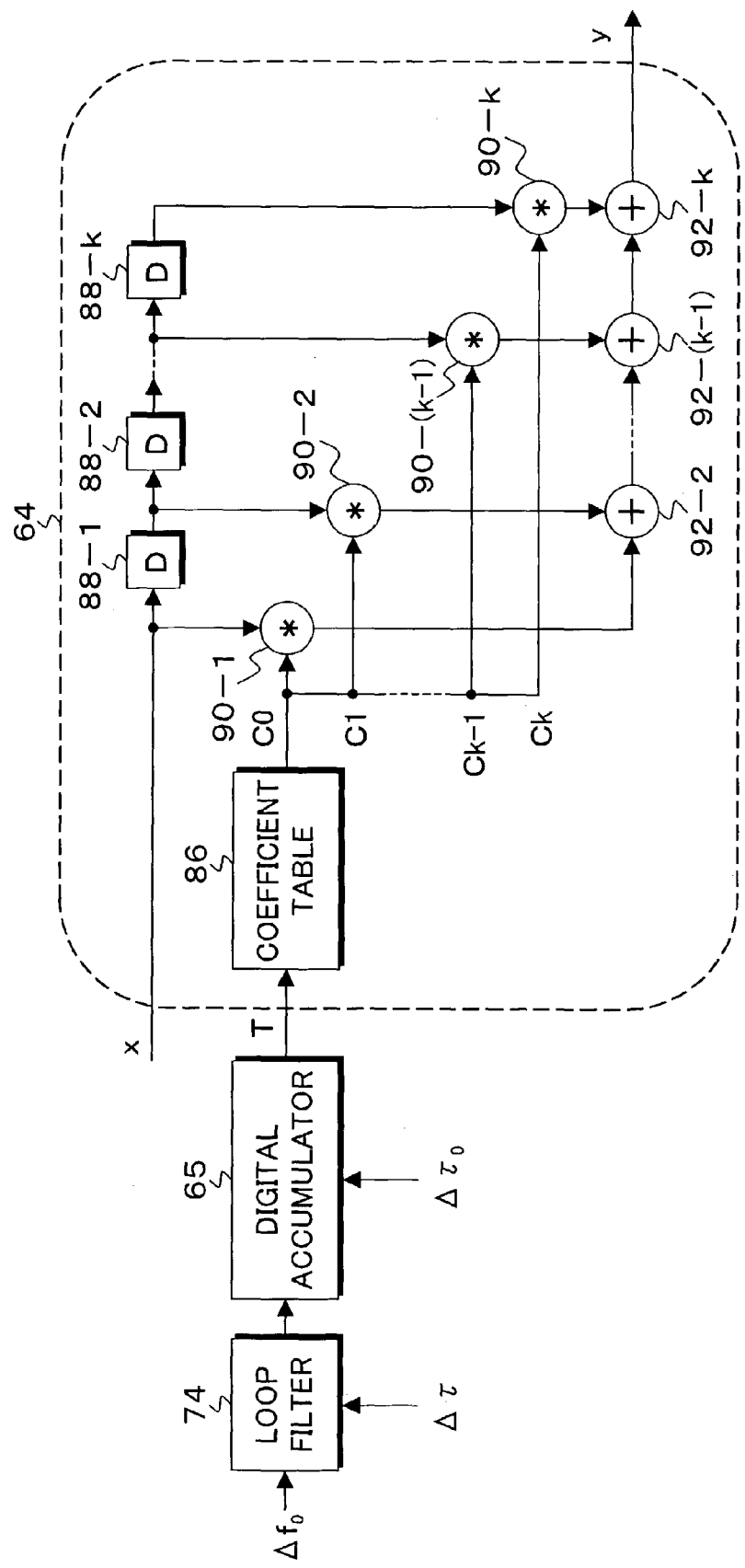

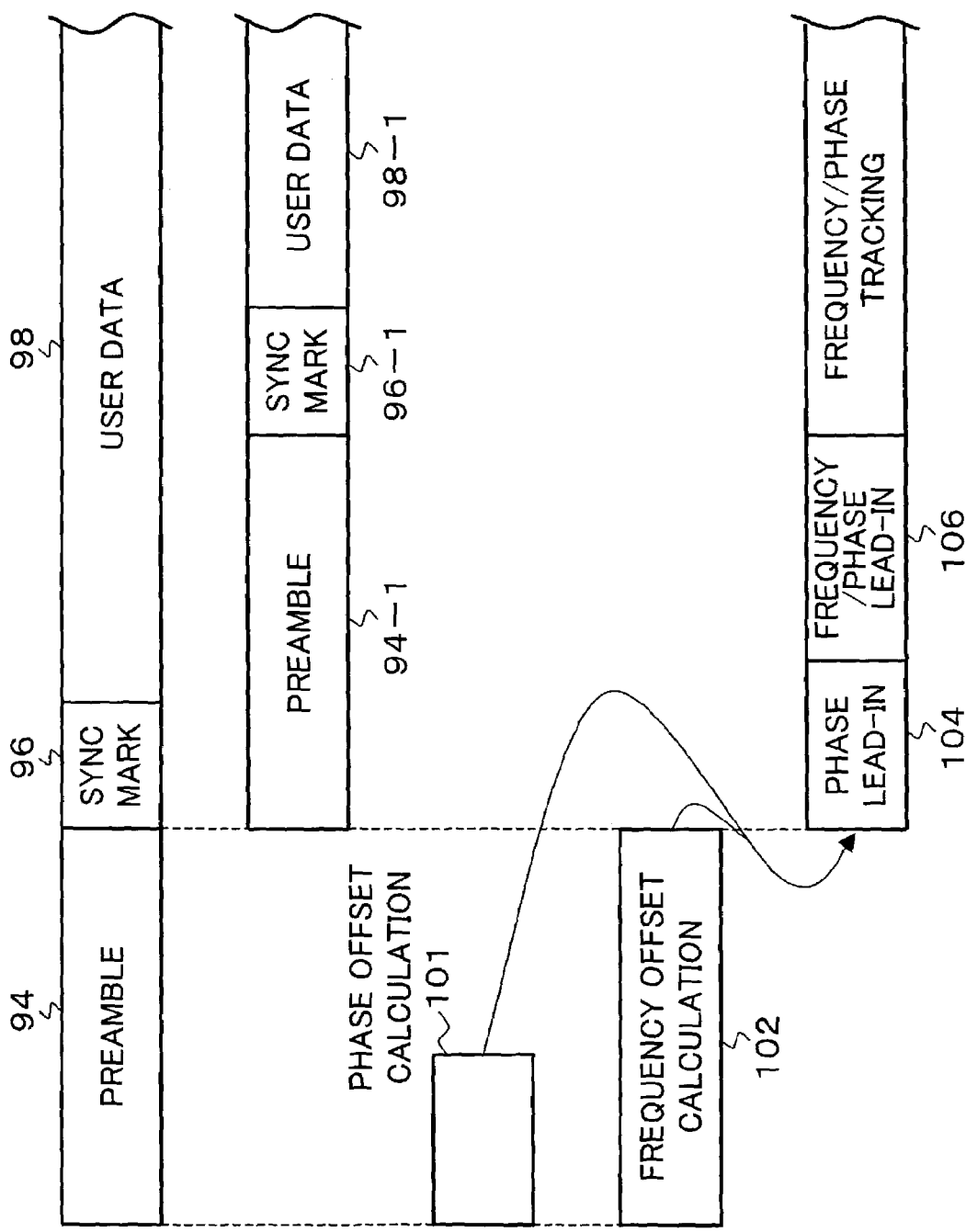

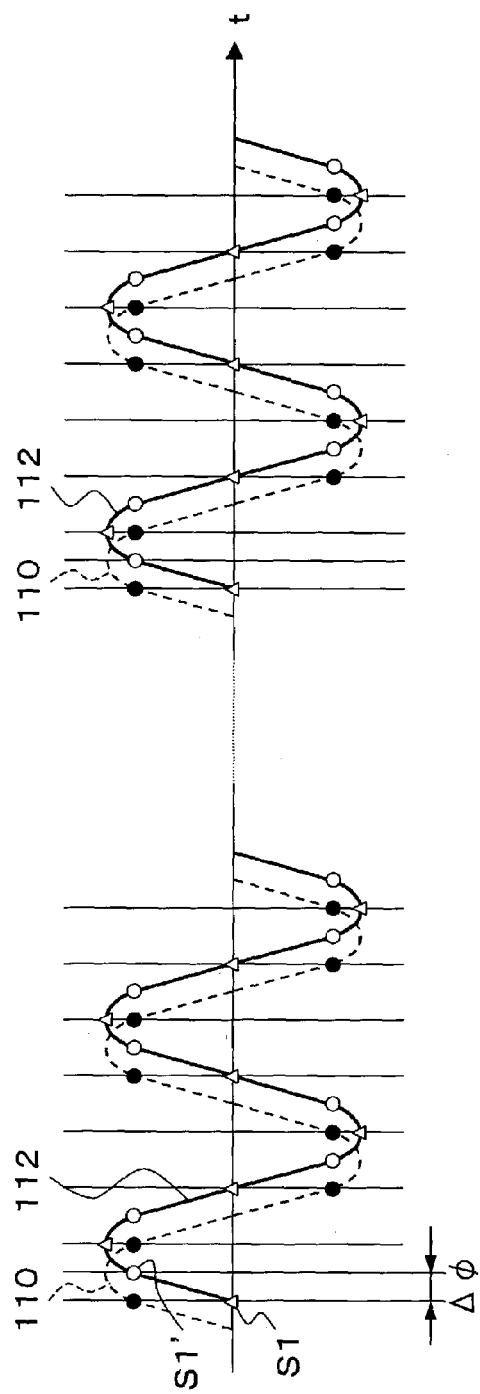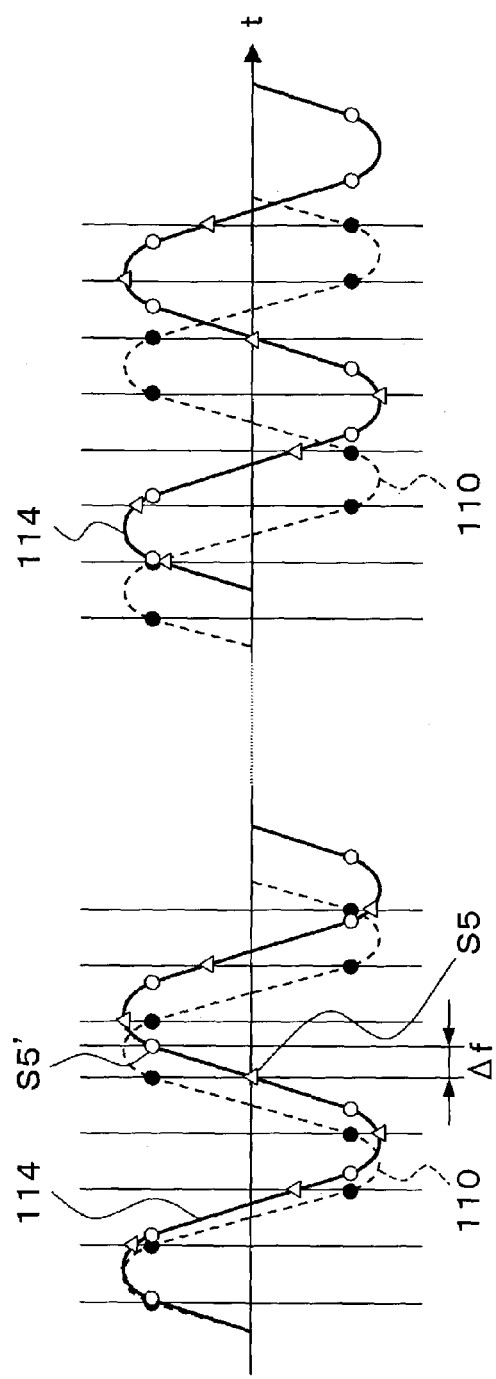
FIG. 9A
FIG. 9B

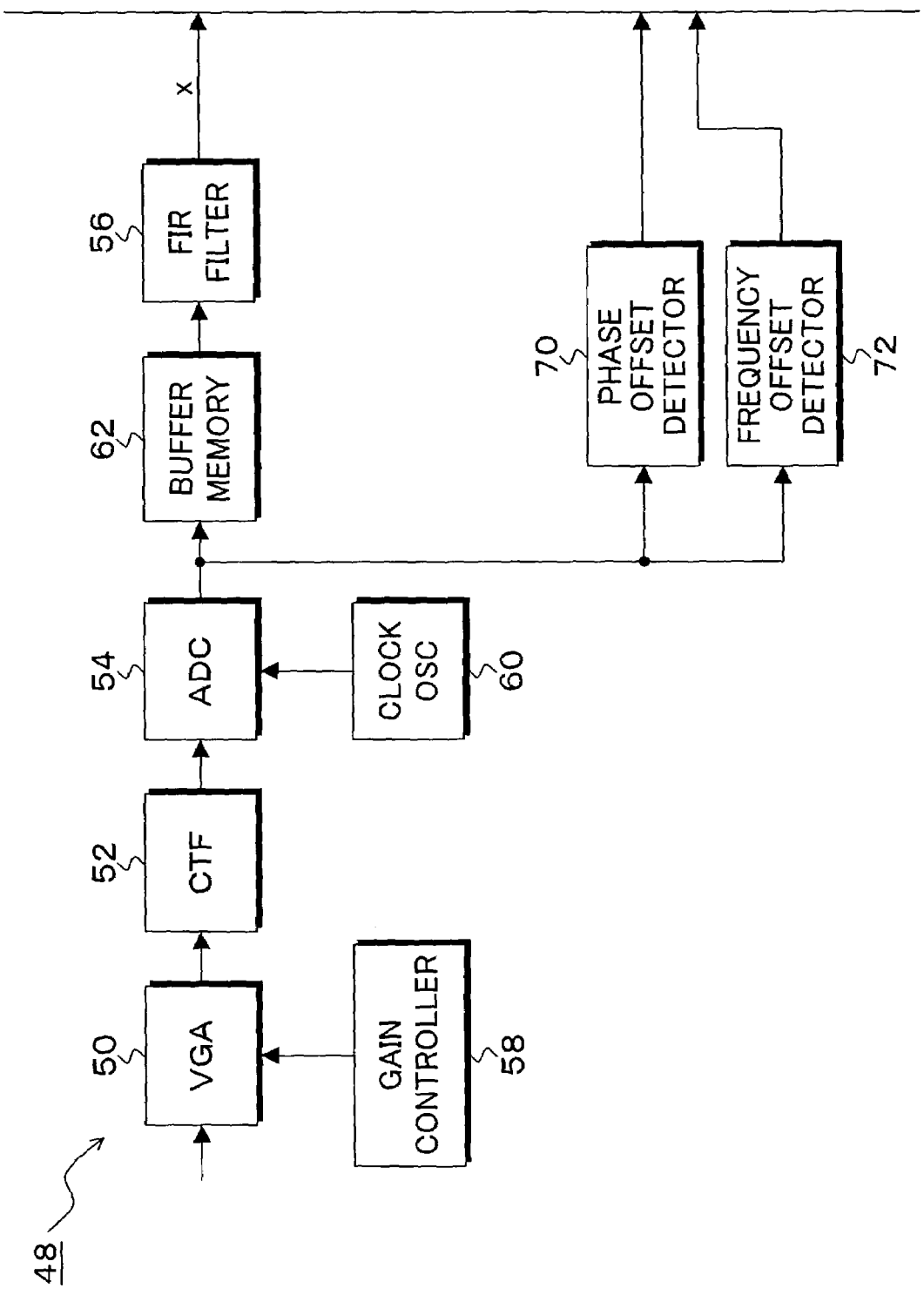

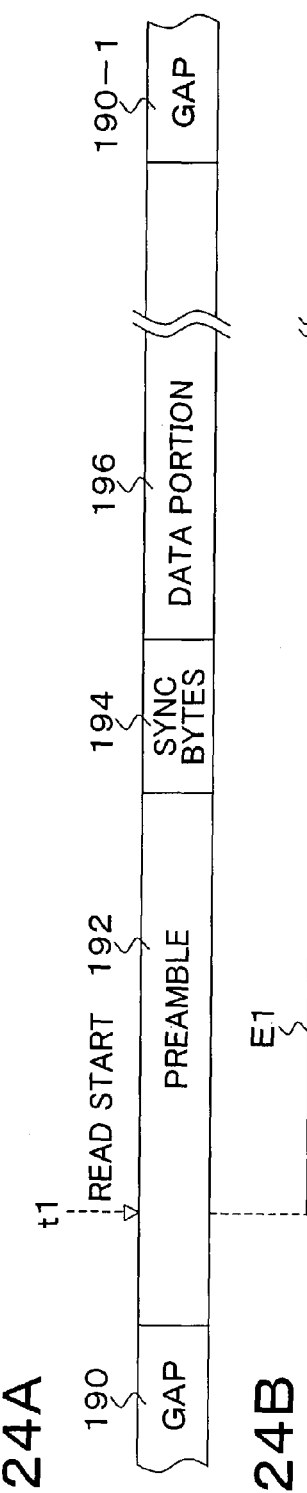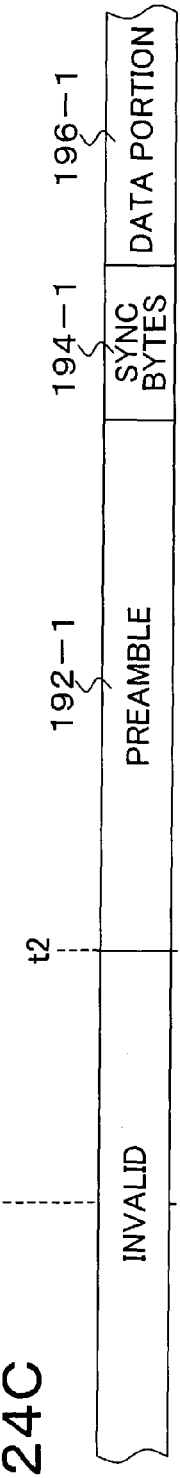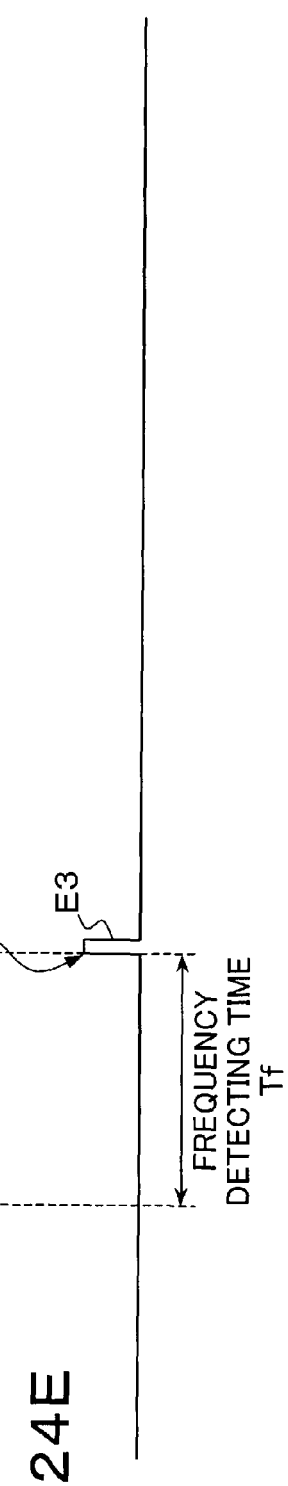

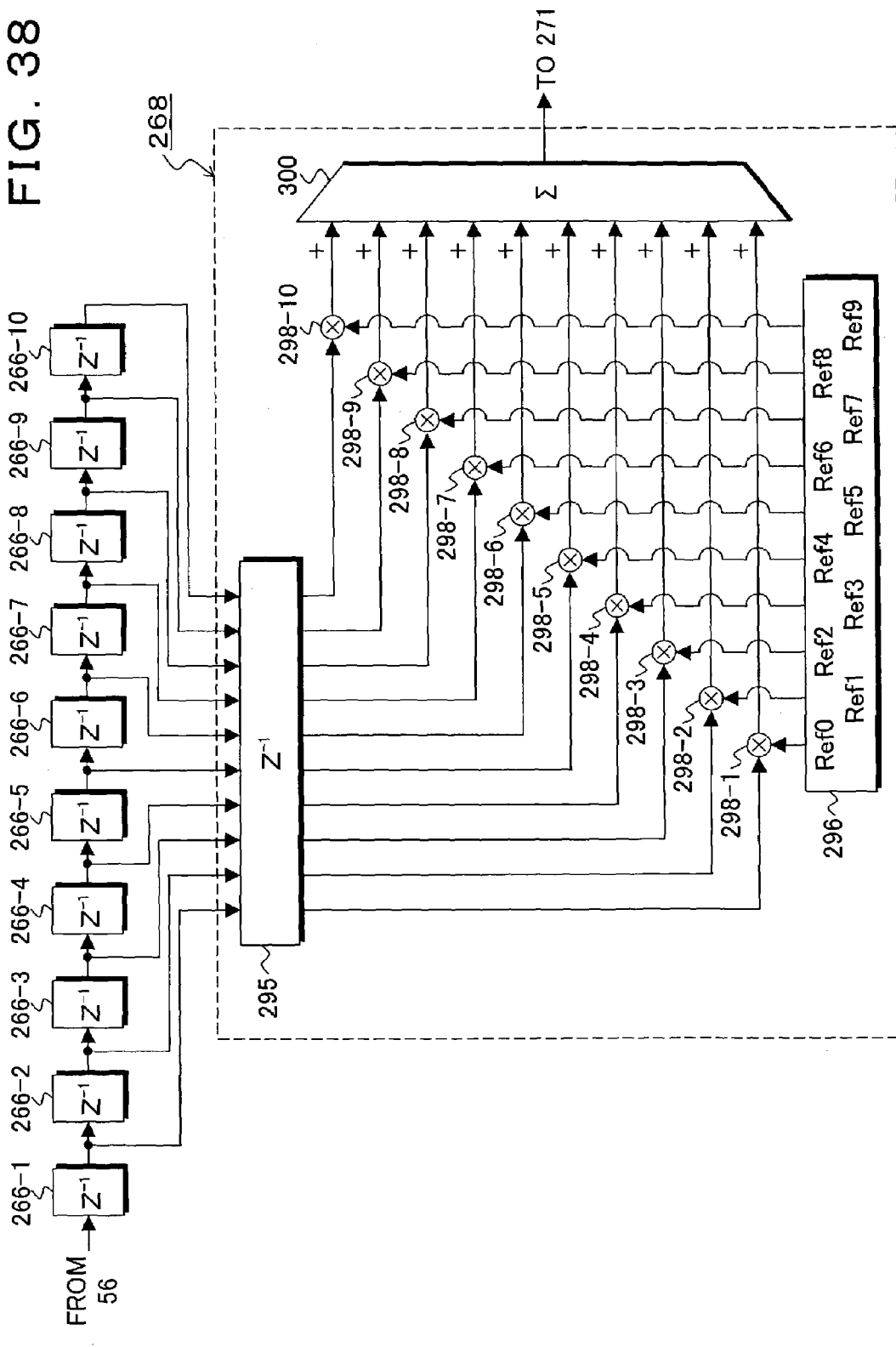

INFORMATION RECORDING AND REPRODUCING APPARATUS AND METHOD, AND SIGNAL DECODING CIRCUIT FOR PERFORMING TIMING RECOVERY

BACKGROUND OF THE INVENTION

1. Field of the Invention

The invention relates to an information recording and reproducing apparatus of a magnetic disk, an MO, an optical disk, a magnetic tape, or the like, an information recording and reproducing method, and a signal decoding circuit. More particularly, the invention relates to information recording and reproducing apparatus and method and a signal decoding circuit, for performing a timing recovery after a head reproduction signal is made discrete by an asynchronous clock.

2. Description of the Related Arts

In a conventional timing reproduction loop for a timing recovery of a read channel LSI, a sampling clock in an A/D converter and a symbol rate clock for making discrimination are the same. To obtain optimum discrimination timing, therefore, it is necessary for directly controlling a phase of the sampling clock of the A/D converter. Aside from it, there is also a method whereby the sampling clock of the A/D converter is fixed and the optimum discrimination timing is obtained by a signal interpolation for realizing a digital PLL. According to the signal interpolating method, in order to cope with a change in symbol rate due to a frequency offset, it is necessary to perform a sampling at a frequency higher than the symbol rate. Symbol discrimination is made after a sampling signal is equalized and subsequently the signal is converted into a sampling signal of the symbol rate by the signal interpolation. According to the discriminating method, in both of the above cases, a level of a read waveform equalized to a target of PR (Partial Response) is discriminated by a soft decision according to Viterbi or a hard decision according to a comparison with a reference.

FIG. 1 is a block diagram of a data reproducing unit having a timing recovery unit which is used in a conventional magnetic recording and reproducing apparatus. An analog voltage generated from a reproducing head is amplified by a preamplifier of a head IC and, thereafter, converted into a digital signal via a variable gain amplifier (VGA) 1200, a CT filter 1202 functioning as a low pass filter, and an A/D converter (ADC) 1204. Subsequently, waveform equalization is executed by an FIR filter 1206 and, thereafter, a decoding is performed by a Viterbi decoder 1208. The decoded data is further decoded by an RLL decoder 1210. In a timing recovery unit 1211, a PLL for controlling timing of a clock for sampling a head reproduction signal by the A/D converter 1204 is constructed by an error detector 1216, a loop filter 1218, and a voltage controlled oscillator (VCO) 1220. A gain controller 1212 is provided for the VGA 1200. The gain controller 1212 controls a gain and corrects an amplitude. That is, the timing recovery unit 1211 obtains a phase offset AT by using an output signal y of the FIR filter 1206 and a discrimination value y^ from the Viterbi decoder 1208 and controls an oscillating frequency of the VCO 1220 so as to eliminate the phase error $\Delta\tau$. Thus, a feedback loop in which a sampling position of the A/D converter 1204 is controlled is formed. A gain error AG is obtained by using the output signal y of the FIR filter 1206 and its discrimination value y^. A control voltage Vg of the gain controller 1212 is adjusted so as to eliminate the gain error $\Delta G$, thereby correcting the amplitude by the VGA 1200. Further, a phase offset detector 1214 is provided for the timing recovery unit 1211. In a head portion of a preamble 1223 for phase lead-in of reproduction data serving as an ADC output in FIG. 2A, the phase offset detector 1214 detects an initial phase error (phase offset) $\Delta\tau_0$ by a phase offset calculation 1226 in FIG. 2B, presets the initial phase error $\Delta\tau_0$ into the loop filter 1218, and executes a phase lead-in 1228 in FIG. 2C. According to the phase lead-in by the detection of the initial phase error, what is called a zero phase start is performed, thereby shortening a lead-in time in a subsequent frequency/phase lead-in 1230 using the preamble 1223.

FIG. 3 shows another example of a conventional data reproducing unit, and a timing recovery is performed by a phase loop of a digital PLL. In this case, a sampling is executed to the A/D converter 1204 asynchronously with a reproduction signal by using a fixed clock which is generated from a clock oscillator 1221. Subsequently to the FIR filter 1206, an FIR interpolating filter 1240 is provided. The FIR interpolating filter 1240 operates as a digital VCO by a combination with a digital accumulator 1222. The phase error $\Delta\tau$ obtained by the error detector 1216 of the timing recovery unit 1211 is integrated by the loop filter 1218 and further integrated by the digital accumulator 1222, and tap coefficients of the FIR interpolating filter 1240 are adjusted in accordance with the phase error $\Delta\tau$, thereby matching the sampling rate by the fixed clock with the timing of the inherent symbol rate.

The phase offset detector 1214 is provided for the timing recovery unit 1211. The initial phase error (phase offset) $\Delta\tau_0$ of the phase is detected in the head portion of the preamble and preset into the digital accumulator 1222, thereby performing the phase lead-in of the zero phase start.

As mentioned above, in the conventional timing recovery unit, the initial phase error is detected in the head portion of the preamble and compensated, and the frequency lead-in is performed in the residual preamble. Compensation for the initial phase error of read-out data can be made. However, no consideration is given to a frequency offset, and it is difficult to obtain a wide frequency lead-in range. According to the conventional timing recovery unit, the lead-in is performed by a feedback control of the loop from a state where it has the frequency offset (initial frequency error). Therefore, in order to widen the frequency lead-in range further, a preamble which is long to a certain extent is necessary. There is a problem such that format efficiency of the magnetic recording and reproducing apparatus deteriorates.

SUMMARY OF THE INVENTION

According to the invention, there are provided information recording and reproducing apparatus and method and a signal decoding circuit, in which a length of preamble is shortened, a frequency lead-in range is widened, a high density recording can be performed, and reliability can be raised.

Information Recording and Reproducing Apparatus-1

According to the invention, there is provided an information recording and reproducing apparatus for recording and reproducing information onto/from a magnetic recording medium, characterized by comprising a timing recovery unit 100 which detects a phase offset and a frequency offset from a head area of reproduction data and initially corrects them. The phase offset, which will be explained hereinbelow, denotes an initial phase error which is caused when the operation of the timing recovery unit (timing reproduction loop) is started. The frequency offset denotes likewise an initial frequency error which is caused when the operation of the timing recovery unit (timing reproduction loop) is started.

The timing recovery unit comprises: a buffer which stores data obtained by sampling a head reproduction signal by a fixed clock; a phase offset detector which detects a phase offset from a data head area in parallel with data writing into the buffer; a frequency offset detector which detects a frequency offset from the data head area in parallel with the data writing into the buffer; and a PLL which initially sets correcting states of the detected phase offset and frequency offset and, thereafter, performs a phase lead-in and a frequency lead-in in the head area while the data is read out from the buffer. According to the invention, therefore, as for the compensation by the error detection in the head portion of a preamble area, by detecting and compensating errors with respect to not only the phase but also the frequency, the phase lead-in and the frequency lead-in are performed in a short time, the preamble area can be shortened, and a frequency lead-in range can be widened.

The reproduction data is sector data constructed by a preamble, a sync mark, and user data. The timing recovery unit detects a phase error and a frequency error from the preamble and initially corrects them. The buffer starts the reading operation from a head of the write data at a point when the writing of the reproduction data into the head area is finished. In the invention, although a time lag corresponding to a time that is necessary for temporarily storing the data into the buffer is caused, the buffer time lag can be substantially ignored by considering that the preamble area can be shortened. According to another embodiment of the invention, only the frequency offset can be detected and compensated. That is, there is provided an information recording and reproducing apparatus for recording and reproducing information onto/from a magnetic recording medium, characterized by comprising a timing recovery unit which detects a frequency error from a head area of reproduction data and initially corrects it.

Signal Decoding Circuit-1

The invention provides a signal decoding circuit which records and reproduces information onto/from a magnetic recording medium. The signal decoding circuit is characterized by comprising a timing recovery unit which detects a phase error and a frequency error from a head area of reproduction data and initially corrects them. Details of the signal decoding circuit are fundamentally the same as those of the information recording and reproducing apparatus.

Information Recording and Reproducing Method-1

The invention provides an information recording and reproducing method of recording and reproducing information onto/from a magnetic recording medium. The information recording and reproducing method is characterized in that a phase error and a frequency offset are detected from a head area of reproduction data and the reproduction data is initially corrected so as to eliminate the detected phase error and frequency error. In detail, the information recording and reproducing method is characterized in that:

data obtained by making a head reproduction signal discrete by a fixed clock is written into a buffer;

a phase error is detected from the data head area in parallel with the data writing into the buffer;

a frequency offset is detected from the data head area in parallel with the data writing into the buffer; and correcting states of the detected phase error and frequency error are initially set and, thereafter, a phase lead-in and a frequency lead-in are performed in the head area while the data is read out from the buffer.

The reproduction data is sector data constructed by a preamble, sync mark, and user data. A phase error and a frequency error are detected from the preamble and initially corrected. The buffer starts the reading operation from a head of the write data at a point when the writing of the reproduction data into the head area is finished. According to another embodiment of the invention, only a frequency offset can be also detected and compensated. That is, there is provided an information recording and reproducing method of recording and reproducing information onto/from a magnetic recording medium, characterized in that a frequency error is detected from a head area of reproduction data and the reproduction data is initially corrected so as to eliminate the detected frequency error. According to details of this method:

data obtained by making a head reproduction signal discrete by a fixed clock is written into a buffer;

a frequency error is detected from the data head area in parallel with the data writing into the buffer; and a correcting state of the detected frequency error is initially set and, thereafter, a phase lead-in and a frequency lead-in are performed in the head area while the data is read out from the buffer.

Information Recording and Reproducing Apparatus-2

According to the invention, in a timing recovery unit (timing reproduction loop constructed by a digital PLL) which reproduces optimum discrimination timing at the time when digital data is decoded from an analog waveform read out by a head, a phase error from the optimum timing is detected from a sampled signal and corrected. Particularly, a minimum unit in which data is read out/written from/onto a hard disk is called a sector, and the data is recorded subsequently to the preamble and sync bytes. In the preamble, a periodic data pattern is written and a read waveform read out from the head becomes a sine wave. Synchronization of the timing reproduction loop is established while such a periodic waveform is read out. A specific pattern has been written in the sync bytes. A read channel LSI recognizes a head position of the data by the sync bytes and establishes the synchronization on a byte unit basis of the data. In order to obtain the stable operation of the stable timing reproduction loop even in case of a read signal of a low S/N ratio, it is necessary to reduce a steady-state phase error in the preamble.

For this purpose, according to the invention, there is provided an information recording and reproducing apparatus for recording and reproducing information onto/from a magnetic recording medium, characterized by comprising: a timing recovery unit (timing reproduction loop) having an interpolating filter which interpolates a signal oversampled by a fixed clock and down-samples it to a symbol rate; and a phase offset detector which handles a read waveform, as a periodic waveform, in a preamble interval in a sector, detects a phase error between a signal point and a sampling point from a correlation between a periodic reference signal and a sampling signal, corrects the timing recovery unit by the detected phase error, and allows a loop operation to be started. The phase offset detector obtains the correlation by addition-averaging a product of a sine signal or a cosine signal serving as a reference and the sampling signal in an interval which is integer times as long as a period of the reference sine signal. According to the detection of the initial phase error (phase offset) of the invention as mentioned above, by obtaining the correlation by the addition average of a plurality of samples, when the phase error is detected, an influence by noises can be suppressed. Since a level comparison by the signal discrimination is unnecessary, a change in phase error due to the erroneous discrimination hardly is caused.

The timing recovery unit constructing the timing reproduction loop comprises: an error detector which detects a phase error between the sampling signal of the symbol rate outputted from the interpolating filter and a symbol discrimination signal from a discriminator; a loop filter which integrates the phase error from the error detector; and an accumulator which integrates an output of the loop filter and controls coefficients of the interpolating filter so as to eliminate the phase error, wherein the accumulator is initialized by the phase error detected by the phase offset detector, thereby allowing the zero phase start to be executed. Since the initial phase error is calculated by the signal of the same timing as that of the interpolating filter as mentioned above, the accurate initial phase error can be fed back and the lead-in of the loop becomes early.

According to the invention, there is provided an information recording and reproducing apparatus for recording and reproducing information onto/from a magnetic recording medium, characterized by comprising: a timing recovery unit having an interpolating filter which interpolates a signal oversampled by a fixed clock and down-samples it to a symbol rate; and a phase offset detector which handles a read waveform, as a periodic waveform, in a preamble interval in a sector, detects a phase error between a signal point and a sampling point from a correlation between a reference signal of the periodic waveform and a sampling signal oversampled for the symbol rate, corrects the detected phase error, corrects the timing recovery unit by the corrected phase error, and allows an operation to be started. According to the invention as mentioned above, since the phase correction by the oversampling is added, the error upon discrimination at the symbol rate can be minimized. Naturally, by feeding back the accurate initial phase error, the lead-in of the loop becomes early.

Now, assuming that the reference signal is a sine signal, the phase offset detector shifts a phase of the sine signal to the phase error detected from the correlation between the sine signal and the oversampled sampling signal, thereby correcting it. Assuming that the reference signal is a cosine signal, the phase offset detector can also shift a phase of the cosine signal to the phase error detected from the correlation between the cosine signal and the oversampled sampling signal, thereby correcting it.

Further, an influence by intersymbol interference increases due to the improvement of a recording density, a target response of a PR system becomes complicated, a response in the preamble pattern becomes asymmetric, and a multivalue discriminator is needed even in the preamble. Therefore, in the phase offset detector of the invention, in an asymmetric preamble waveform, a phase of an input waveform is shifted so that the response in the preamble becomes symmetric, thereby enabling a phase error to be calculated by a level comparison of two continuous samples. The timing recovery unit in this case comprises: an error detector which detects a phase error between a sampling signal of a symbol rate outputted from the interpolating filter and a symbol discrimination signal from a discriminator; a loop filter which integrates the phase error from the error detector; and an accumulator which integrates an output of the loop filter and controls coefficients of the interpolating filter so as to eliminate the phase error, wherein the accumulator is initialized by the phase error detected by the phase offset detector, thereby allowing the zero phase start to be executed.

The frequency offset (initial frequency error) as a difference of frequencies of the symbol rates between the writing operation and the reading operation in the magnetic recording and reproducing apparatus is increasing in association with the realization of the high density recording and becomes a factor of increasing the lead-in time and the steady-state phase error. According to the invention, therefore, there is provided an information recording and reproducing apparatus for recording and reproducing information onto/from a magnetic recording medium, characterized by comprising: a timing recovery unit having an interpolating filter which interpolates a signal oversampled by a fixed clock and down-samples it to a symbol rate; and a frequency offset detector which divides a preamble interval into a plurality of blocks by a length that is integer times as long as a read waveform approximated by a sine wave, obtains a phase error between a sampling waveform and a reference waveform every block, detects an initial frequency error (frequency offset) from a change rate of the phase errors for a predetermined number of blocks, corrects the timing recovery unit by the detected initial frequency error, and allows a loop operation to be started. According to the invention as mentioned above, by previously detecting the frequency offset in the preamble interval and initializing the loop filter by a value of the detected frequency offset, the loop can be led in in a state where a lead-in amount of the frequency offset is equal to "0", and the steady-state phase error and the lead-in time can be improved. Further, a lead-in possible range of the frequency offset can be also widened. The timing recovery unit in this case comprises: an error detector which detects a phase error between a sampling signal of a symbol rate outputted from the interpolating filter and a discrimination signal from a discriminator; a loop filter which integrates the phase error from the error detector; and an accumulator which integrates an output of the loop filter and controls coefficients of the interpolating filter so as to eliminate the phase error, wherein the loop filter is initialized by the frequency error detected by the frequency offset detector, thereby allowing the loop operation to be started.

Although an oversampling equalizer for equalizing the oversampled signal is provided for the timing recovery unit constructing the timing reproduction loop of the signal interpolating type, a discrimination error necessary for training equalizer coefficients is the signal of the symbol rate. The discrimination error cannot be directly fed back for training. Therefore, according to the invention, there is provided an information recording and reproducing apparatus for recording and reproducing information onto/from a magnetic recording medium, characterized by comprising: an A/D converter which inputs a read signal of a symbol rate and outputs a sampling signal which was asynchronously oversampled; an oversampling equalizer which waveform-equalizes the oversampled sampling signal; a timing recovery unit having an interpolating filter which interpolates the equalization signal and down-samples it to the symbol rate; and a training circuit which, when a discrimination error of the symbol rate obtained from an output signal of the interpolating filter and a discrimination signal of a discriminator is fed back to training of the oversampling equalizer, inversely interpolates the discrimination error and up-samples it to the signal of the sampling rate. The training circuit has a signal processing circuit which inversely interpolates the discrimination error from the symbol rate to the sampling rate, and sets coefficients of the interpolating filter into the signal processing circuit. As mentioned above, according to the invention, by inversely interpolating the discrimination error at the symbol rate so as to obtain the sampling rate, the conventional LMS method can be used for the training of the oversampling equalizer, and the coefficients of the oversampling equalizer can be trained so as to set a square mean of the discrimination error to "0".

The information recording and reproducing apparatus is characterized by comprising a DC offset cancel control loop which controls a DC signal that is added to the input signal of the A/D converter so that a product of an average of the discrimination errors of the symbol rate and the sum of the coefficients of the oversampling equalizer is set to "0" and cancels a DC offset. Further, the information recording and reproducing apparatus of the invention is characterized by comprising an automatic gain control loop which controls an amplitude of the input signal of the A/D converter so that an average of the products of the discrimination errors of the symbol rate is set to "0". Therefore, even by the cancellation of the DC offset which is multiplexed to the read signal from the head and the feedback loop of the automatic gain control for setting the signal amplitude to a constant value, it is possible to control so as to set the square mean of the discrimination errors of the symbol rate to "0".

Signal Decoding Circuit-2

According to the invention, there is provided a signal decoding circuit as a read channel LSI for recording and reproducing information onto/from a magnetic recording medium. The signal decoding circuit is characterized by comprising: a timing recovery unit having an interpolating filter which interpolates a signal oversampled by a fixed clock and down-samples it to a symbol rate; and a phase offset detector which approximately handles a read signal in a preamble interval in a sector as a sine wave of a periodic signal, detects a phase error between the symbol rate and sampling timing from a correlation of a reference signal of the sine wave and a sampling signal, corrects the timing recovery unit by the detected phase error, and allows a loop operation to be started.

According to the invention, there is provided a signal decoding circuit characterized by comprising: a timing recovery unit having an interpolating filter which interpolates a signal oversampled by a fixed clock and down-samples it to a symbol rate; and a phase offset detector which handles a read waveform in a preamble interval in a sector as a periodic waveform, detects a phase error between the symbol rate and sampling timing from a correlation of a reference signal of the periodic waveform and a sampling signal oversampled for the symbol rate, corrects the timing recovery unit by the detected phase error, and allows an operation to be started.

According to the invention, there is provided a signal decoding circuit characterized by comprising: a timing recovery unit having an interpolating filter which interpolates a signal oversampled by a fixed clock and down-samples it to a symbol rate; and a frequency offset detector which divides a preamble interval into a plurality of blocks by a length that is integer times as long as a read waveform approximated to a sine wave, obtains a phase error between a sampling waveform and a reference waveform every block, detects a frequency error from a change rate of the phase errors for a predetermined number of blocks, corrects the timing recovery unit by the detected frequency error, and allows a loop operation to be started.

According to the invention, there is provided a signal decoding circuit characterized by comprising: an A/D converter which inputs an analog read signal and outputs a sampling signal asynchronously oversampled; an oversampling equalizer which waveform-equalizes the oversampled sampling signal; a timing recovery unit having an interpolating filter which interpolates the equalization signal and down-samples it to a symbol rate; and a training circuit which, when a discrimination error of the symbol rate obtained from an output signal of the interpolating filter and a discrimination signal of a discriminator is fed back to training of the oversampling equalizer, inversely interpolates the discrimination error and up-samples it to the signal of the sampling rate.

The signal decoding circuit of the invention is characterized by further comprising a DC offset cancel control loop which controls a DC signal that is added to an input signal of the A/D converter so that a product of an average of the discrimination errors of the symbol rate and the sum of coefficients of the oversampling equalizer is set to "0" and cancels a DC offset. The signal decoding circuit is characterized by further comprising an automatic gain control loop which controls an amplitude of the input signal of the A/D converter so that an average of the products of the discrimination errors of the symbol rate is set to "0". Details in the signal decoding circuit of the invention are substantially the same as those in the case of the information recording and reproducing apparatus.

Information Recording and Reproducing Method-2

The invention provides an information recording and reproducing method. That is, according to the invention, there is provided an information recording and reproducing method having a timing recovery unit for recording and reproducing information onto/from a magnetic recording medium, equalizing a reproduced read signal by oversampling it by a fixed clock, thereafter, interpolating the equalization signal, down-sampling it to a symbol rate, and discriminating the read signal, characterized in that:

a read waveform in a preamble interval in a sector is handled as a periodic waveform, a phase error between a signal point and a sampling point is detected from a correlation of a reference waveform of the periodic waveform and a sampling waveform; and the timing recovery unit is corrected by the detected phase error, thereby allowing a loop operation to be started.

According to the invention, there is provided an information recording and reproducing method having a timing recovery unit for recording and reproducing information onto/from a magnetic recording medium, equalizing a reproduced read signal by oversampling it by a fixed clock, thereafter, interpolating the equalization signal, down-sampling it to a symbol rate, and discriminating the read signal, characterized in that:

a read waveform in a preamble interval in a sector is handled as a periodic waveform, a phase error between a signal point and a sampling point is detected from a correlation of a reference signal of the periodic waveform and a sampling signal oversampled for the symbol rate; and the timing recovery unit is corrected by the detected phase error, thereby allowing an operation to be started.

According to the invention, there is provided an information recording and reproducing method having a timing recovery unit for recording and reproducing information onto/from a magnetic recording medium, equalizing a reproduced read signal by oversampling it by a fixed clock, thereafter, interpolating the equalization signal, down-sampling it to a symbol rate, and discriminating the read signal, characterized in that:

a preamble interval is divided into a plurality of blocks by a length that is integer times as long as a read waveform approximated to a sine wave;

a phase error between a sampling waveform and a reference waveform is obtained every block;

a frequency error is detected from a change rate of the phase errors for a predetermined number of blocks; and the timing recovery unit is corrected by the detected frequency error, thereby allowing a loop operation to be started.

Details in the information recording and reproducing method of the invention are substantially the same as those in the case of the information recording and reproducing apparatus.

Equalizer Training Method

The invention provides an equalizer training method. That is, according to the invention, there is provided an equalizer training method for an information recording and reproducing apparatus for recording and reproducing information onto/from a magnetic recording medium, equalizing a reproduced read signal by an equalizer by oversampling it by a fixed clock, thereafter, interpolating the equalization signal by an interpolating filter, down-sampling it to a symbol rate, and discriminating the read signal, characterized in that:

when the interpolated signal and a discrimination error of the symbol rate obtained from a discrimination signal are fed back to the training of the equalizer, the discrimination error is inversely interpolated and up-sampled to the signal of a sampling rate.

The equalizer training method of the invention is further characterized in that a DC signal which is added to an input signal obtained before the oversampling is controlled so that a product of an average of the discrimination errors of the symbol rate and the sum of coefficients of an oversampling equalizer is equal to "0" and a DC offset is cancelled. The equalizer training method of the invention is further characterized in that an amplitude of the input signal obtained before the oversampling is controlled so that an average of the products of the discrimination errors of the symbol rate is equal to "0". Details in the equalizer training method of the invention are substantially the same as those in the case of the information recording and reproducing apparatus.

The above and other objects, features, and advantages of the present invention will become more apparent from the following detailed description with reference to the drawings.

BRIEF DESCRIPTION OF THE DRAWINGS

FIG. 4 is a block diagram of a hard disk drive to which the invention is applied;

FIGS. 5A and 5B are block diagrams of a data reproducing unit having a timing recovery unit of the invention;

FIG. 7 is a block diagram of an FIR interpolating filter in FIGS. 5A and 5B;

FIGS. 8A to 8E are time charts for the timing recovery operation according to the invention;

FIGS. 9A and 9B are explanatory diagrams of preamble reproduction data having a phase offset and a frequency offset;

FIGS. 10A and 10B are block diagrams of an embodiment of a data reproducing unit having the timing recovery unit according to the invention;

FIGS. 24A to 24E are time charts for the loop lead-in by the frequency offset detection;

FIG. 38 is a circuit diagram of a specific embodiment of an inner product unit provided in the coefficient updating circuit and is a sequel to FIG. 36;

DETAILED DESCRIPTION OF THE PREFERRED EMBODIMENT

Fundamental Embodiment

Figure 1:
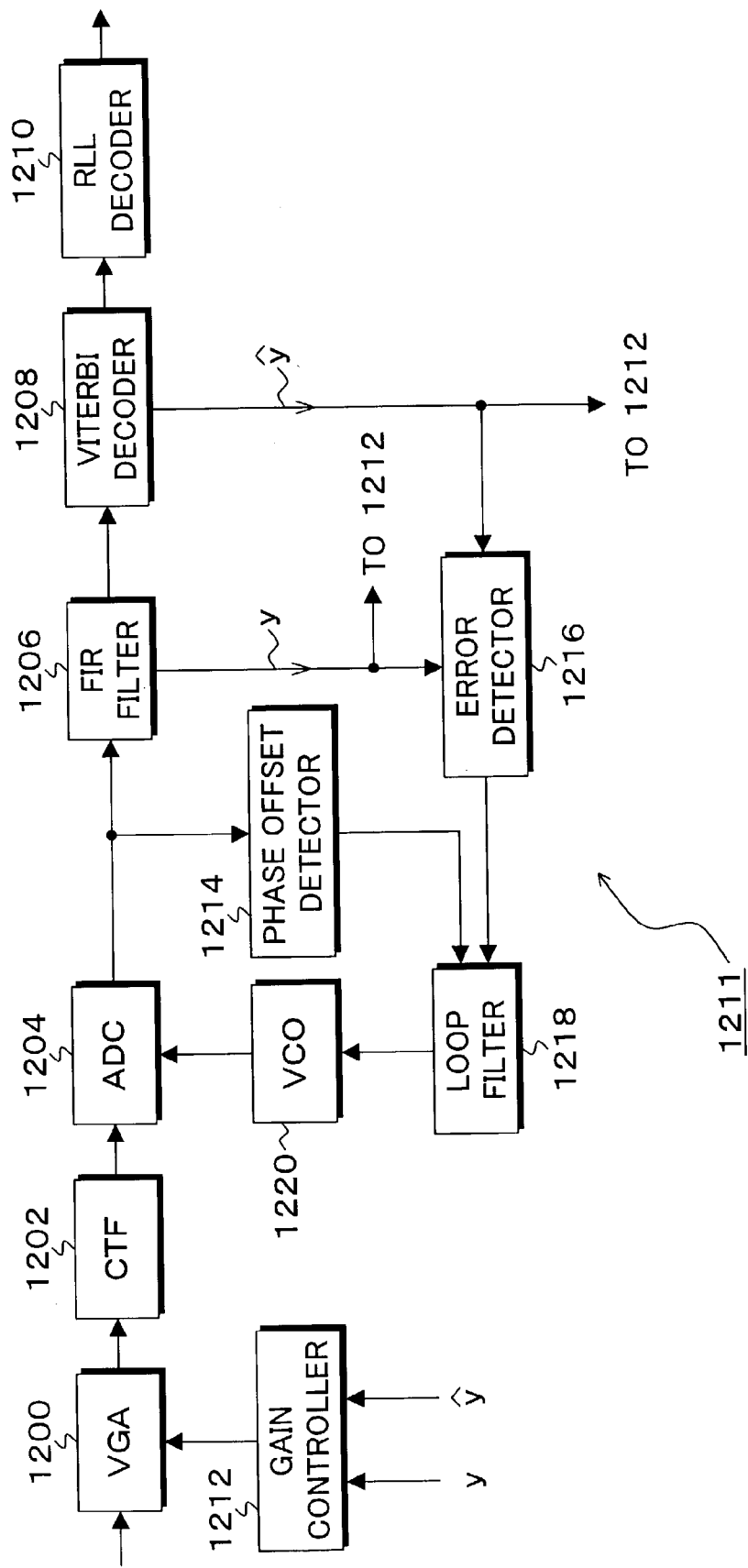
FIG. 1 is a block diagram of a data reproducing unit having a conventional timing recovery unit serving as a clock synchronization.

FIG. 4 is a block diagram of a hard disk drive to which the invention is applied. The hard disk drive is constructed by an SCSI controller 10, a drive control 12, and a disk enclosure 14. Naturally, an interface with a host is not limited to the SCSI controller 10 but other proper interface controller can be used. The SCSI controller 10 is provided with: an MCU (Main Control Unit) 16; a memory 18 using a DRAM or an SRAM which is used as a control storage; a program memory 20 using a non-volatile memory such as a flash memory or the like for storing a control program; a hard disk controller (HDC) 22; and a data buffer 24. A drive interface logic 26, a DSP 28, a read channel (RDC) 30, and a servo driver 32 are provided for the drive control 12. A head IC 34 is further provided for the disk enclosure 14. Combination heads 36-1 to 36-6 each having a recording head and a reproducing head are connected to the head IC 34, respectively. The combination heads 36-1 to 36-6 are provided for the recording surfaces of magnetic disks 38-1 to 38-3 and moved to arbitrary track positions on the magnetic disks 38-1 to 38-3 by the driving of a rotary actuator by a VCM 40, respectively. Each of the magnetic disks 38-1 to 38-3 is rotated at a constant velocity by a spindle motor 42. A formatter and an ECC processing unit are provided for the hard disk controller 22 of the SCSI controller 10. A data recording unit 46 and a data reproducing unit 48 are provided for the read channel 30. The data reproducing unit 48 receives data added with a CRC code and an ECC code from the hard disk controller 22, executes an RLL encoding for stabilizing clock reproduction by a PLL, and thereafter, makes write compensation for slightly widening a transition interval at a position where magnetic transitions are adjacent. The head IC 34 is driven by a driver, thereby generating a guide current to the recording head and recording data onto a medium. The data reproducing unit 48 receives the analog voltage generated from the reproducing head and amplified by a preamplifier built in the head IC 34 and demodulates data. The demodulated data is sent to the hard disk controller 22, subjected to an error correction by ECC decoding and a checking process by CRC decoding, and outputted as decoding data.

Figure 5B:
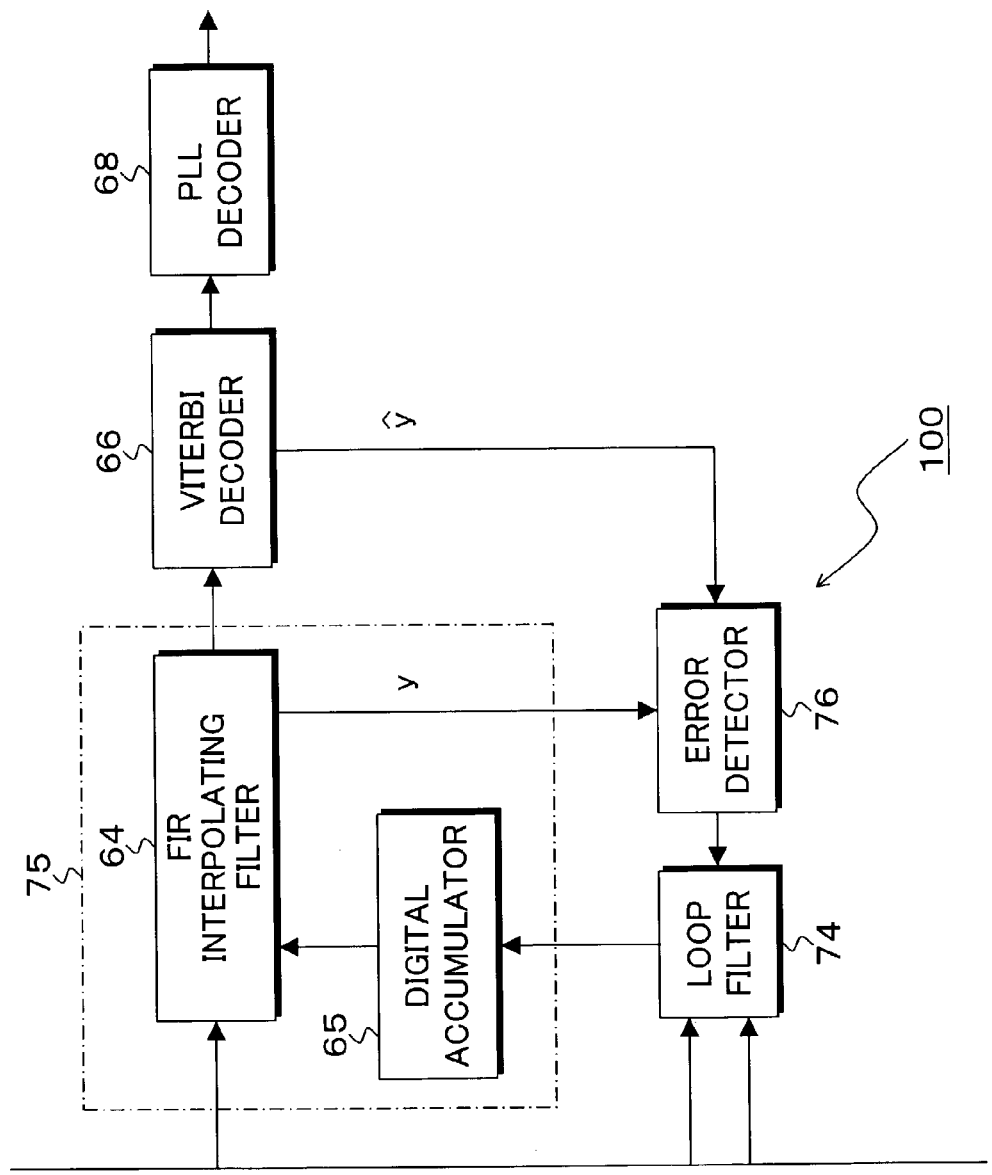

FIGS. 5A and 5B are block diagrams of the data reproducing unit 48 in FIG. 4 having a timing recovery unit 100 of the invention. The head reproduction signal outputted from the head IC 34 is converted into a digital signal via a variable gain amplifier (VGA) 50, a CT filter 52 functioning as a low pass filter, and an A/D converter 54. Thereafter, the signal is waveform-equalized by an FIR filter 56 and written as an equalized signal into a buffer 62 on a sector unit basis. A gain controller 58 controls a gain of the variable gain amplifier 50, thereby correcting the head reproduction signal to a predetermined amplitude. The A/D converter 54 samples the head reproduction signal by a clock generated from a clock oscillator 60, thereby converting it into discrete digital signals. The clock for sampling which is generated from the clock oscillator 60 becomes a fixed clock which is asynchronous with the head reproduction signal. With respect to sector data stored in the buffer 62, the reading operation from the head of the written data is started at a point when the writing of a preamble area at the head of the sector data is finished, and the read-out data is inputted as an equalized signal x to an FIR interpolating filter 64. A loop including the FIR interpolating filter 64, a Viterbi decoder 66, an error detector 76, a loop filter 74, and a digital accumulator 65 constructs a digital PLL. First, the digital PLL drives the A/D converter 54 by the free-running clock from the clock oscillator 60 which is not voltage-controlled and asynchronously samples the data. Although the same devices as those in the conventional apparatus can be used with respect to the error detector 76 and loop filter 74, the VCO is replaced with the digital accumulator 65 and FIR interpolating filter 64. The digital accumulator 65 executes the integrating operation. The FIR interpolating filter 64 operates as a resampler for performing the sampling operation synchronized with the symbol rate. A digital VCO 75 is constructed by a combination of the digital accumulator 65 and FIR interpolating filter 64, and the whole operation is substantially the same as that of the conventional PLL. The Viterbi decoder 66 discriminates a correct signal y^ by a Viterbi algorithm with respect to the equalized signal y. RLL decoding is performed by an RLL decoder 68. The decoded signal is outputted to the hard disk controller side.

A phase offset detector 70 and a frequency offset detector 72 are further provided for the timing recovery unit 100 of the invention. The phase offset detector 70 receives the preamble area at the head of the sector data which is outputted from the A/D converter 54, detects a phase offset (initial phase error) $\Delta\tau_0$, and presets the detected phase offset $\Delta\tau_0$ into the digital accumulator 65. The frequency offset detector 72 receives the preamble area at the head of the sector data which is outputted from the A/D converter 54, detects a frequency offset (initial frequency error) $\Delta f_0$, and presets the detected frequency offset $\Delta f_0$ into the loop filter 74. When the phase offset $\Delta\tau_0$ is preset into the digital accumulator 65 by the detecting process of the phase offset detector 70 and the frequency offset $\Delta f_0$ is preset into the loop filter 74 by the detecting process of the frequency offset detector 72, the buffer 62 starts the reading operation of the written data from the head at a point when the writing of the preamble area is finished. After the phase lead-in and the frequency lead-in are executed to the data in the preamble area synchronously with the reading operation of the data from the buffer 62 by the digital PLL operation by the error detector 76, the loop filter 74, and the digital accumulator 65 and FIR interpolating filter 64 constructing the digital VCO 75, a timing recovery for allowing the timing of the sampling signal of the sampling rate to follow the timing of the correct clock serving as a symbol rate is executed to user data subsequent to the preamble data.

Figure 6:
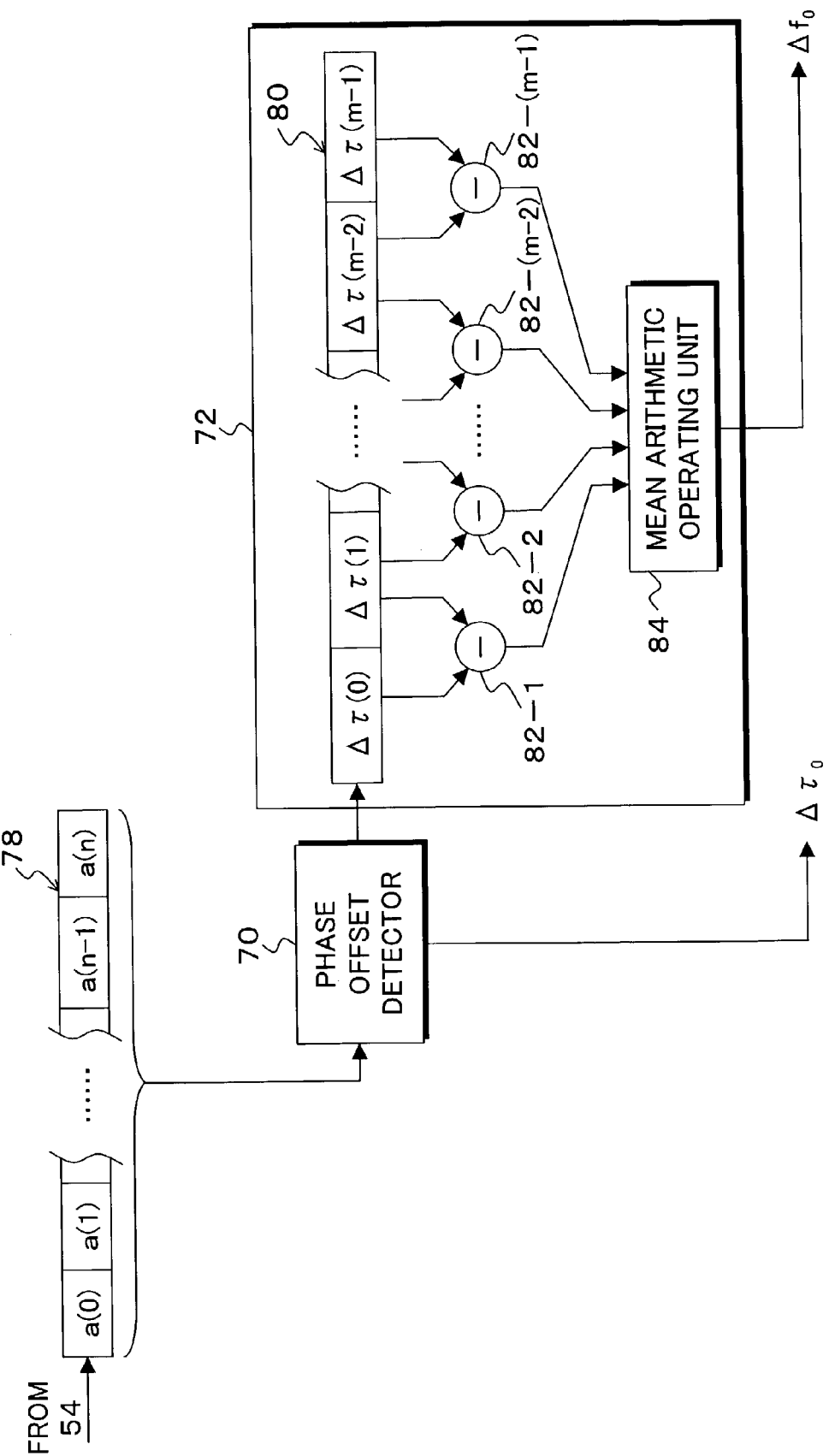
FIG. 6 is a block diagram of a phase offset detector and a frequency offset detector in FIGS. 5A and 5B.

FIG. 6 shows an embodiment of the frequency offset detector 72 provided in the timing recovery unit 100 in FIG. 5B together with the phase offset detector 70. With respect to the data output from the A/D converter 54, (n+1) sampling data a(0) to a(n) are held in a register 78. The sampling data a(0) to a(n) held in the register 78 are inputted to the phase offset detector 70, by which the phase offset $\Delta\tau_0$ is detected. When the reproduction signal of the preamble area is regarded as a sine waveform, in the phase offset detector 70, a phase error $\Delta\tau(i)$ at each sampling point can be obtained by using the following equation (1).

$$\Delta\tau(i) = \tan^{-1}\frac{a(i-1)}{a(i)} \quad (1)$$

By using the equation (1), the phase offset detector 70 obtains a mean value of (n) phase errors and outputs it as a phase offset $\Delta\tau_0$ to the loop filter.

The frequency offset detector 72 is constructed by a phase error register 80, subtractors 82-1 to 82-(m−1), and a mean arithmetic operating unit 84. (m) phase offset mean values $\Delta\tau(0)$ to $\Delta\tau(m-1)$ calculated by the phase offset detector 70 every (n) sampling points are held in the phase error register 80. Assuming that the ith phase offset mean value is set to $\Delta\tau(i)$, a frequency offset $\Delta f(i)$ at this time is obtained by the following equation (2).

$$\Delta f(i) = \Delta\tau(i) - \Delta\tau(i-1) \quad (2)$$

The subtractors 82-1 to 82-(m−1) calculate frequency offsets $\Delta f(0)$ to $\Delta f(n-1)$ in accordance with the equation (2), respectively. Outputs of the subtractors 82-1 to 82-(m−1) are inputted to the mean arithmetic operating unit 84, a mean value of the frequency offsets is calculated, and it is preset as a frequency offset $\Delta f_0$ into the loop filter 74. The detecting method of the frequency offsets is not limited to that shown in the embodiment of FIG. 4, but another method whereby the phase offsets are held with respect to the whole preamble area and, thereafter, differentiated, thereby calculating the frequency offsets, or the like can be also used.

FIG. 7 is a block diagram of the FIR interpolating filter 64 in FIG. 5B and it is shown together with the loop filter 74 and the digital accumulator 65 of the timing recovery unit 100. The phase error $\Delta\tau$ obtained from the output signal y of the FIR interpolating filter 64 and a correct signal $\hat{y}$ determined by the Viterbi decoder 66 is inputted to the loop filter 74 from the error detector 76 in FIG. 5B. The phase offset $\Delta\tau_0$ detected by the phase offset detector 70 shown in FIG. 5A is preset into the digital accumulator 65. The frequency offset $\Delta f_0$ detected by the frequency offset detector 72 is preset into the loop filter 74. Therefore, when the reading operation of the sector data from the buffer 62 is started, the digital accumulator 65 performs the phase lead-in according to the zero phase start by the preset phase offset $\Delta\tau_0$, the loop filter 74 performs the error-corrected frequency lead-in by the frequency offset $\Delta f_0$ preset in the loop filter 74, and the digital accumulator 65 and loop filter 74 promptly start the stable PLL loop operation for timing recovery. The FIR interpolating filter 64 has (k) delay circuits 88-1 to 88-k. Multipliers 90-1 to 90-k multiply input signals by tap coefficients $C_0$ to $C_k$ according to an phase error $\Delta\mu$ which is derived from a coefficient table 86, thereafter, adders 92-2 to 92-k calculate the sum of output signals of those multipliers, and the signal y of the correct timing of the symbol rate is outputted. In addition to the phase lead-in by the phase offset $\Delta\tau_0$ as mentioned above, the frequency lead-in by the frequency offset $\Delta f_0$ is executed to the preamble of the sector data read out from the buffer 62. Therefore, as compared with the conventional timing recovery in which only the phase offset has been preset, even if the frequency offset is caused in the reproduction data for the inherent clock, the phase lead-in and frequency lead-in to the timing state synchronized with the inherent clock can be promptly executed in a short time.

Figure 2:
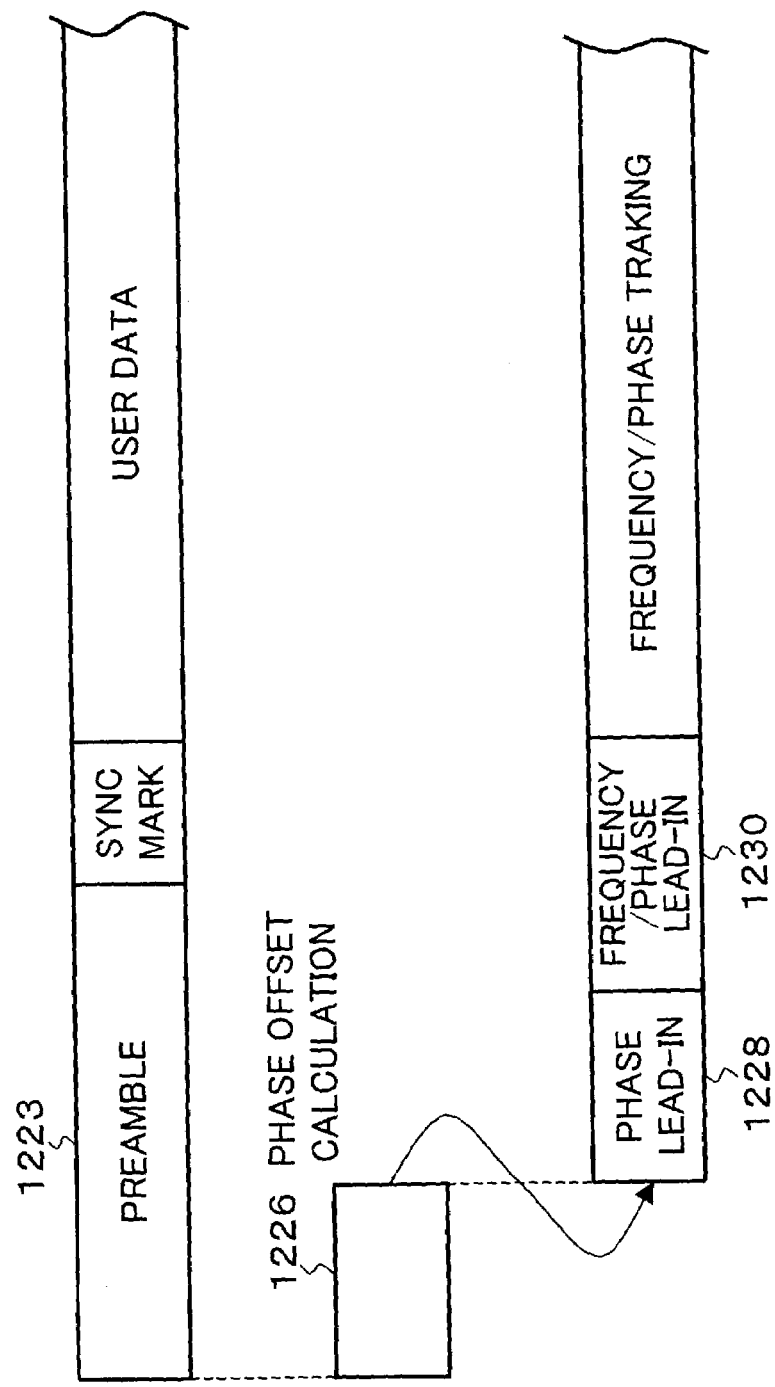
FIGS. 2A to 2C are time charts for the timing recovery operation in the prior art in FIG. 1.
Figure 3:
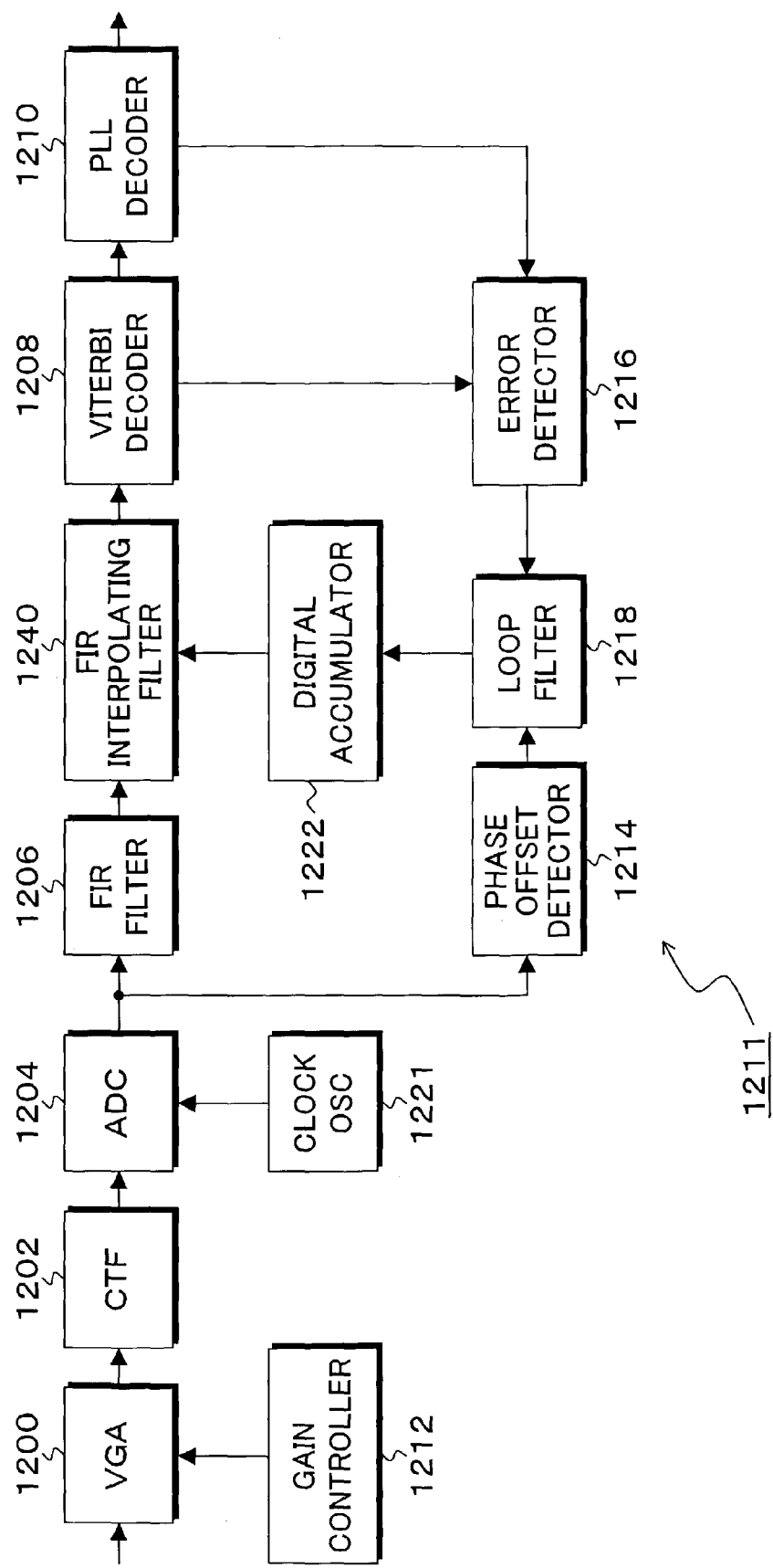
FIG. 3 is a block diagram of a data reproducing unit having a conventional timing recovery unit serving as a clock asynchronization.

FIGS. 8A to 8E are timing charts for the operation which is executed by the timing recovery of the invention in FIG. 7. FIG. 8A shows the output of the A/D converter 54 and shows a head portion of the sector data. Subsequently to a preamble 94, a sync mark 96 is provided, and user data 98 follows it. The output data from the A/D converter 54 is written into the buffer 62 and, at the same time, it is inputted to the phase offset detector 70 and frequency offset detector 72. A phase offset calculation 101 is performed in a head portion of the preamble 94 in FIG. 8C. In parallel with it, as shown in FIG. 8D, a frequency offset calculation 102 is performed by using the whole area of the preamble 94 as shown in FIG. 8D. Upon completion of the writing of the preamble 94 into the buffer 62, the detected phase offset $\Delta\tau_0$ is preset into the digital accumulator 65, the detected frequency offset $\Delta f_0$ is preset into the loop filter 74, and correcting conditions of those offsets are initially set, respectively. Upon completion of the writing of the preamble 94 of the output from the A/D converter 54 into the buffer 62, the buffer output by the reading from the head of the written sector data, that is, from a preamble 94-1 as shown in FIG. 8B is started in parallel with the subsequent writing operation. In response to the buffer output, the timing recovery unit 100 according to the invention operates and starts a phase lead-in 104 in a zero state where the errors have been eliminated with respect to both of the phase offset and the frequency offset by the preset of the phase offset $\Delta\tau_0$ and frequency offset $\Delta f_0$. After that, a frequency/phase lead-in 106 is executed by using the data of the preamble 94-1. By the lead-in operation according to the zero start in the state where both of the phase offset and the frequency offset at the start time point of the timing recovery operation as mentioned above have been corrected, the lead-in operation in which the frequency and the phase are matched with the timing of the inherent clock can be completed for a short time. Therefore, as for lengths of the preambles 94 and 94-1 shown in the sector data of FIGS. 8A and 8B, there is used a format construction of a data length in which a length of data of the preamble is shorter than that of the preamble 1223 of phase zero start according to the correcting state of only the phase offset by the conventional timing recovery unit shown in FIG. 2A. As mentioned above, according to the timing recovery of the invention, since the preamble at the head of the sector data can be shortened, format efficiency of the whole magnetic disk can be improved. After completion of the frequency/phase lead-in 106 by the data of the preamble 94-1, with respect to a sync mark 96-1 and user data 98-1 subsequent to the preamble 94-1, by the interpolating operation of the FIR interpolating filter 64 based on the phase information from the error detector 76, the PLL operation for allowing the sampling timing of the sampling data to follow the frequency and phase in the inherent clock serving as a symbol rate is digitally executed.

FIG. 9A is a signal waveform diagram in the case where a phase offset has occurred in a head reproduction signal of the preamble area. A waveform of a head portion of the preamble area is shown on the left side. A waveform of an end portion of the preamble area is shown on the right side. An intermediate portion is omitted here. In FIG. 9A, a head reproduction signal 110 which is obtained at correct timing according to the fixed clock generated from the clock oscillator 60 in FIG. 5A is shown by a broken line. A head reproduction signal 112 having the phase offset is shown by a solid line. The A/D converter 54 in FIG. 5A samples the head reproduction signal at timing of vertical lines shown at regular intervals on a time base by the fixed clock. Therefore, as compared with values of sampling points shown by (a white circle: ○) of the correct head reproduction signal 110 having no phase offset, the actual head reproduction signal 112 having the phase offset $\Delta\tau$ is set to values of sampling points shown by (a triangle: △). Therefore, the phase offset $\Delta\tau$ is detected by the phase offset detector 70 in FIG. 5A and preset into the loop filter 74, and an interpolating process is executed by the FIR interpolating filter 64, thereby executing the interpolating process so that, for example, a sampling point S1 at the head reproduction signal 112 having the phase offset at the head in FIG. 9A is set to a sampling point S1' shown by (○) which is obtained at the correct clock timing.

FIG. 9B is a signal waveform diagram in the case where the frequency offset exists with respect to the head reproduction signal of the preamble area. A waveform at the head portion of the preamble area is shown on the left side. A waveform of the end portion of the preamble area is shown on the right side. An intermediate portion is omitted here. In FIG. 9B, the head reproduction signal 110 shown by a broken line has a signal waveform which is obtained in the case where there is no frequency offset. On the other hand, assuming that a head reproduction signal 114 shown by a solid line and actually obtained has, for example, a minus frequency offset $\Delta f$, for example, the waveforms which coincide at the head of the preamble area become waveforms in which a phase deviation between them increases as they approach the end of the preamble area. Such a frequency offset $\Delta f$ is detected by the frequency offset detector 72 in FIG. 5A, preset into the loop filter 74, and subjected to the interpolating process by the FIR interpolating filter 64, thereby interpolating in a manner such that a fifth sampling point S5 shown by (triangle △) at the head reproduction signal 114 of the frequency error from the head in FIG. 9B is set to a sampling point S5' shown by (white circle ○) according to the frequency offset $\Delta f$.

Figure 10B:
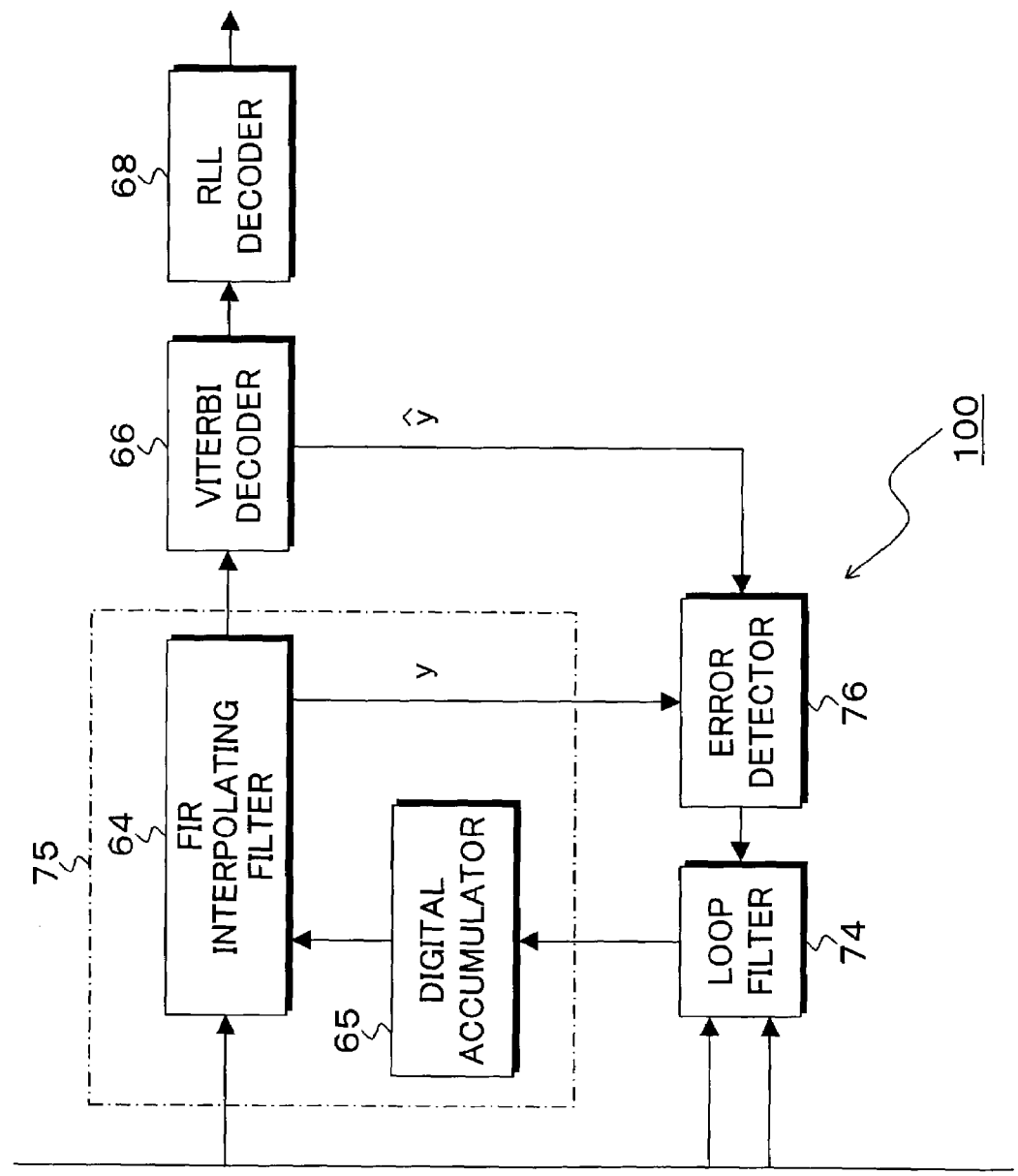

FIGS. 10A and 10B are block diagrams of another embodiment of the data reproducing unit 48 in FIG. 4 and characterized in that the buffer 62 is provided at the front stage of the FIR filter 56 and the signal before waveform equalization is written. Other construction and operation are substantially the same as those in the embodiment of FIGS. 5A and 5B.

Figure 11:
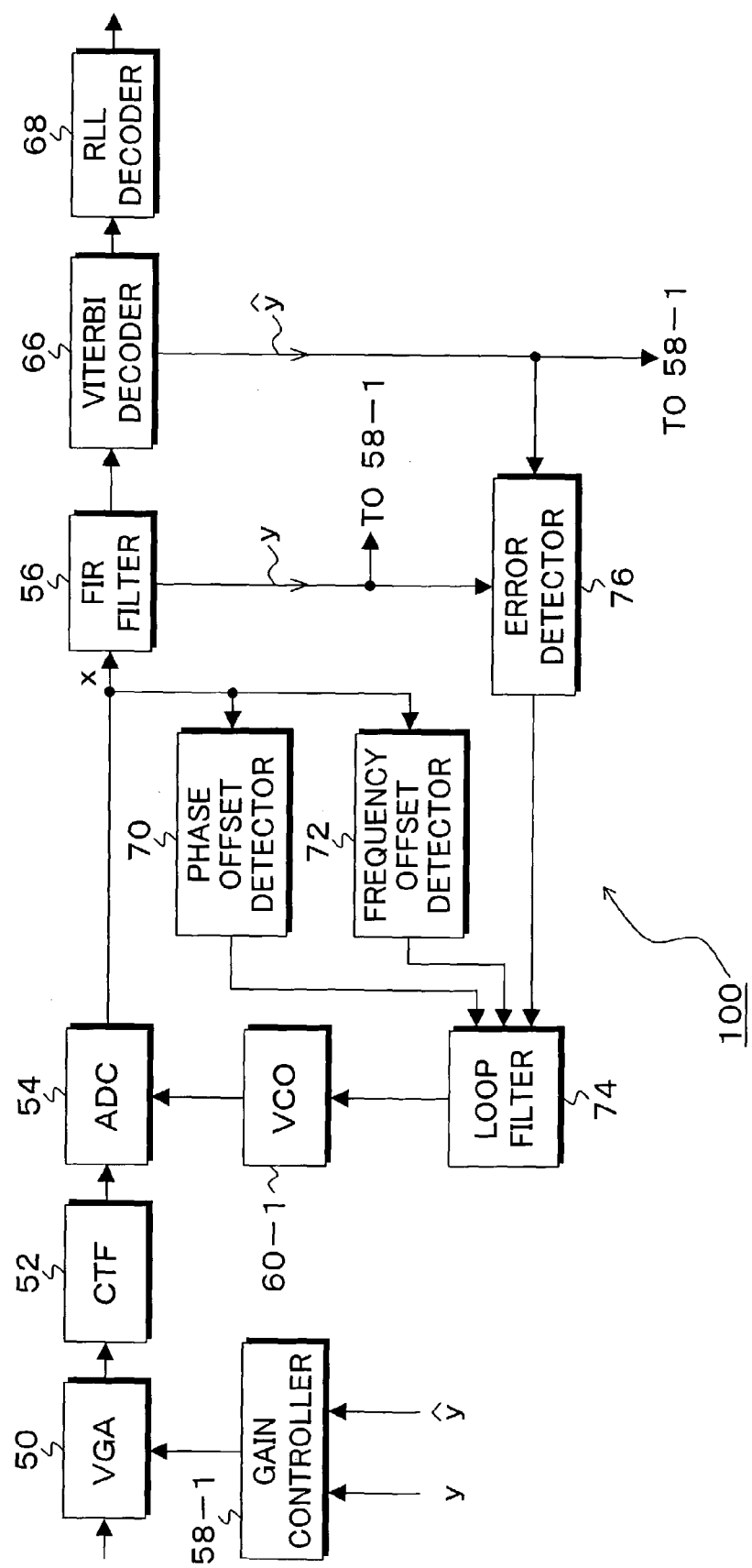
FIG. 11 is a block diagram of an embodiment of a data reproducing unit having the timing recovery unit according to the invention serving as a clock synchronization.

FIG. 11 is a block diagram of another embodiment in which the timing recovery unit of the invention is provided for the data reproducing unit 48 serving as a clock synchronization for the same head reproduction signal as that of the prior art of FIG. 1. An analog voltage from the reproducing head is amplified by a preamplifier of a head IC. After that, it is converted into a digital signal via the variable gain amplifier (VGA) 50, CT filter 52, and A/D converter (ADC) 54. Subsequently, the signal is waveform-equalized by the FIR filter 56 and, thereafter, decoded by the Viterbi decoder 66. The decoded data is further decoded by the RLL decoder 68. In the timing recovery unit 100, a PLL to control timing of the clock for sampling the head reproduction signal by the A/D converter 54 is constructed by the error detector 76, the loop filter 74, and a voltage controlled oscillator 60-1. A gain controller 58-1 is provided for the variable gain amplifier (VGA) 50, controls a gain, and corrects an amplitude. That is, the timing recovery unit 100 corresponding to the clock synchronization obtains the phase error $\Delta\tau$ by using the output signal y of the FIR filter 56 and the discrimination value y^ from the Viterbi decoder 66 and controls an oscillating frequency of the voltage controlled oscillator 60-1 so as to eliminate the phase error. Thus, a feedback loop in which the sampling position of the A/D converter 54 is controlled is formed. The gain error $\Delta G$ is obtained by using the output signal y of the FIR filter 56 and its discrimination value y^, a control voltage of the gain controller 58-1 is adjusted so as to eliminate the gain error, and the amplitude is corrected by the variable gain amplifier (VGA) 50. The phase offset detector 70 and frequency offset detector 72 are further provided for the timing recovery unit 100. The phase offset detector 70 receives the preamble area at the head of the sector data which is outputted from the A/D converter 54, detects the phase offset $\Delta\tau_0$, and presets the detected phase offset $\Delta\tau_0$ into the loop filter 74. The frequency offset detector 72 receives the preamble area at the head of the sector data which is outputted from the A/D converter 54, detects the frequency offset $\Delta f_0$, and presets the detected frequency offset $\Delta f_0$, into the loop filter 74. After the phase offset $\Delta\tau_0$ and frequency offset $\Delta f_0$ are preset into the loop filter 74 by the detecting processes of the phase offset detector 70 and frequency offset detector 72, the phase lead-in and the frequency lead-in to the data in the preamble area are executed in the voltage controlled oscillator 60-1 by the PLL operation by the error detector 76 and loop filter 74. Thereafter, a timing recovery operation for allowing the head reproduction signal to follow the frequency and phase of the clock is executed to the user data subsequent to the preamble data. Constructions and operations of the phase offset detector 70 and frequency offset detector 72 are fundamentally the same as those in the embodiment of FIGS. 5A and 5B.

Details of the Zero Phase Start by the Phase Offset

Figure 12A:
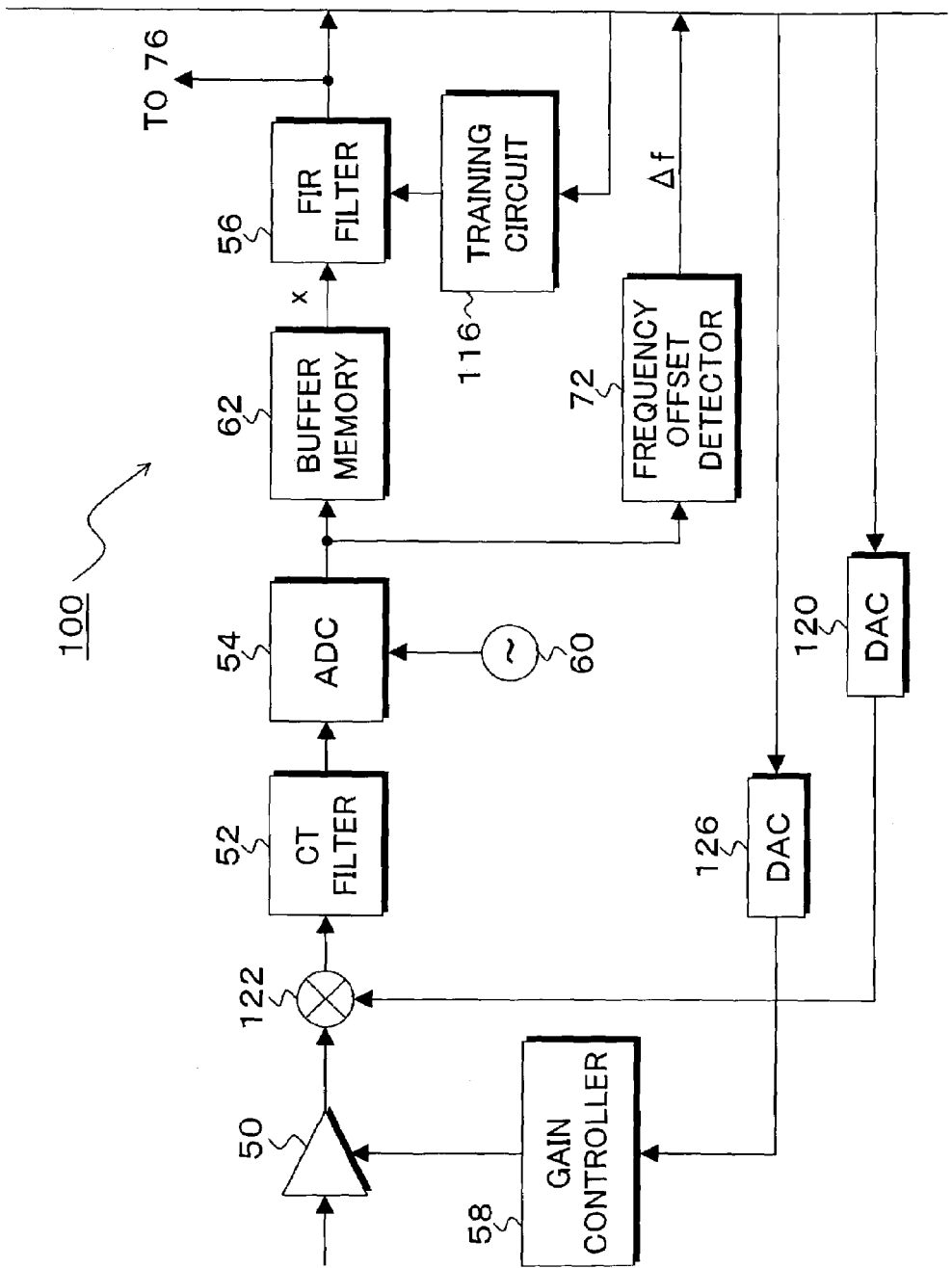
FIGS. 12A and 12B are block diagrams of another embodiment of the timing recovery unit according to the invention.
Figure 12B:
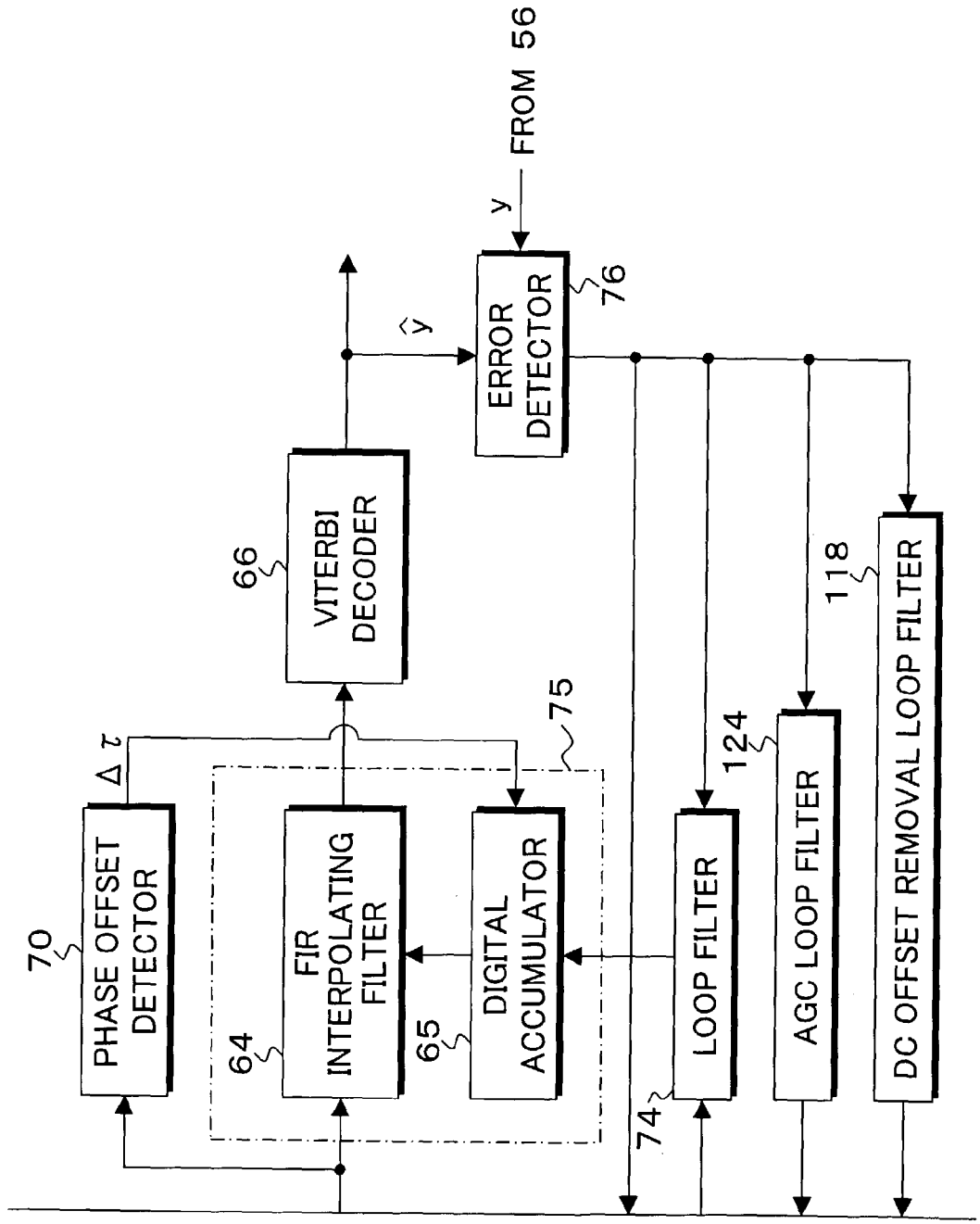

FIGS. 12A and 12B are block diagrams of another embodiment having a timing recovery unit for performing timing reproduction of a signal interpolating type according to the invention. The read signal generated from the head IC passes through the variable gain amplifier (VGA) 50 and the CT filter (continuous time filter) 52 serving as a low pass filter. Thereafter, the signal is asynchronously sampled and converted into the digital signal by the A/D converter 54 which is made operative by the fixed clock generated from the clock oscillator 60 and subsequently written into the buffer 62 on a sector unit basis. As for the sector data stored in the buffer 62, the reading operation from the head of the write data is started in parallel at a point when the writing of the data to a predetermined position in the preamble area at the head of the sector data is finished. The read-out signal is inputted to the FIR interpolating filter 64 as an equalized signal by the FIR filter 56. A loop including the FIR interpolating filter 64, Viterbi decoder 66, error detector 76, loop filter 74, and digital accumulator 65 constructs a digital PLL. This PLL is obtained by modifying the conventional PLL in FIG. 1 to a digital PLL and those component elements except for the VCO can be easily digitized. As for the digitization of the PLL, first, the A/D converter 54 is driven by the free-running fixed clock which is generated from the clock oscillator 60 which is not voltage-controlled, and the data is asynchronously sampled. Although the same devices as those in the conventional apparatus can be used with respect to the error detector 76 and loop filter 74, the VCO is replaced with the digital accumulator 65 and FIR interpolating filter 64. The digital accumulator 65 executes the same operation as that of an integrator provided for the conventional VCO. The FIR interpolating filter 64 operates as a resampler for performing the sampling operation synchronized with the symbol rate. The digital VCO 75 is constructed by a combination of the digital accumulator 65 and FIR interpolating filter 64 and it is the same combination as the conventional combination of the VCO and the A/D converter which is controlled by the VCO, so that the whole operation of the PLL is substantially the same as that of the conventional PLL. The A/D converter 54 performs the oversampling at a sampling rate higher than a symbol rate of a recording channel. Owing to such oversampling, the clock oscillator 60 oscillates a clock frequency which is higher than the frequency of the symbol rate by about a few percent. The Viterbi decoder 66 functioning as a discriminator discriminates the correct signal y^ by a Viterbi algorithm with respect to the equalized signal y having the timing of the symbol rate which was timing-recovered by the timing recovery unit 100. The RLL decoding is performed by an RLL decoder 68. The decoded signal is outputted to the hard disk controller side. The phase offset detector 70 and frequency offset detector 72 are further provided for the timing recovery unit 100 of the invention. The phase offset detector 70 receives the preamble area at the head of the sector data which is outputted from the A/D converter 54, detects the phase offset (initial phase error) $\Delta\tau$, and presets the detected phase offset $\Delta\tau$ into the digital accumulator 65, thereby initializing it and allowing the loop lead-in to be advanced by the zero phase start in the digital PLL loop. The frequency offset detector 72 receives the preamble area at the head of the sector data which is outputted from the A/D converter 54, detects the frequency offset $\Delta f$, and presets the detected frequency offset $\Delta f$ into the loop filter 74. When the phase offset $\Delta\tau$ to the digital accumulator 65 and the frequency offset $\Delta f$ to the loop filter 74 are preset by the detecting processes of the phase offset detector 70 and frequency offset detector 72, the buffer 62 starts the reading operation of the written data from the head at a point when the writing of the preamble is finished. After the phase lead-in and the frequency lead-in to the data in the preamble area are executed synchronously with the reading operation of the data from the buffer 62 by the digital PLL operation by the error detector 76, loop filter 74, digital accumulator 65, and FIR interpolating filter 64, a timing recovery for allowing the user data subsequent to the preamble data to follow the frequency and phase of the correct clock of the symbol rate is executed. A training circuit 116 for feeding back the discrimination error from the error detector 76 to the FIR filter 56 and training is provided. When the discrimination error of the symbol rate is fed back for the purpose of training to the FIR filter 56 which functions as an equalizer, the training circuit 116 inversely interpolates the discrimination error to the discrimination error of the sampling rate. With respect to the interval of the preamble signal, restricting conditions are set lest the discrimination error at that time is used for training. A DC offset cancel control loop for controlling so as to set a DC offset which is multiplexed to the input signal of the A/D converter 54 to "0" is provided by a DC offset removal loop filter 118, a D/A converter 120, and an analog adder 122. As will be clarified by an explanation hereinlater, the DC offset cancel control loop controls so that a product of an average of the discrimination errors and the sum of tap coefficients of the FIR filter 56 is equal to "0". Further, an AGC control loop for controlling the variable gain amplifier 50 by the gain controller 58 so that the amplitude of the input signal to the A/D converter 54 is held to be constant is provided by an AGC loop filter 124 and a D/A converter 126. As will be clarified by an explanation hereinlater, the AGC control loop controls so that an average of the products of the output of the FIR interpolating filter 64 and the discrimination errors is equal to "0".

Figure 13:
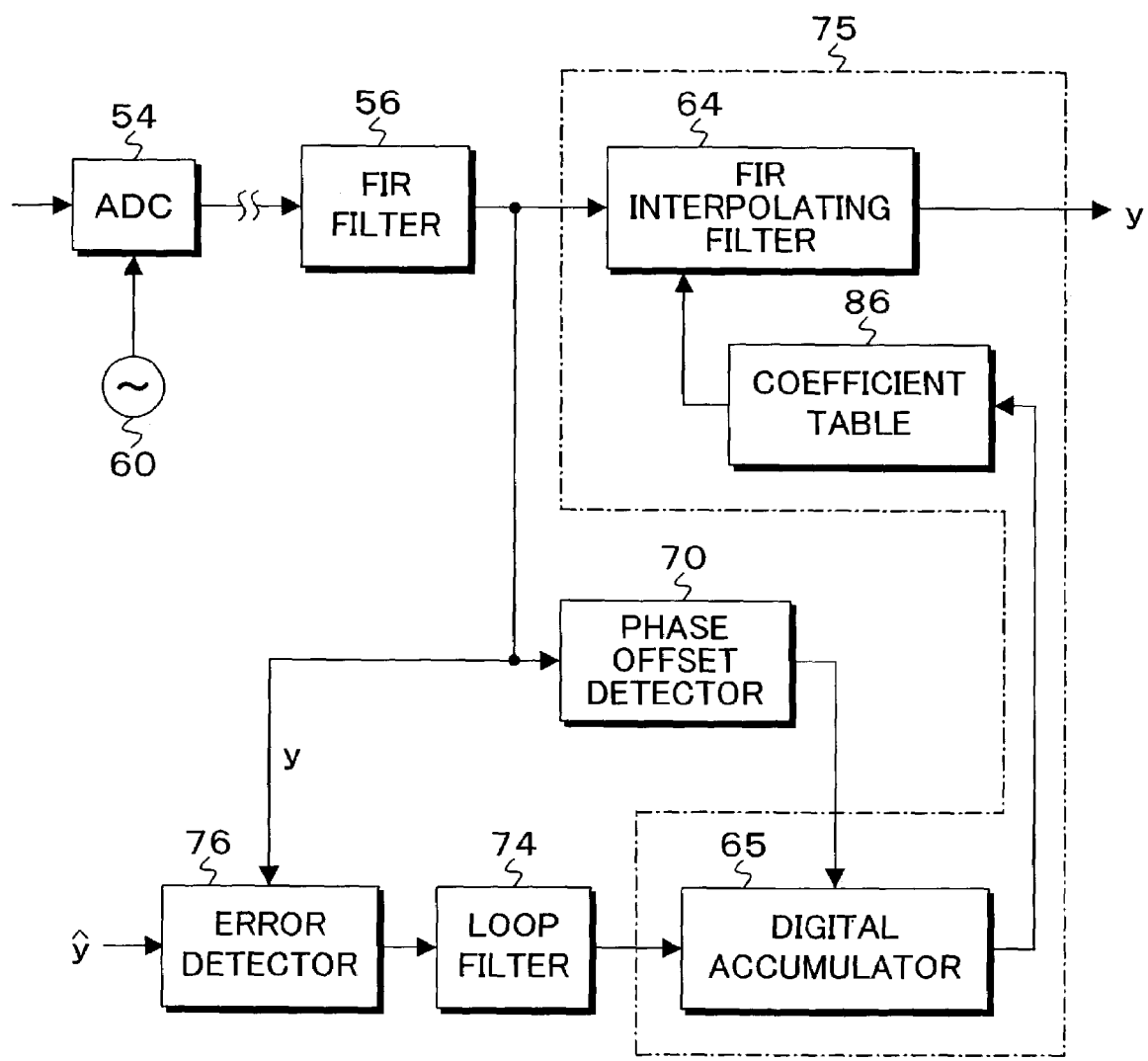
FIG. 13 is a block diagram of a portion of a digital PLL loop of a zero phase start in FIGS. 12A and 12B.

FIG. 13 shows the portion of the A/D converter 54, FIR filter 56, FIR interpolating filter 64, error detector 76, loop filter 74, digital accumulator 65, and phase offset detector 70 corresponding to the timing recovery unit 100 in the embodiment of FIGS. 12A and 12B. With respect to the FIR interpolating filter 64, the coefficient table 86 is shown.

Figure 14A:
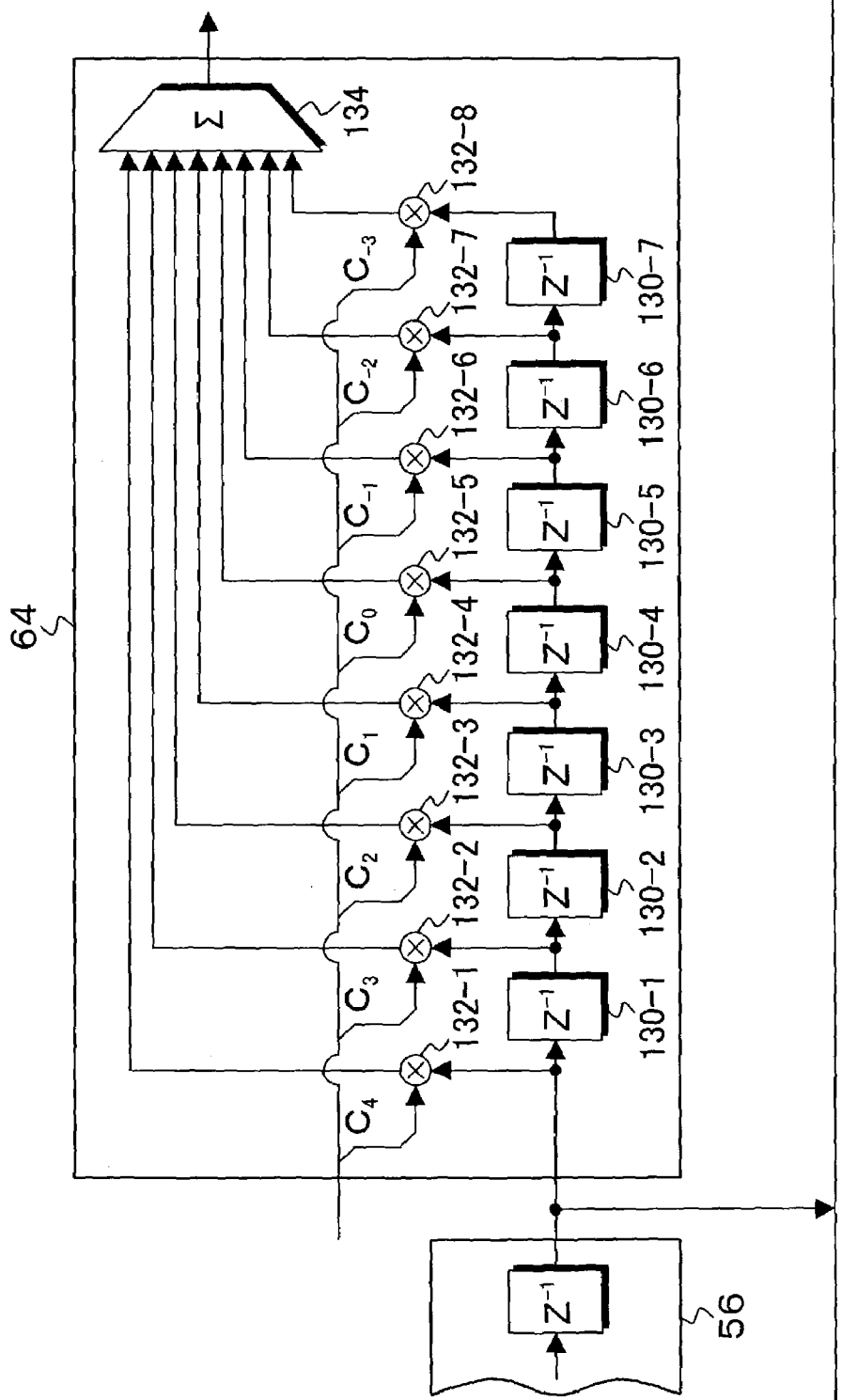
FIGS. 14A and 14B are circuit block diagrams of a specific embodiment of an FIR interpolating filter and a phase offset detector in FIG. 13.
Figure 14B:
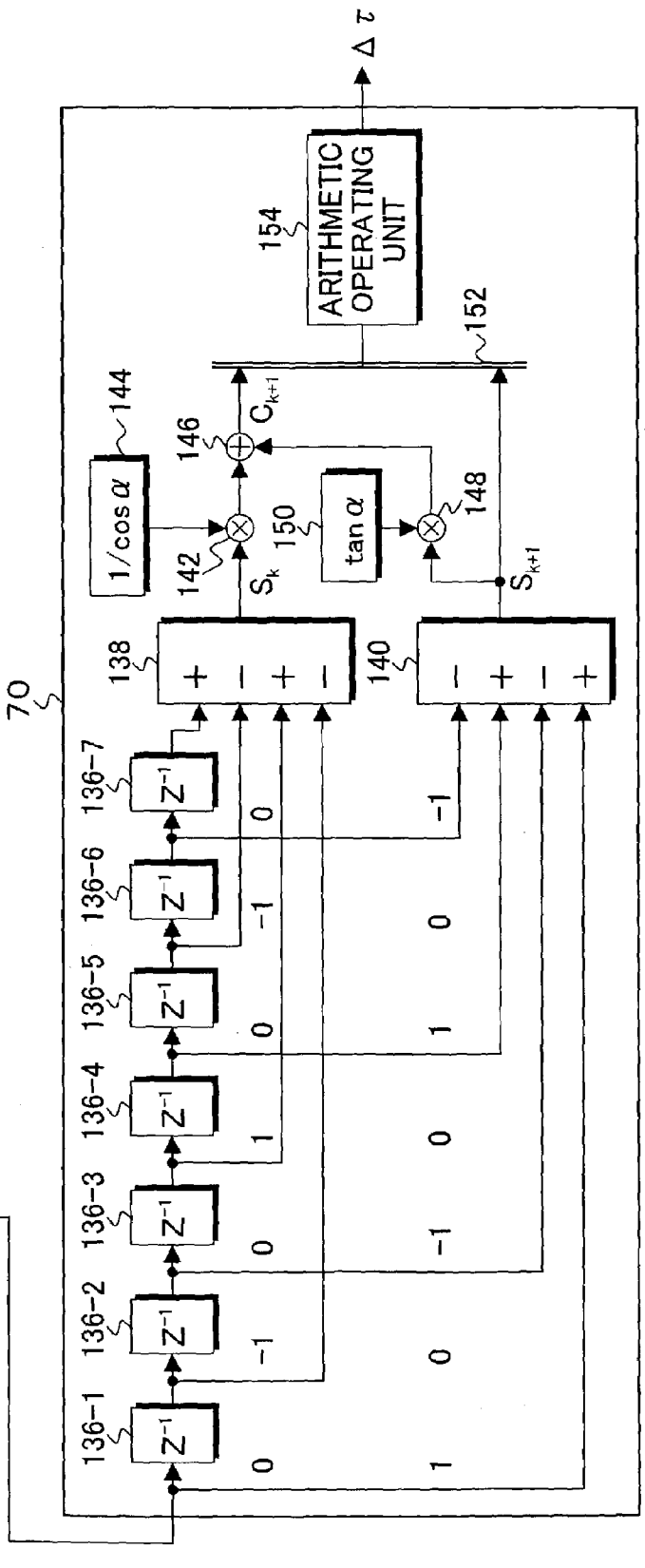

FIGS. 14A and 14B show an embodiment of a circuit construction of the phase offset detector 70 and FIR interpolating filter 64 in FIG. 13. The FIR interpolating filter 64 is constructed by: delay circuits 130-1 to 130-7 which are cascade-connected; multipliers 132-1 to 132-8 for multiplying input signals and respective delay outputs by the tap coefficients $C_4$ to $C_{-3}$, respectively; and an adder 134. The phase offset detector 70 is constructed by: delay circuits 136-1 to 136-7 which are cascade-connected and construct the FIR filter 56; adders 138, 140, and 146; multipliers 142 and 148; a selector 152; registers 144 and 150; and an arithmetic operating unit 154. At a point when eight head sampling signals of the preamble signal are inputted, the phase offset detector 70 detects the phase error $\Delta\tau$ and outputs it. Assuming that the sampling rate is set to Ts, an arithmetic operating procedure in the phase offset detector 70 is as follows.

(1) Correlations Sk and Sk+1 of the sampling signals at time kTs and next time (k+1)Ts and a reference sine signal are obtained.

(2) A correlation Sk+1 of the sampling signal at next time (k+1)Ts and a reference cosine signal is obtained by the following equation (3).

$$C_{k+1} = \tan\alpha \cdot S_{k+1} - \frac{1}{\cos\alpha} \cdot S_k \qquad (3)$$

The phase error Δτ of the preamble signal is obtained by the following equation (4).

$$\Delta\tau = \tan^{-1}\left(\frac{\text{Ref\_C} \cdot C_{k+1} + \text{Ref\_S} \cdot S_{k+1}}{-\text{Ref\_S} \cdot C_{k+1} + \text{Ref\_C} \cdot S_{k+1}}\right) \quad (4)$$

The FIR interpolating filter 64 in FIGS. 12A and 12B will now be described in detail. First, the input signal to the A/D converter 54 in FIG. 13 is as follows.

$$g(t) = \sum_{k=-\infty}^{\infty} x_k h(t - kT) \quad (5)$$

where, $x_k$: binary (±1) data series
h(t): recording channel response
T: symbol period In order to perform the timing recovery synchronized with the symbol rate, the interpolating filter needs to output g(mT). However, the A/D converter 54 samples the data at a sampling period Ts and the phase loop has a phase error μ (which is normalized by Ts). Therefore, the input signal to the FIR interpolating filter 64 is as follows.

$$I(mT-\mu T_s+nT_s)=g(mT-\mu T_s+nT_s)+N(mT-\mu T_s+nT_s) \text{ for } n=-N_2, \ldots, N_1, \quad (6)$$

where,

N: noises

The tap coefficients of the FIR interpolating filter 64 become a function of the phase error μ. Now, assuming that this function is set to fμ(n), n=-N2, . . . , N1 are tap coefficients of the FIR interpolating filter 64. An ideal output of the FIR interpolating filter 64 is as follows.

$$\hat{g}(mT) = \sum_{n=-N_2}^{N_1} I(mT - \mu T_s + nT_s) f_\mu(n) \quad (7)$$

Figure 15A:
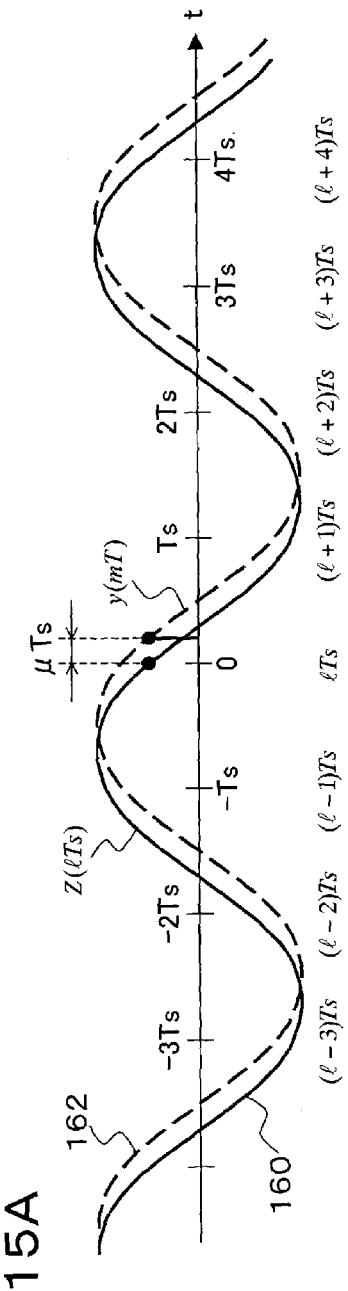
FIGS. 15A and 15B are explanatory diagrams showing the resampling operation by the FIR interpolating filter and a phase deviation for the zero phase start.
Figure 15B:
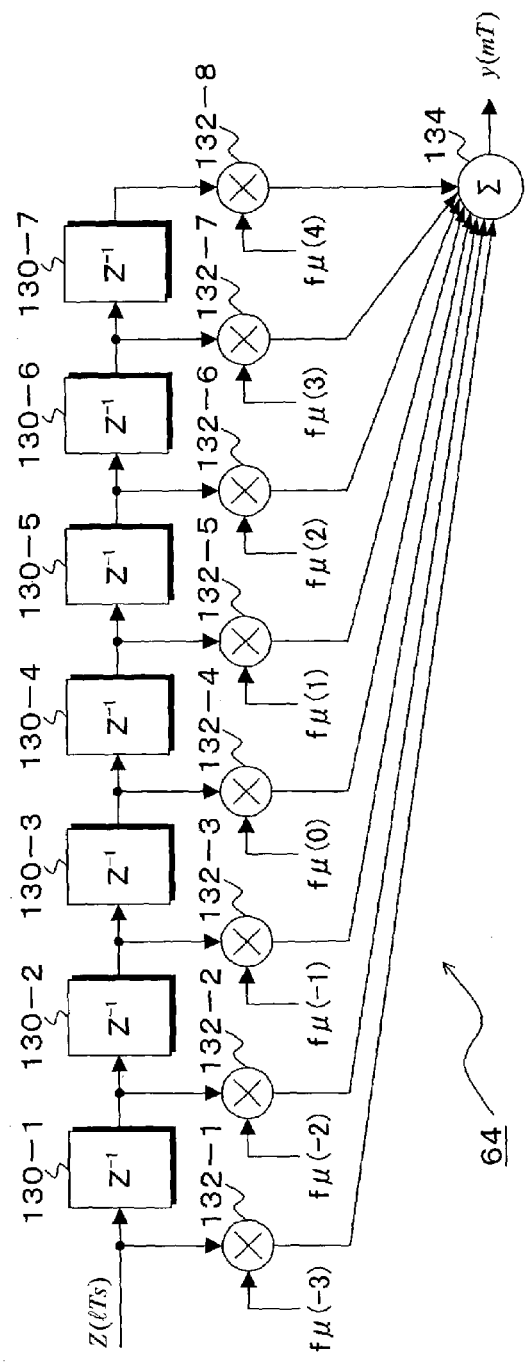

FIGS. 15A and 15B show the interpolating operation of the sampling timing which is executed by the FIR interpolating filter 64. FIG. 15A shows a preamble signal 160 of a sine waveform serving as an input signal. The preamble signal 160 has sampling points of a sampling rate Ts due to the oversampling. The preamble signal 160 has the phase error μ as compared with a preamble signal 162 (shown by a broken line) having symbol points of a symbol rate T. In this case, the output y (mT) of the FIR interpolating filter 64 having the construction shown in FIG. 15B is as follows.

$$y(mT) = \sum_{Neq1}^{Neq2} f\mu(i) \cdot Z\{(l-i)T_s\} \quad (8)$$

where, $Z(lT_s)=Z(mT-\mu T_s)$

A coefficient set of the phase error μ is as follows.

{fμ(Neq₁) . . . , f(-1), f(0), f(1), . . . f(Neq₂)}

The FIR interpolating filter 64 outputs the sampling points at the correct timing mT of the symbol rate at the timing of time t=0 on the basis of the sampling points at times -3Ts to 4Ts obtained in this instance and the coefficient set of the phase error μ. Thus, the sampling points of the sampling rate Ts are set to the symbol rate T and the synchronization is obtained. With respect to the resampling at the symbol rate which is executed by the FIR interpolating filter 64 as mentioned above, the phase offset detector 70 in FIG. 12B detects a phase error of the oversampled preamble signal 160 of the sampling rate for the preamble signal 162 of the symbol rate in FIG. 15A, and forcedly shifts the symbol point at time t=0 to the timing of the sampling point of the symbol rate at t=mT serving as an interpolation output at that time, thereby executing the digital PLL operation by what is called a zero phase start and allowing the phase lead-in to be advanced.

Figure 16A:
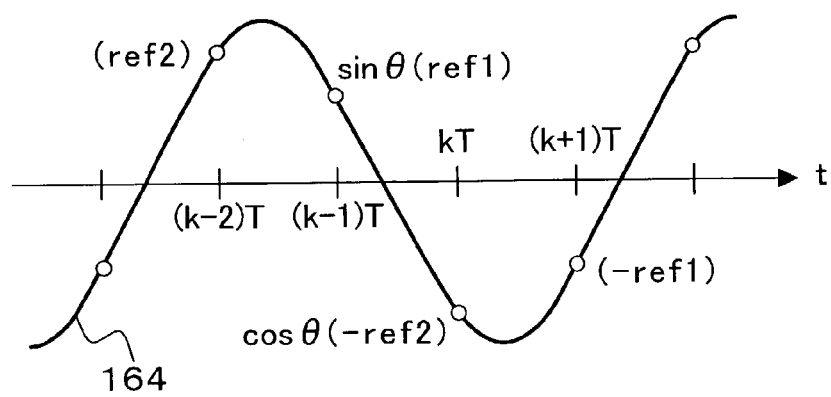
FIGS. 16A and 16B are explanatory diagrams of a preamble waveform having no phase error and a preamble waveform having a phase error in a method of obtaining a phase offset by a phase comparison of a preamble interval.
Figure 16B:
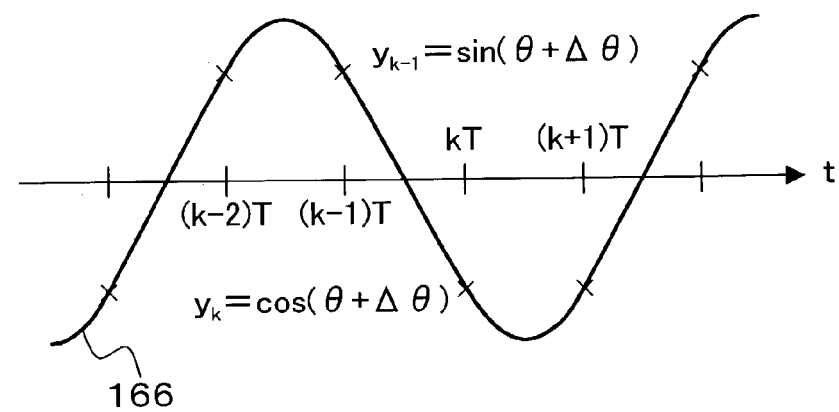

Subsequently, a detecting principle of the phase error in the phase offset detector 70 in FIGS. 14A and 14B will be described in detail. FIGS. 16A and 16B are diagrams for explaining a detecting method of the phase error by a phase comparing method. A preamble waveform 164 in FIG. 16A has no phase error. On the other hand, a preamble waveform 166 in FIG. 16B has a phase error Δθ. Assuming that the symbol rate is equal to T, the preamble waveform 164 in FIG. 16A has a period 4T and has sampling points (ref2), (ref1), (-ref2), and (-ref1) at times (k-2)T to (k+1)T. Since the preamble waveform 162 can be regarded as a sine waveform and a cosine waveform, the following relations are obtained.

(ref1)=sin θ

(ref2)=cos θ

Assuming that the preamble waveform 164 in FIG. 16A is set to the reference signal and the preamble waveform 166 in FIG. 16B is set to the sampling signal, the phase error Δθ of the sampling signal is given by the following equations.

$$\Delta\theta = \tan^{-1}\left(\frac{\sin\Delta\theta}{\cos\Delta\theta}\right) \quad (9)$$

$$= \tan^{-1}\left(\frac{\sin(\theta + \Delta\theta - \theta)}{\cos(\theta + \Delta\theta - \theta)}\right)$$

$$= \tan^{-1}\left(\frac{\sin(\theta + \Delta\theta)\cos\theta - \sin\theta\cos(\theta + \Delta\theta)}{\cos(\theta + \Delta\theta)\cos\theta + \sin\theta\sin(\theta + \Delta\theta)}\right)$$

$$= \tan^{-1}\left(\frac{-ref_2 \cdot y_{k-1} - ref_1 \cdot y_k}{-ref_2 \cdot y_k + ref_1 \cdot y_{k-1}}\right)$$

$$= \tan^{-1}\left(\frac{ref_1 \cdot y_k + ref_2 \cdot y_{k-1}}{ref_2 \cdot y_k - ref_1 \cdot y_{k-1}}\right)$$

In the detection of the initial phase error of the invention, a read waveform of the preamble interval in the sector is handled as a periodic waveform, specifically speaking, as a sine wave and the phase error Δτ between the signal point and the sampling point is detected from its correlation function. The correlation function in this case is obtained by a method whereby the products of the sine signal serving as a reference and the sampling signals are addition-averaged in an area of a length which is integer times as long as the period of the sine signal as a reference.

Figure 17A:
FIGS. 17A and 17B are explanatory diagrams of a calculating method of a correlation at time kTs in the case where a reference is used as a sine signal.
Figure 17B:
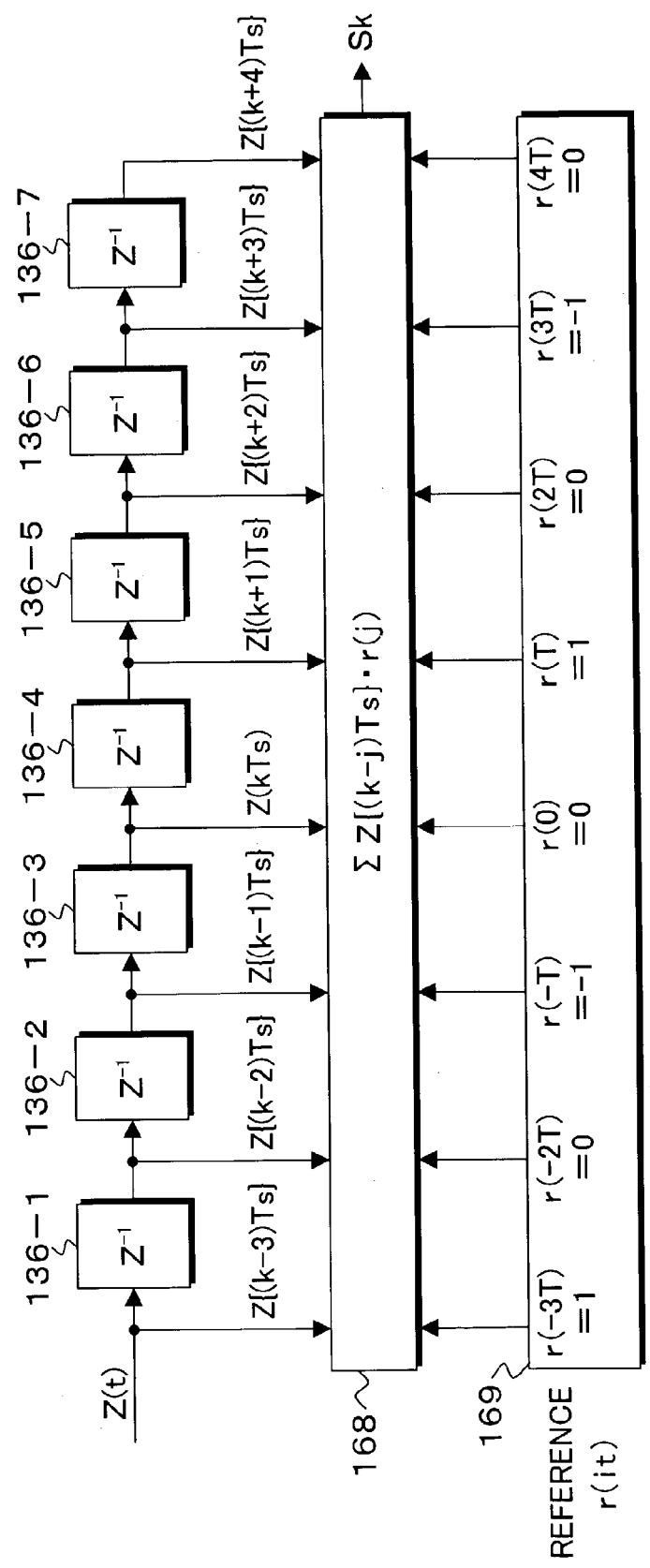

FIGS. 17A and 17B are diagrams showing a calculating step of the correlation Sk at the time when the reference is set to the sine signal. That is, FIG. 17A shows times (k-3)Ts to (k+4)Ts in the interval of a length which is integer times as long as the period of the reference sine signal to obtain the correlation. As a circuit block for calculating the correlation Sk, FIG. 17B shows the delay circuits 136-1 to 136-7 which are cascade-connected and a product sum arithmetic operating unit 168. The product sum arithmetic operating unit 168 receives the signal points at times (k−3)Ts to (k+4)Ts of a sampling signal Z(t) as Z(k−3)Ts to Z(k+4)Ts from taps of the delay circuits 136-1 to 136-7, receives r(−3T) to r(−4T) =1, 0, −1, 0, 1, 0, −1, 0 as reference sine signals, and obtains an addition average of products of both of them. That is, the reference sine signal r(t) of the symbol rate can be regarded as a preamble signal of the period 4T as shown in FIG. 16A.

$$r(t) = \sin\left(\frac{2\pi}{4T} \cdot t\right) \tag{10}$$

In this case, the correlation $S_k$ which is obtained in the case where the reference that is outputted from the product sum arithmetic operating unit 168 is set to the sine signal is given by the following equations (11).

$$S_k = \sum_{i=-3}^{4} Z\{(k-i)T_s\} \cdot r(iT) \tag{11}$$
$$= Z\{(k-3)T_s\} - Z\{(k-1)T_s\} +$$
$$Z\{(k+1)T_s\} - Z\{(k+2)T_s\}$$

where, an oversampling rate (a) of the sampling rate Ts for the symbol rate T is obtained by $$a = T/Ts$$

For example, since the oversampling is executed at a frequency which is higher than the symbol rate by about 5%, (a−1) is equal to an extremely small value.

As shown in the product sum arithmetic operating unit 168 in FIG. 17B, a sampling signal Z(kTs) and a reference signal r(it) are sine waves and they are odd functions in which the value is equal to "0" at time kTs. As the time is away from time kTs, the phase error Δτ between the sampling signal Z(kTs) and reference signal r(it) advances at timing before time kTs and is delayed at timing after time kTs every (i/2)a. Therefore, a phase deviation which is caused due to the oversampling is set off when it is seen from time kTs. The correlation Sk which is obtained when the reference signal is assumed to be the sine signal can be approximated by the following equation.

$$S_k = C(\mu_k T_s) \tag{12}$$

where, $\mu_k T_s$: phase error amount

C: correlation function

Figure 18:
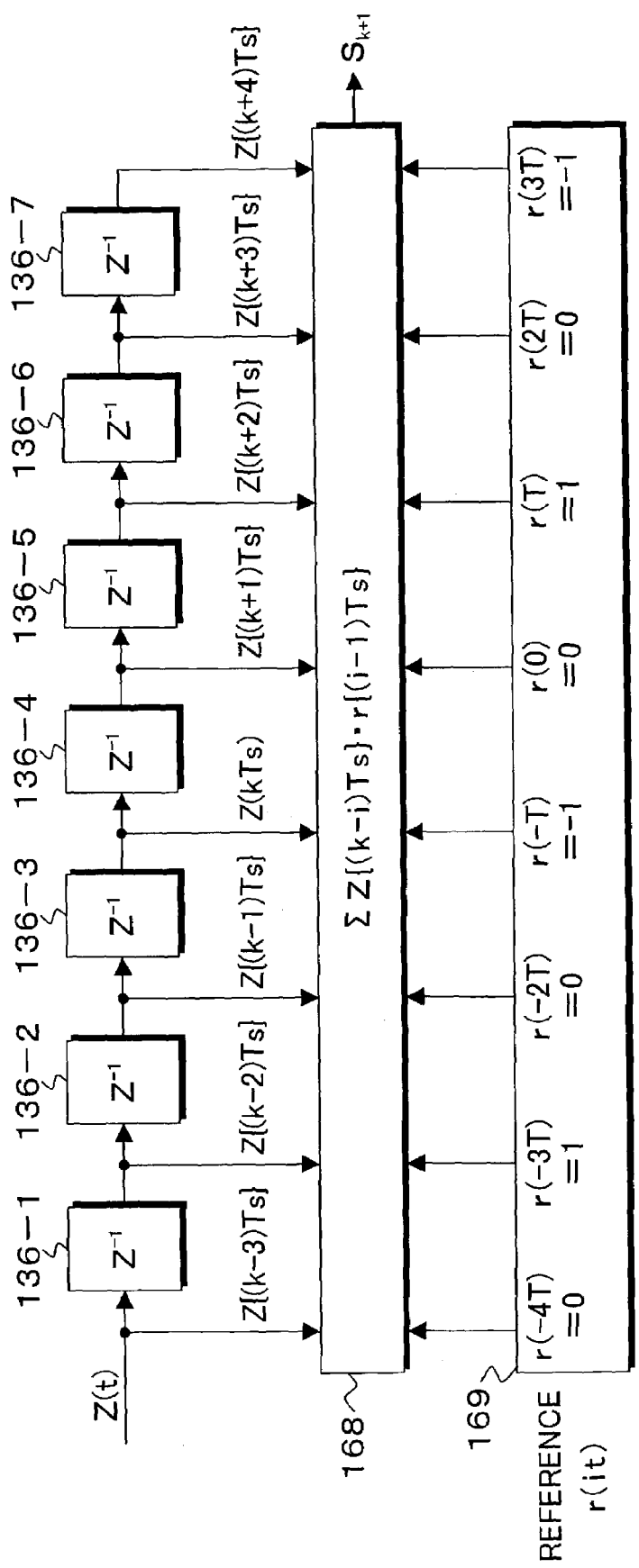
FIG. 18 is an explanatory diagram of a calculating method of a correlation in the case where a reference at next time (k+1)Ts is used as a sine signal.

FIG. 18 is a diagram showing an arithmetic operation of a correlation Sk+1 at next time (k+1)Ts for FIG. 17B. At this time (k+1)Ts, the correlation Sk+1 can be similarly obtained by the following equations by shifting a reference sine signal r(iT) by the time corresponding only to the symbol rate T.

$$S_{k+1} = \sum_{i=-3}^{4} Z(k-i) \cdot r\{(i-1)T\} \tag{13}$$
$$= Z\{(k-2)T_s\} - Z(kT_s) + Z\{(k+2)T_s\} - Z\{(k+4)T_s\}$$
$$\approx C(\mu_{k+1} T_s)$$

Figure 19:
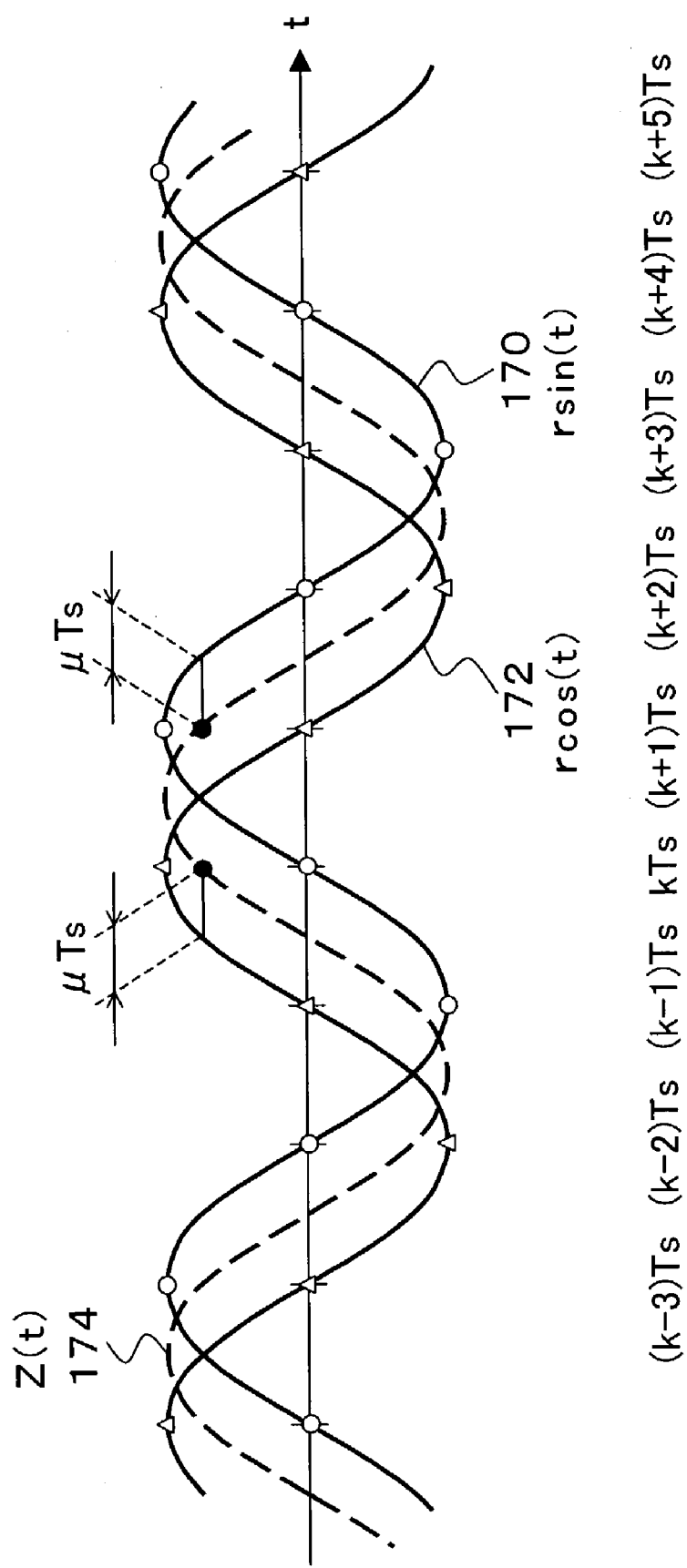
FIG. 19 is a waveform explanatory diagram showing a cosine signal serving as a reference together with the sine signal and a sampling signal.

FIG. 19 is an explanatory diagram for calculating a correlation in the case where the reference is set to a cosine signal. A reference sine signal 170 of the symbol rate T is shown as r sin(t) and a reference cosine signal 172 of the symbol rate T is likewise shown as r cos(t). Further, a sampling signal 174 of the sampling rate Ts is shown as Z(t). There is a phase error of π/2 between the reference sine signal 170 and reference cosine signal 172. There is a phase error of (μTs) between the sampling signal 174 and each of the reference sine signal 170 and reference cosine signal 172. A correlation Ck regarding the case where a reference signal r(t) is set to the cosine signal of r(t)=r cos(t) is obtained by the following equations.

$$C_k = \sum_{i=-3}^{4} Z(k-i)r\cos(iT) \tag{14}$$
$$= \sum_{i=-3}^{4} Z(k-i)r\sin\left(iT + \frac{\pi}{2}\right)$$
$$= \sum_{i=-3}^{4} Z(k-i)r\sin\{(i+1)T\}$$
$$= C(\mu_k T_s + T)$$

A correlation Ck+1 in the case where the reference at next time (k+1)Ts is set to the cosine signal is obtained by the following equation in a manner similar to the case where the reference shown in FIGS. 16A and 16B is set to the sine signal.

$$C_{k+1} = C(\mu_{k+1} T_s + T) \tag{15}$$

A correlation function of a preamble waveform will now be described. A preamble waveform serving as a reference is expressed by $r(t) = A \sin \omega t$ or $r(t) = A \cos \omega t$ where, ω=2π/T T: symbol rate A preamble signal read out by the head is assumed to be $x(t) = A_0 \sin(\omega_0 t + \tau)$ or $x(t) = A_0 \cos(\omega_0 t + \tau)$ The preamble signal x(t) can be considered to have almost the same waveform as that of the reference signal except for the phase error τ.

$x(t) \approx r(t+\tau) \tag{16}$

Therefore, a time average obtained by multiplying the preamble waveform signal r(t) as a reference by the read-out preamble signal x(t) can be regarded as a correlation function Cτ of the preamble waveform r(t) as a reference and can be expressed by the following equations.

$$C(\tau) = \overline{r(t) \cdot x(t)} \quad (17)$$
$$= \overline{r(t) \cdot r(t+\tau)}$$
$$= \lim_{T \to \infty} \frac{1}{T} \int_{-T/2}^{T/2} r(t) \cdot r(t+\tau) dt$$
$$= \frac{1}{2} A^2 \cos(\omega t) \text{ (where, } r(t) = \sin\omega t)$$
$$= \frac{1}{2} A^2 \sin(\omega t) \text{ (where, } r(t) = \cos\omega t) \quad (18)$$

If the correlation function $C\tau$ is expressed by a preamble waveform $r(iT)$ as a reference sampled at the symbol rate T and the read-out preamble signal $x(iT)$, it is obtained by the following equations.

$$C(\tau) = \frac{1}{N} \sum_{i=N_1}^{N_2} \{r(iT) \cdot r(iT+\tau)\} \text{ where, } N = N_2 - N_1, N_1 \langle 0, N_2 \rangle 0$$
$$= \frac{1}{N} \sum_{i=N_1}^{N_2} \{r(iT) \cdot x(iT)\}$$
$$= \frac{1}{N} \sum_{i=N_1}^{N_2} \left\{\sin\left(2\pi \frac{1}{4T} iT\right) \cdot x(iT)\right\}$$
$$= \frac{1}{N} \sum_{i=N_1}^{n_2} \left\{\sin\left(\frac{\pi}{2} i\right) \cdot x(iT)\right\}$$
$$= \frac{1}{N} \{\cdots (-1) \cdot x(-T) + 0 \cdot x(0) + 1 \cdot x(T) + 0 \cdot x(2T) + (-1) \cdot x(3T)\}$$

Figure 20:
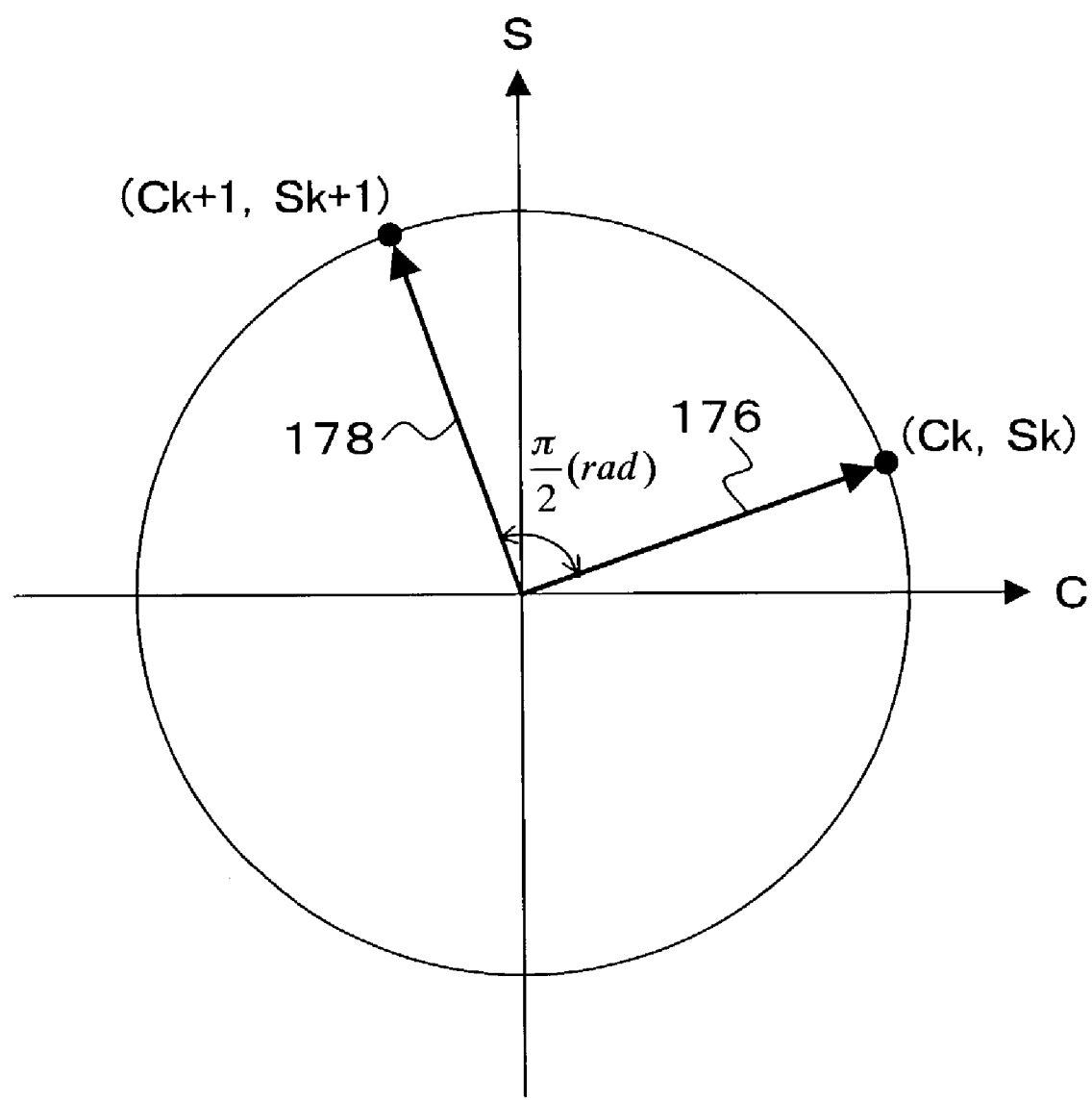
FIG. 20 is an explanatory diagram of correlation vectors of a preamble signal for a reference circle of a C-S correlation space at the time when a symbol rate and a sampling rate are equal.

FIG. 20 is a diagram in which a correlation space normalized with respect to the correlations Sk and $C_k$ at time k which are obtained by the equations (1), (11), (12), (13), and (15) at the time when the symbol rate T and the sampling rate Ts are equal and the correlations Sk+1 and Ck+1 at next time k+1 is expressed by vectors. First, a vector 176 is given by the correlations (Sk, Ck) at time kT. On the other hand, according to a preamble pattern, the phase advances to $\pi/2$ (rad) for a period of time of 1T=1Ts and the vector 176 is rotated to a vector 178 of the correlations (Ck+1, Sk+1).

Figure 21:
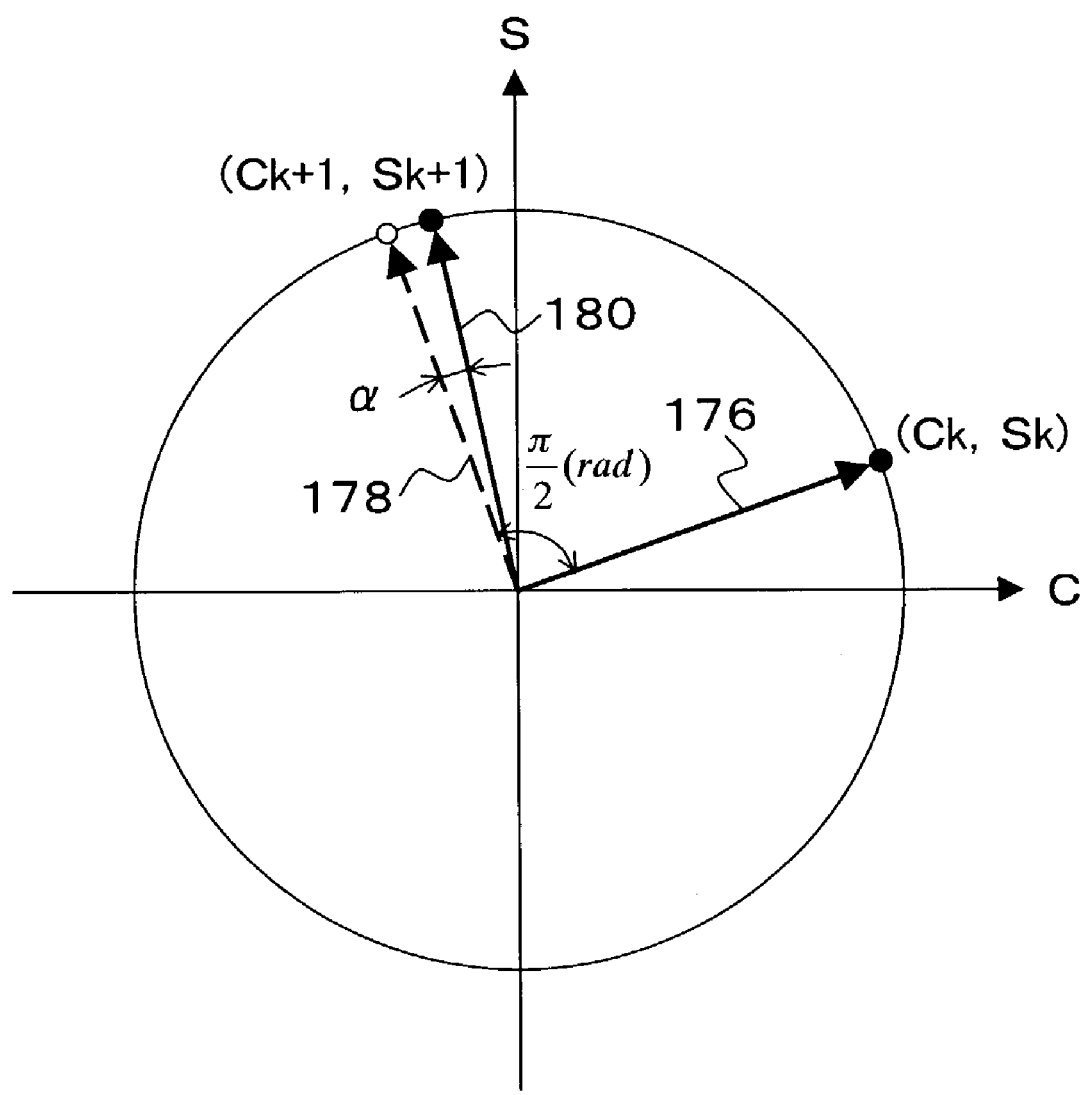
FIG. 21 is an explanatory diagram of correlation vectors of the preamble signal for the reference circle of the C-S correlation space at the time when oversampling is performed for the symbol rate.

FIG. 21 is an explanatory diagram of a correlation space of correlations (C, S) in the oversampling in the case where the sampling rate Ts is smaller than the symbol rate T. In the case of this oversampling, as compared with the vector 176 existing in one dimension of the correlations (Ck, Sk), a vector 180 of the correlations (Ck+1, Sk+1) of the next dimension has a rotation of a phase which is smaller by $\pi/2$ than that of the vector 176 obtained at the time when the symbol rate T is equal to the sampling rate Ts and oversampling. Now, the oversampling rate is assumed to be (a) (a is larger than 1), the sampling rate Ts has the following relation between Ts and the symbol rate T.

Ts=aT

At this time, a phase change amount for a time interval between time kTs and next time. (k+1)Ts is equal to $(1/a)(\pi/2)$ [rad]

Therefore, a phase error a between the vector 180 upon oversampling and the vector 176 in FIG. 21 is as follows.

$$\alpha = \left(1 - \frac{1}{a}\right) \cdot \frac{\pi}{2} \quad (20)$$

That is, at a symbol rate 1T [sec], as shown in FIG. 20, the phase changes to $(\pi/2)$ [rad] for a time interval between time kTs and time (k+1)Ts. On the other hand, at the time of the oversampling, as shown in FIG. 21, the phase changes to $(\pi/2-\alpha)$ [rad]. Therefore, a relation between the vectors 176 and 180 upon oversampling is obtained by the following equation.

$$\begin{pmatrix} C_{k+1} \\ S_{k+1} \end{pmatrix} = \begin{pmatrix} \cos(\pi/2-\alpha), & -\sin(\pi/2-\alpha) \\ \sin(\pi/2-\alpha), & \cos(\pi/2-\alpha) \end{pmatrix} \begin{pmatrix} C_k \\ S_k \end{pmatrix} \quad (21)$$

By modifying the equation (21), the following equation is obtained.

$$\begin{pmatrix} C_{k+1} \\ S_{k+1} \end{pmatrix} = \begin{pmatrix} \sin\alpha & -\cos\alpha \\ \cos\alpha & \sin\alpha \end{pmatrix} \begin{pmatrix} C_k \\ S_k \end{pmatrix} \quad (22)$$

By deleting the correlation Ck in the equation (22), the correlation Ck+1 becomes as follows.

$$C_{k+1} = \tan\alpha \cdot S_{k+1} - \frac{1}{\cos\alpha} \cdot S_k \quad (23)$$

As will be obviously understood from the equation (23), the correlation Ck+1 in the case where the reference is set to the cosine wave can be derived from the correlations Sk and Sk+1 in the case where the references at time kTs and time (k+1)Ts are set to the sine waves.

Figure 22:
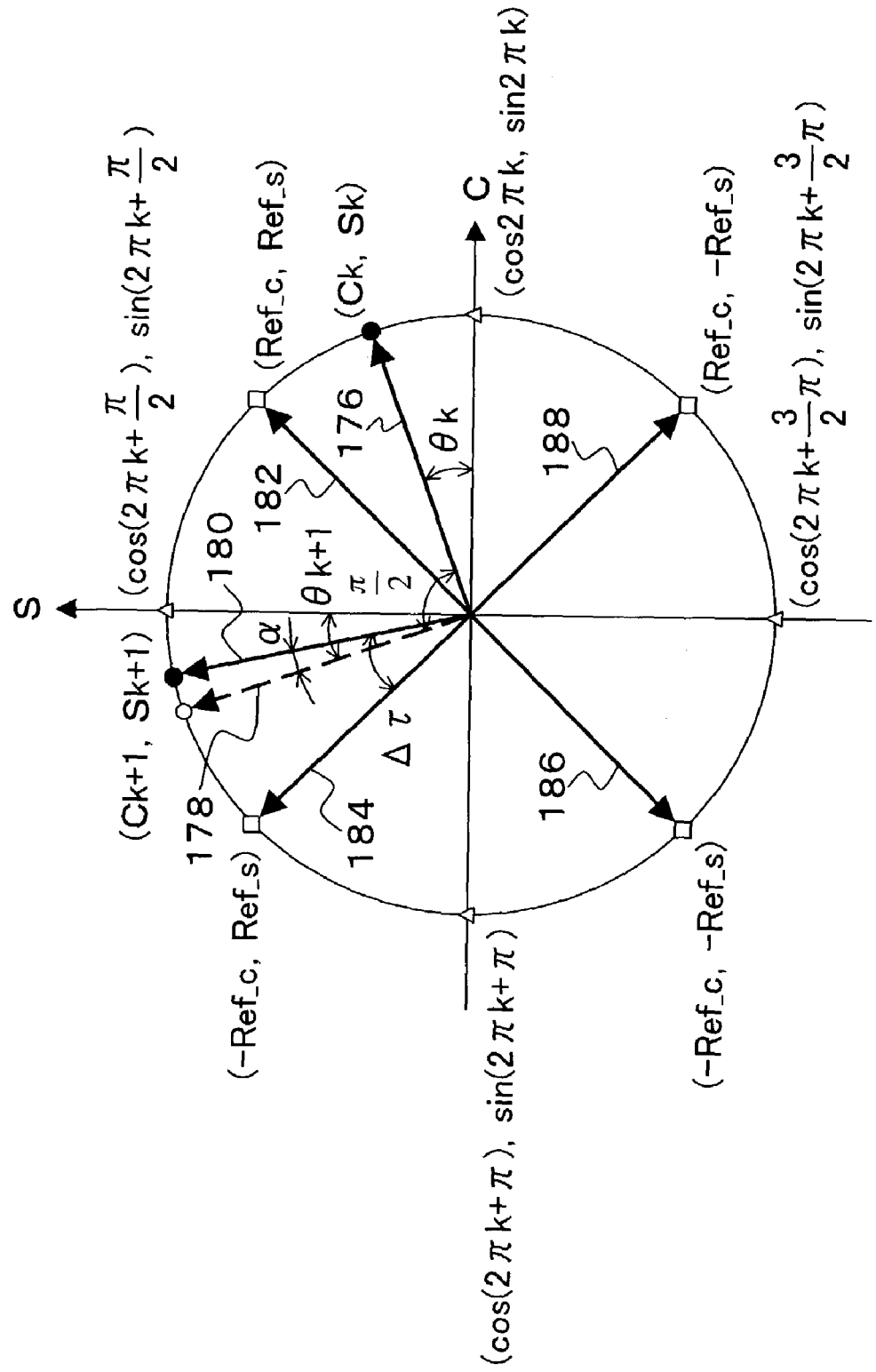
FIG. 22 is an explanatory diagram showing phase errors of the correlation vectors in the case where the oversampling is performed for the vectors of the correlation of an ideal symbol rate serving as a target with respect to FIG. 21.

FIG. 22 is a diagram in which vectors 182, 184, 186, and 188 serving as timings of an ideal symbol rate are shown in the correlation space of FIG. 21 and shows relations among the vectors due to the oversampling and the vectors of this symbol rate. Each of the vectors 182, 184, 186, and 188 is expressed by levels Ref-c and Ref-s of target preambles. The correlations (Ck+1, Sk+1) of the vector 180 due to the oversampling are expressed as follows.

$$\begin{cases} C_{k+1} = \cos(\theta_{k+1}) = \tan\alpha \cdot S_{k+1} - \frac{\cos(\theta_{k+1}) + \sin(\theta_{k+1})\cos(\theta_{k+1} + \Delta\tau)}{\cos(\theta_{k+1} + \Delta\tau)\cos(\theta_{k+1}) + \cos\sin(\theta_{k+1})\sin(\theta_{k+1} + \Delta\tau)} \\ S_{k+1} = \sin\Delta\tau \end{cases} \quad (25)$$

$$= \tan^{-1}\left(\frac{\text{Ref\_C} \cdot C_{k+1} + \text{Ref\_S} \cdot S_{k+1}}{-\text{Ref\_S} \cdot C_{k+1} + \text{Ref\_C} \cdot S_{k+1}}\right)$$

The phase offset detector 70 in FIGS. 14A and 14B executes an arithmetic operation by the equations (25) and detects the phase error $\Delta\tau$ as a phase offset, thereby allowing the digital PLL operation due to the zero phase start to be executed by the resetting to the digital accumulator 65. The phase offset detector 70 inputs the outputs (−1, 1, −1, 1) from the delay circuits 136-1, 136-3, 136-5, and 136-7 to the adder 138 as products of the reference sine signal and the sampling signals, obtains the sum of them, and generates the correlation Sk at the time when the reference is set to the sine waveform. The phase offset detector 70 inputs the outputs (1, −1, 1, −1) from the FIR filter 56 and the delay circuits 136-2, 136-4, and 136-6 which are obtained at next time (k+1)Ts as products of the reference sine signal and the sampling signals, obtains the sum of them, and generates the correlation Sk+1. The multipliers 142 and 148, adder 146, and registers 144 and 150 provided subsequently to the adders 138 and 140 execute an arithmetic operation of the equation (23) and obtain the correlation Ck+1 in the case where the reference at time (k+1)Ts is set to the cosine signal. One of the correlation Sk+1 at time (k+1)Ts and the correlation Ck+1 calculated subsequently is sequentially selected by the selector 152 and inputted to the arithmetic operating unit 154. The arithmetic operating unit 154 executes arithmetic operations of the equations (25), calculates the phase error $\Delta\tau$ of the oversampled sampling signal for the target symbol rate, and presets it into the digital accumulator 65 provided in the digital VCO 75 in FIG. 13. As mentioned above, in the phase offset detector 70 of the invention, the correlations Sk and Ck are calculated by using the adders 138 and 140 from taps of the delay circuits 136-1 to 136-7 which are cascade-connected and construct an FIR type interpolating filter, the phase error $\Delta\tau$ of the next symbol is calculated by the circuit comprising the component elements up to the arithmetic operating unit 154, and the digital accumulator 65 in the digital VCO is initialized, thereby allowing the initial phase error in the digital PLL to approach 0 [rad] and enabling the phase lead-in for timing recovery using the preamble signal to be advanced. In the invention, an influence by noises can be suppressed because the correlations Sk and Sk+1 are obtained by an addition average of a plurality of samples. Since the discrimination result of the data is unnecessary, an error is hard to occur in the detection of the phase error. In the digital PLL loop which executes the oversampling, since the correction by the oversampling is made, the error upon discrimination at the symbol rate can be minimized. Further, since the phase offset detector 70 of the invention calculates the phase error $\Delta\tau$ by using the same timing as that of the FIR interpolating filter 64, the accurate phase error can be fed back, thereby enabling the lead-in of the digital PLL loop to be advanced.

In the above embodiment, although the target waveform in which the preamble waveform is the sine wave or cosine wave has been handled, if the preamble waveform is asymmetric, the phase error $\Delta\theta$ is calculated by the comparing method of the equations (9). Specifically speaking, with respect to the asymmetric preamble waveform, for example, the vector rotation is performed so that the references become symmetric like two sampling points at time kT and one-preceding time (k−1)T on the sine wave of FIG. 16A, that is, the phase is shifted, thereby calculating the phase error $\Delta\theta$ from the equations (9) by the level comparing method with respect to two continuous and symmetric samples.

Details of Frequency Offset Detection

Figure 23:
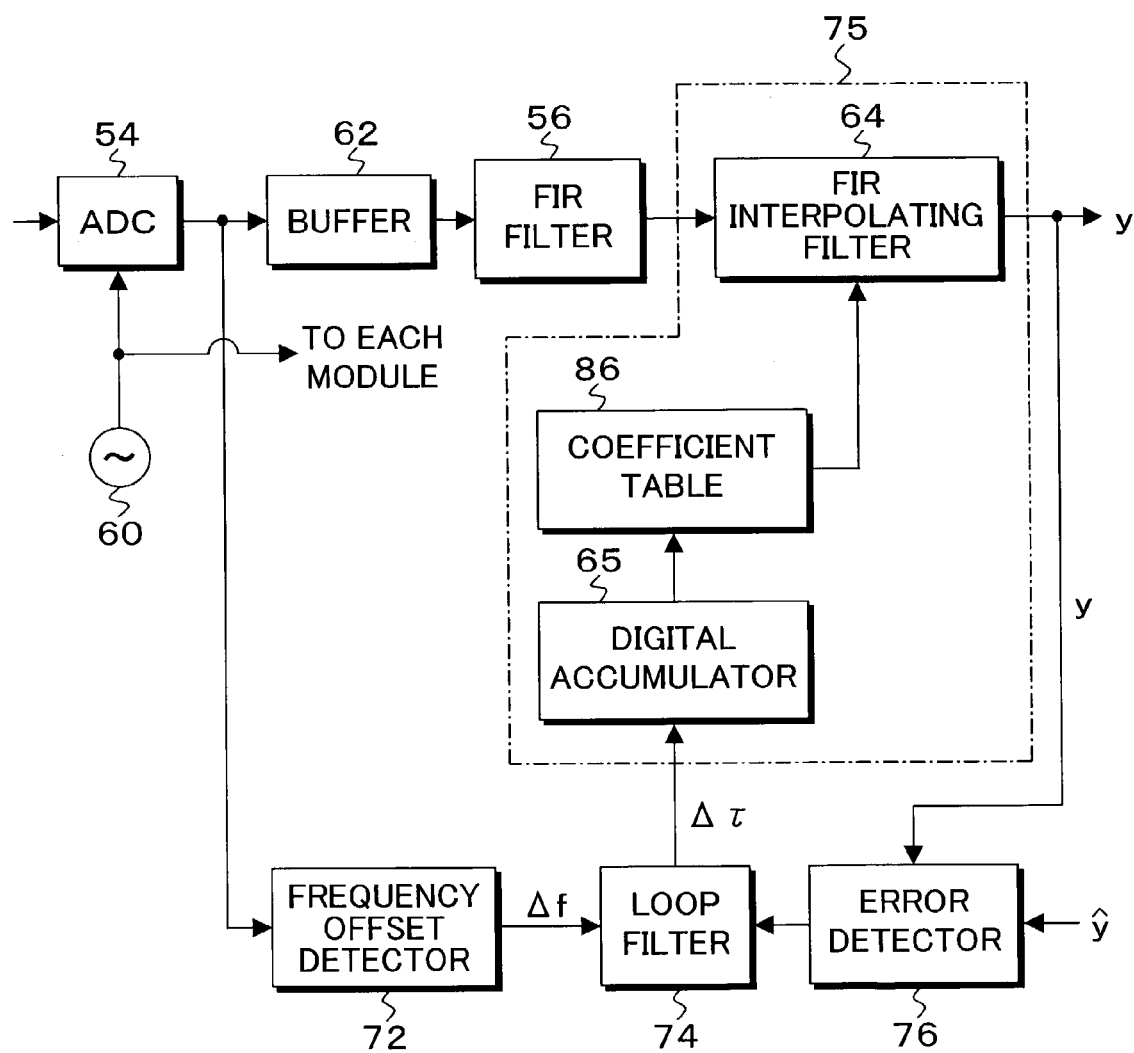
FIG. 23 is a block diagram showing a portion of a digital PLL loop of the loop lead-in by the frequency offset detection in FIGS. 12A and 12B.

FIG. 23 is a block diagram showing the portion of the timing recovery (timing reproduction loop) for performing the loop lead-in by detecting a frequency offset and initially setting it at the time of the timing recovery in the embodiment of FIGS. 12A and 12B. The portion of FIG. 23 comprises the A/D converter 54, clock oscillator 60, buffer 62, FIR filter 56, FIR interpolating filter 64, error detector 76, loop filter 74, digital accumulator 65, and further, coefficient table 86 extracted from the FIR interpolating filter 64. Among them, the digital PLL loop for timing recovery comprises the error detector 76, loop filter 74, digital accumulator 65, coefficient table 86, and FIR interpolating filter 64 subsequent to the FIR filter 56. The digital VCO 75 is constructed by the digital accumulator 65, coefficient table 86, and FIR interpolating filter 64, and its construction and operation are substantially the same as those in the embodiment of the detection of the phase error and the loop lead-in by its initial setting shown in FIGS. 13, 14A, and 14B. For such a digital PLL loop, the frequency offset detector 72 is provided to detect the frequency offset and initially set it. The frequency offset detector 72 handles the read waveform of the preamble interval in the sector as a waveform approximated to the sine wave, divides it into blocks by a length that is integer times as long as the read waveform, obtains a phase error $\Delta\omega k$ between the read waveform and the reference waveform every block, detects the frequency offset $\Delta f$ from a change rate of the phase error $\Delta\omega k$, presets the detected frequency offset into the loop filter 74, and executes the loop lead-in at the time of starting the PLL operation.

FIGS. 24A to 24E are time charts for the loop lead-in based on the detection of the frequency offset in the digital PLL loop in FIG. 23. FIG. 24A shows a recording format on a magnetic disk medium and shows a format structure in one sector subsequently to a gap 190. That is, a preamble 192 is provided subsequently to the gap 190. Subsequently, sync bytes 194 are provided. A data portion 196 is provided after them. As for such a medium format, as shown in FIG. 24B, a read gate signal E1 is made to be enable at time t1, so that the reading operation is started. The read gate signal E1 enters a gap 190-1 after the data portion 196 and is made to be disable. The read signal read out from the magnetic disk by the read gate signal E1 is oversampled by the A/D converter 54 in FIG. 23 by the fixed clock generated from the clock oscillator 60 and stored into the buffer 62. As will be clarified in the following explanation, the buffer 62 is a shift register of a predetermined number of stages, delays the read signal by a frequency detecting time Tf necessary for detecting the frequency offset $\Delta f$ in the frequency offset detector 72, and outputs the delayed signal. That is, as shown in FIG. 24D, a read gate signal E2 which was delayed by the predetermined frequency detecting time Tf is made to be enable at time t2. From this point of time, the read signal delayed by the buffer 62 is outputted to the FIR filter 56. The FIR filter 56 sequentially inputs a preamble 192-1, sync bytes 194-1, and a data portion 196-1 from time t2. Synchronously with a leading edge of the delayed read gate signal E2 in FIG. 24D, a loop filter initialization control signal E3 in FIG. 24E is outputted to the loop filter 74 in FIG. 23. At this time, since the frequency offset $\Delta f$ is detected in the frequency offset detector 72 for the frequency detecting time Tf between time t1 and time t2, the loop lead-in by the presetting of the frequency offset is executed by the loop filter 74 by using this value.

Figure 25A:
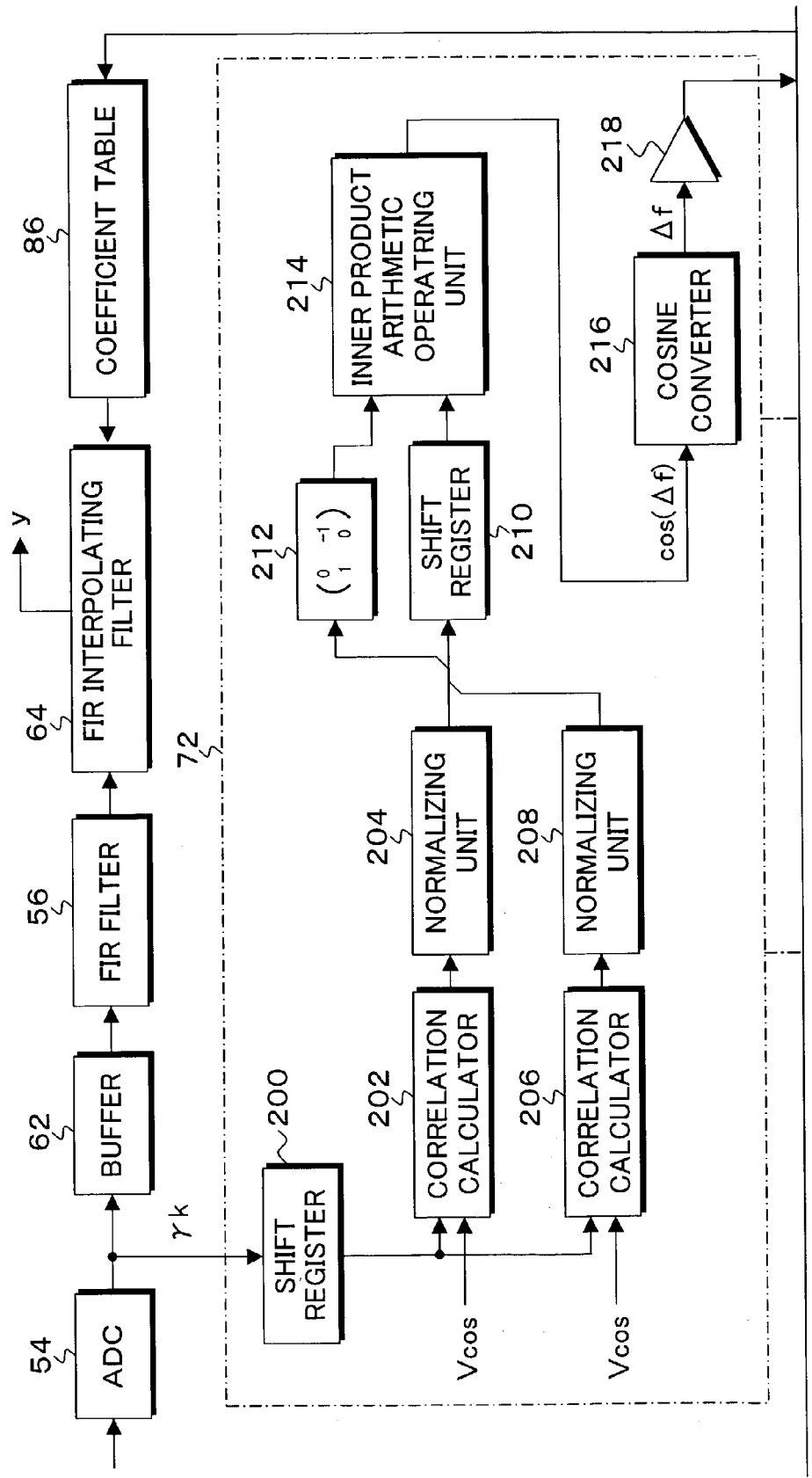
FIGS. 25A and 25B are block diagrams of a circuit construction of a frequency offset detector and a loop filter in FIG. 23.
Figure 25B:
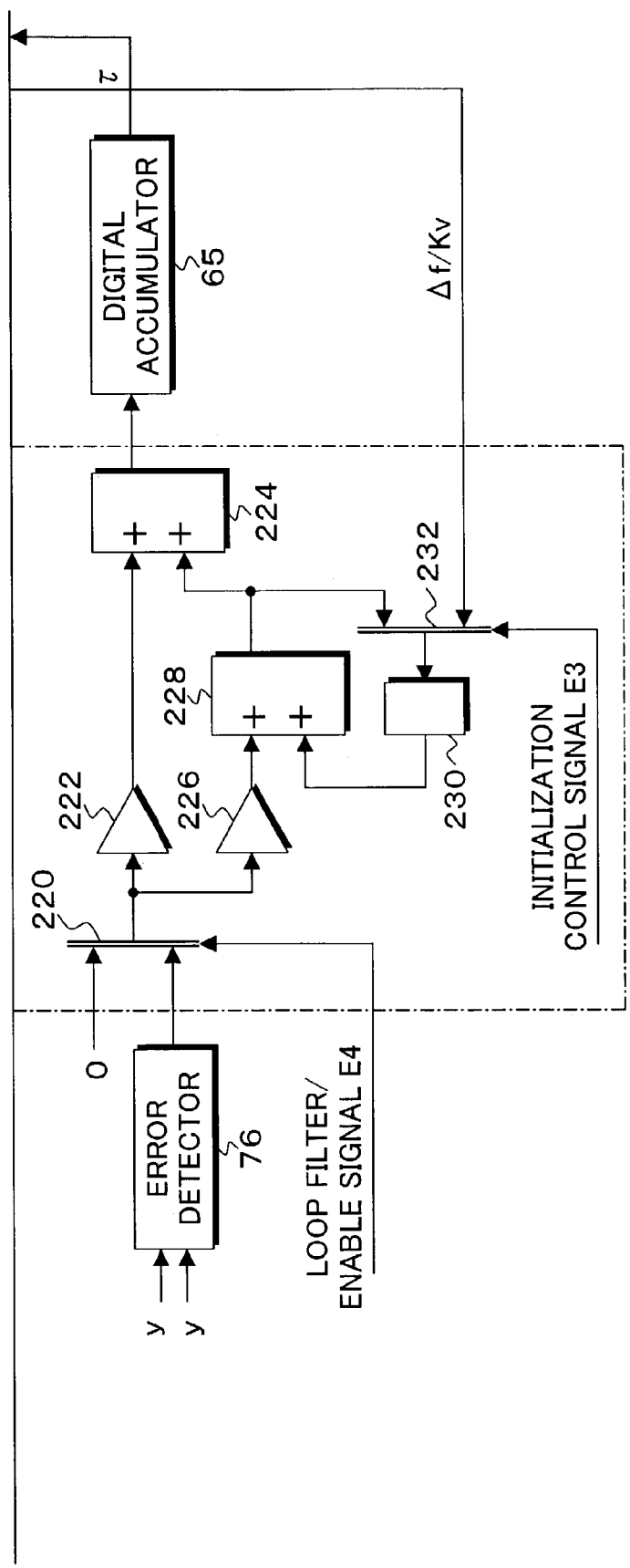

FIGS. 25A and 25B show details of the frequency offset detector 72 and loop filter 74 in FIG. 23 together with other circuit blocks. The frequency offset detector 72 comprises: a shift register 200; correlation calculators 202 and 206; normalizing units 204 and 208; a shift register 210; a vector rotating unit 212; an inner product arithmetic operating unit 214; a cosine converter 216; and an amplifier 218. The loop filter 74 comprises: a selector 220 which is made operative by a loop filter/enable signal E4; a proportional unit 222; an adder 224; an integrator 226; an adder 228; a register 230; and a selector 232 which is made operative by the initialization control signal E3.

Figure 26:
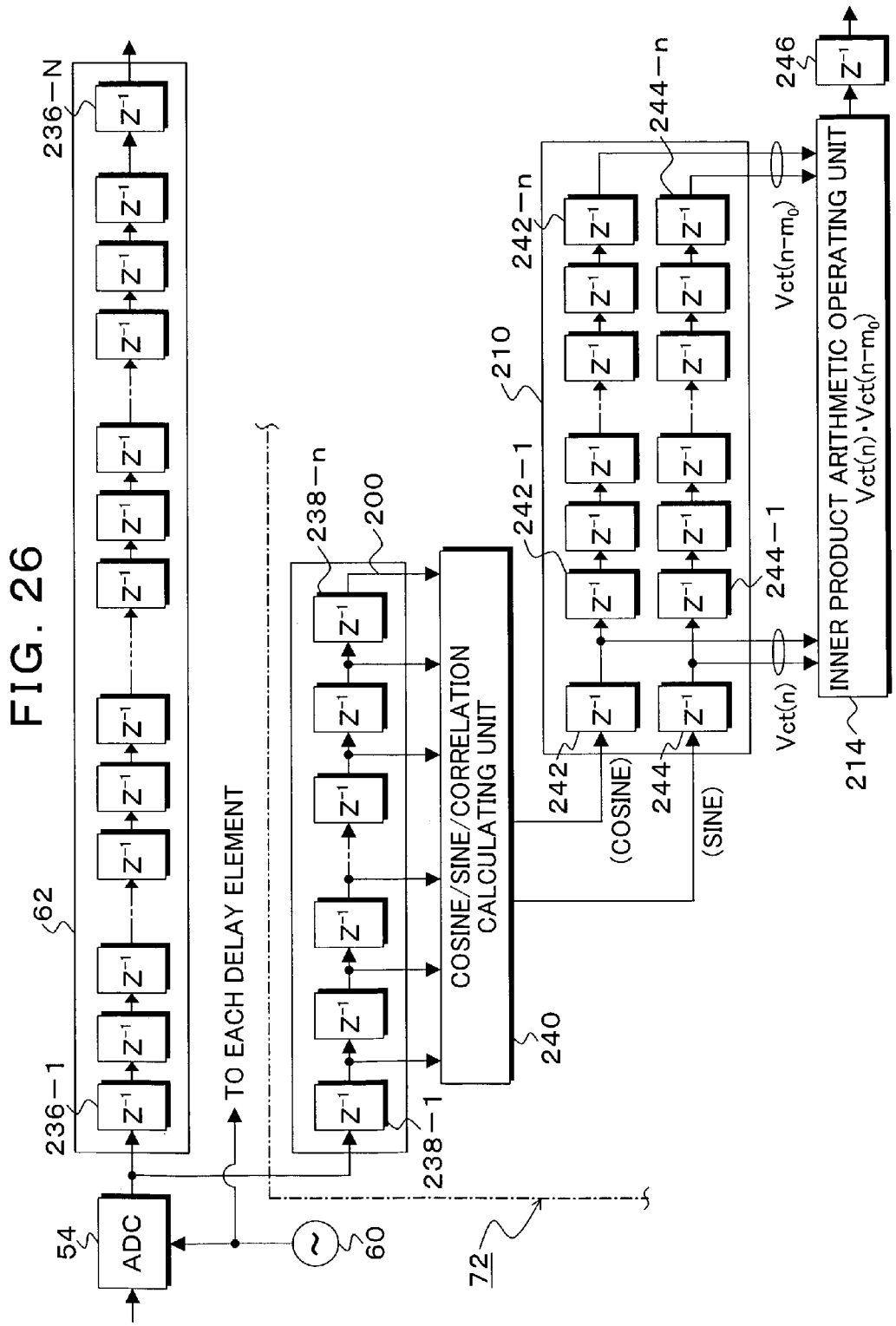
FIG. 26 is a circuit block diagram showing details of a buffer and registers in the frequency offset detector in FIGS. 25A and 25B.

FIG. 26 shows an embodiment of a specific circuit construction of the buffer 62 and frequency offset detector 72 in FIGS. 25A and 25B. Assuming that the number of samples which are used for detection of the frequency offset is equal to (n), in the buffer 62, N delay circuits 236-1 to 236-N are cascade-connected, thereby delaying the read signal by the predetermined frequency detecting time Tf. The delayed read signal is outputted to the FIR filter 56 which functions as an equalizer at the next stage. With respect to the frequency offset detector 72, the portion of the shift registers 200 and 210 shown in the frequency offset detector 72 in FIGS. 25A and 25B is specifically shown. That is, the shift register 200 is constructed by cascade-connecting (n) delay circuits 238-1 to 238-n in correspondence to the number (n) of samples which are used for detection of the frequency offset. In the shift register 210, delay circuits 242 and 244 are provided in correspondence to the correlation on the cosine side and the correlation on the sine side which are outputted from a cosine/sine/correlation calculating unit 240, respectively. Subsequent to them, delay circuits 242-1 to 242-n and 244-1 to 244-n are cascade-connected, respectively. With respect to component elements other than the shift registers 200 and 210, the correlation calculators 202 and 206 and normalizing units 204 and 208 in FIG. 25A are included in the cosine/sine/correlation calculating unit 240. The vector rotating unit 212 has fixedly been determined by outputs of the delay circuits 242 and 244 of the shift register 210. Further, with respect to component elements after the inner product arithmetic operating unit 214, only a delay circuit 246 is shown and component elements after the delay circuit 246 are omitted.

A frequency offset detecting method in the invention as mentioned above will now be described. First, the A/D converter 54 executes the oversampling of (a) times in accordance with the oversampling rate (a) for the symbol rate T. A sampling rate at this time is assumed to be Ts. Therefore, a relation shown by the following equation exists between the sampling rate Ts and symbol rate T.

Ts=aT

Now, assuming that the oversampling rate (a) is expressed by an integer ratio of (m) and (n), the sampling rate Ts is obtained by the following equation.

$$T_s = \frac{m}{n}T \quad (26)$$

where, m>n

Now, assuming that the read waveform of the preamble interval is set to a period 4T and a value of (n) is equal to a multiple of 4 at this time, m=4m$_0$ and the equation (26) becomes as follows.

$$nT_s=mT=m_0 \cdot 4T \quad (27)$$

Therefore, each time (n) preamble intervals are sampled, the sine waves of the period 4T as many as the number corresponding to the m$_0$ period are included and the same phase is repeated.

Figure 27:
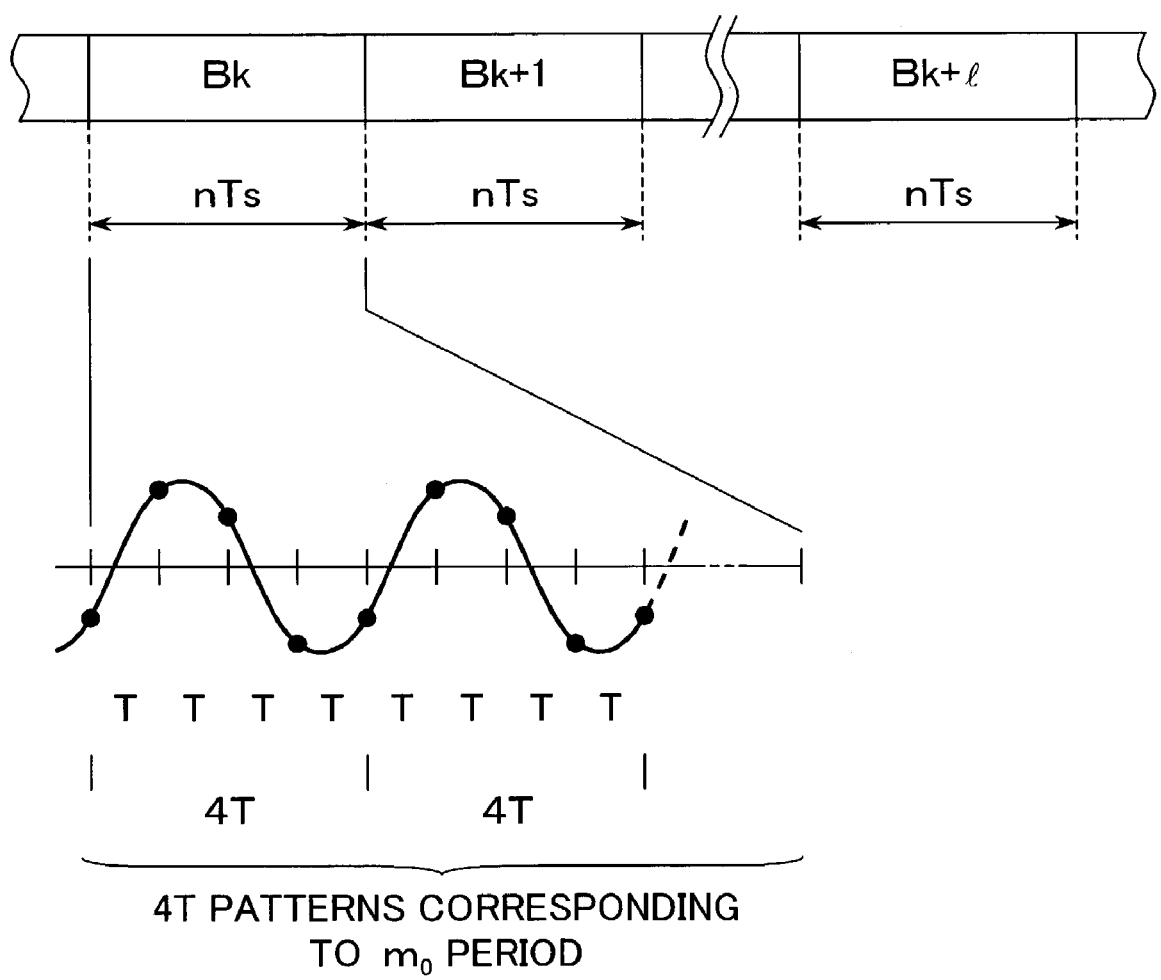
FIG. 27 is an explanatory diagram of a block division of a preamble interval which is executed in the frequency offset detection.

The above explanation is used as a prerequisite and in the frequency offset detection of the invention, the sampled preambles are divided into blocks Bk each consisting of (n) samples as shown in FIG. 27. If the frequency offset Δf of the read waveform is set to (Δf=0), the sine waves of the same phase are included in the block Bk. On the other hand, if the frequency offset Δf of the read waveform is set to (Δf≠0), the phase of the sine waves included in the block Bk changes in proportion to the frequency offset Δf. If such a change in symbol rate T due to the frequency offset is expressed by a symbol rate frequency fsyn, when there is no frequency offset, $$T=1/f_{syn} \quad (28)$$

A symbol rate T' in the case where the frequency offset Δf exists is $$T'=1/(f_{syn}+\Delta f) \quad (29)$$

A fluctuation rate α of the frequency is obtained as follows from the equations (28) and (29).

$$\alpha=f_{syn}/(f_{syn}+\Delta f) \quad (30)$$

Figure 28:
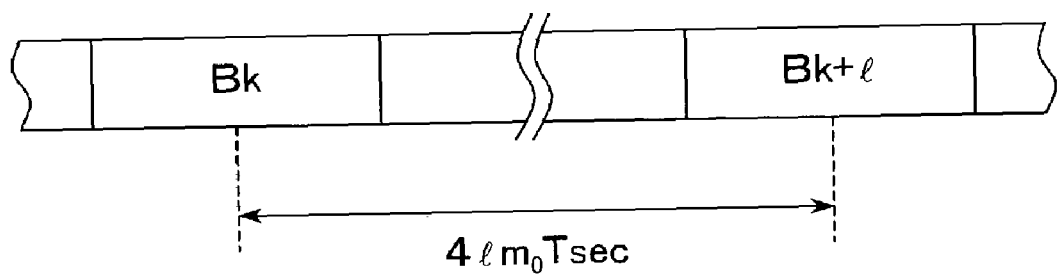
FIG. 28 is an explanatory diagram of a phase difference between points of a distant block.

In the detecting method of the frequency offset of the invention, the phase error Δω between the read waveform and the reference waveform is obtained every block divided as shown in FIG. 27. The frequency offset is detected from the change rate of the phase error between two blocks Bk and Bk+1 which are away from each other by one block as shown in FIG. 28. Therefore, the phase error Δω between the points which are away from each other by one block in FIG. 28 is as follows.

$$\Delta\omega = \alpha(4lm_0)\frac{\pi}{4}(\text{rad}) \quad (31)$$
$$= \alpha \cdot l \cdot m\pi(\text{rad})$$

Figure 29:
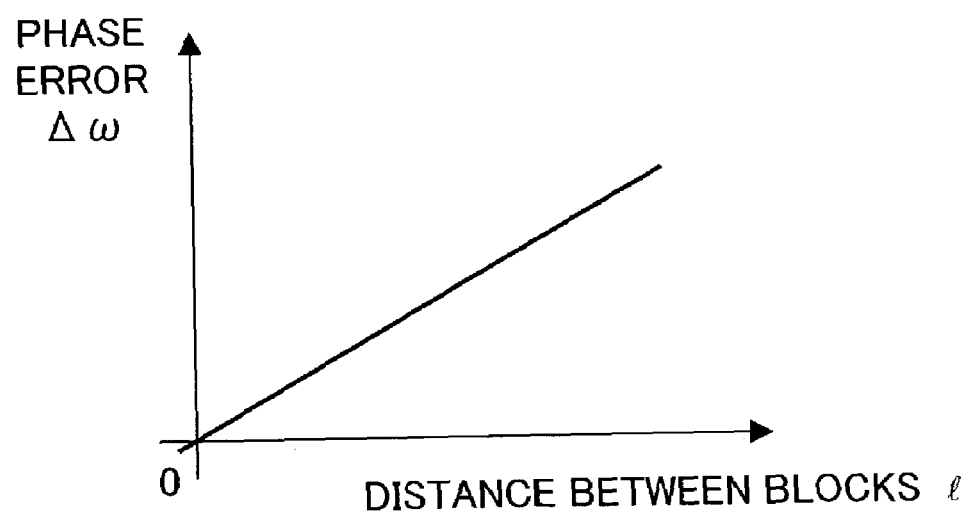
FIG. 29 is a graph showing a relation of the phase difference to a distance between the blocks.

Thus, between the phase error Δω which is given by the equations (31) and a distance (l) between the blocks, there is a relation such that the phase error Δω increases in proportion to the distance (l) as shown in FIG. 29.

Figure 30A:
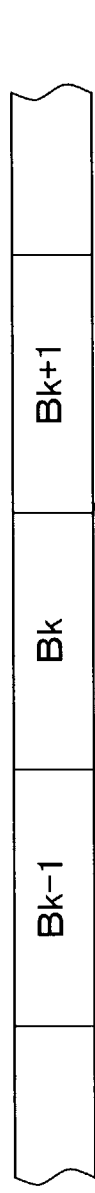
FIGS. 30A to 30D are explanatory diagrams of a sine wave reference, a cosine wave reference, and a read waveform in a block Bk in the preamble interval.

The detection of an average phase error in each block divided as shown in FIG. 28 will now be described. In a manner similar to the zero phase start as shown in FIGS. 13, 14A, and 14B such that the phase error is detected and preset into the digital accumulator 65 and the zero phase start is executed, by using the fact that the read waveform of the preamble is the sine wave, a phase error average in the block is obtained from the correlation function also in the detecting method of the frequency offset. In the block, it is regarded that T≈Ts and the change in phase due to the frequency offset Δf does not exist. Now, as shown in FIG. 30A, assuming that the signal included in the kth block Bk is set to x$_k$(iT$_s$)

where, N$_{B1}$≤i≤N$_{B2}$ the following equation is obtained.

$$B_k\{x_k(N_{B2} \cdot T_s), x_k((N_{B1}-1)T_s), \ldots x_k(0) \ldots ,$$
$$x_k((N_{B2}-1)T_s), x_k(N_B T_s)\} \qquad (32)$$

Therefore, a correlation between the signal Bk included in this block and the reference of the sine wave and a correlation between the signal Bk and the reference of the cosine wave are obtained. First, a sine reference signal Sref and a cosine reference signal Cref are given by the following equations.

$$\begin{cases} S_{ref} = \sin\left(\frac{2\pi}{4T} \cdot i \cdot T\right) \\ C_{ref} = \cos\left(\frac{2\pi}{4T} \cdot i \cdot T\right) \end{cases} \qquad (33)$$

where, $N_{B1} \leq i \leq N_{B2}$

Figure 30B:
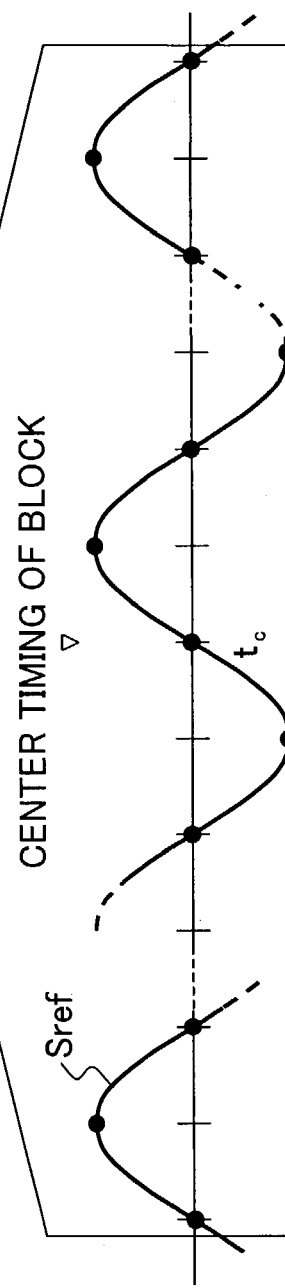
Figure 30C:
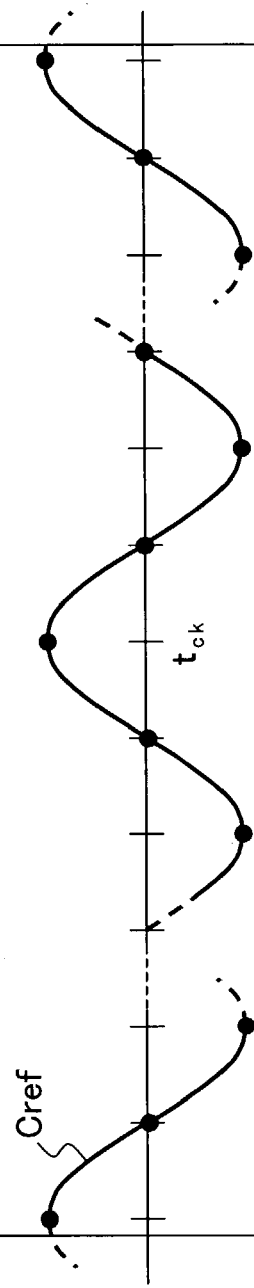

The sine reference signal Sref has a waveform shown in FIG. 30B. The cosine reference signal Cref has a waveform shown in FIG. 30C. Further, a phase error between the sine reference signal Sref and a preamble signal xk included in the kth block is assumed to be $\Delta\omega k$, a correlation Csk between the preamble signal and the sine reference signal and a correlation Csk between the preamble signal and the cosine reference signal are as follows.

$$\begin{cases} C_{sk} = \sum_{i=N_{B1}}^{N_{B2}} x(iT_s) \cdot \sin(\pi/2 \cdot i)/(N_{B2} - N_{B1}) \\ C_{ck} = \sum_{i=N_{B1}}^{N_{B2}} x(i \cdot T_s) \cdot \cos(\pi/2 \cdot i)/(N_{B2} - N_{B1}) \end{cases} \qquad (34)$$

Now, assuming that a phase error between the sine reference signal Sref and read signal xk is set to $\Delta\omega k$, the equations (34) are as follows.

$$\begin{cases} C_{sk} = A\cos(\Delta\omega_k) \\ C_{ck} = A\sin(\Delta\omega_k) \end{cases} \qquad (35)$$

Figure 30D:
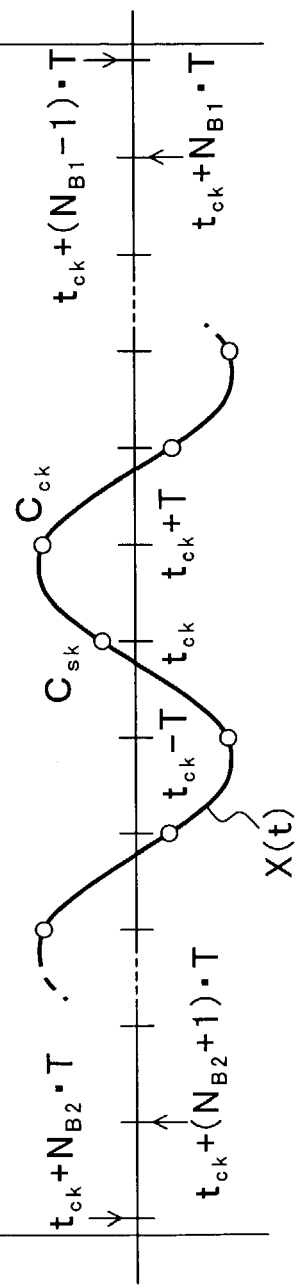

A preamble signal x(t) included in the kth block has a waveform shown in FIG. 30D. Therefore, the phase error $\Delta\omega k$ is given by the following equations.

$$\Delta\omega_k = \tan^{-1}(C_{ck}/C_{sk}) \qquad (36)$$
$$= \tan^{-1}(\sin(\Delta\omega_k)/\cos(\Delta\omega_k))$$

Subsequently, when a change rate of the phase error $\Delta\omega k$ is assumed to be $d\omega$, it is given by the following equation.

$$d\omega = (\Delta\omega_{(k+l)} - \Delta\omega_k)/l \qquad (37)$$

That is, the frequency offset $\Delta f$ is proportional to the change rate $\Delta\omega$ of the phase error $\Delta\omega k$ in the kth block. In other words, the frequency offset $\Delta f$ can be obtained by the following equation from a difference between the phase errors $\Delta\omega k$ in the blocks which are away by a predetermined interval.

$$\Delta f = K \cdot d\omega = K_0(\Delta\omega_{k+l} - \Delta\omega_k) \qquad (38)$$

By substituting the phase error $\Delta\omega k$ of the equations (36) into the equation (38), the following equation can be obtained.

$$\Delta f = K_0 \{\tan^{-1}(C_{c(k+l)}/C_{s(k+l)}) - \tan^{-1}(c_{ck}/C_{sk})\} \qquad (39)$$

Figure 31:
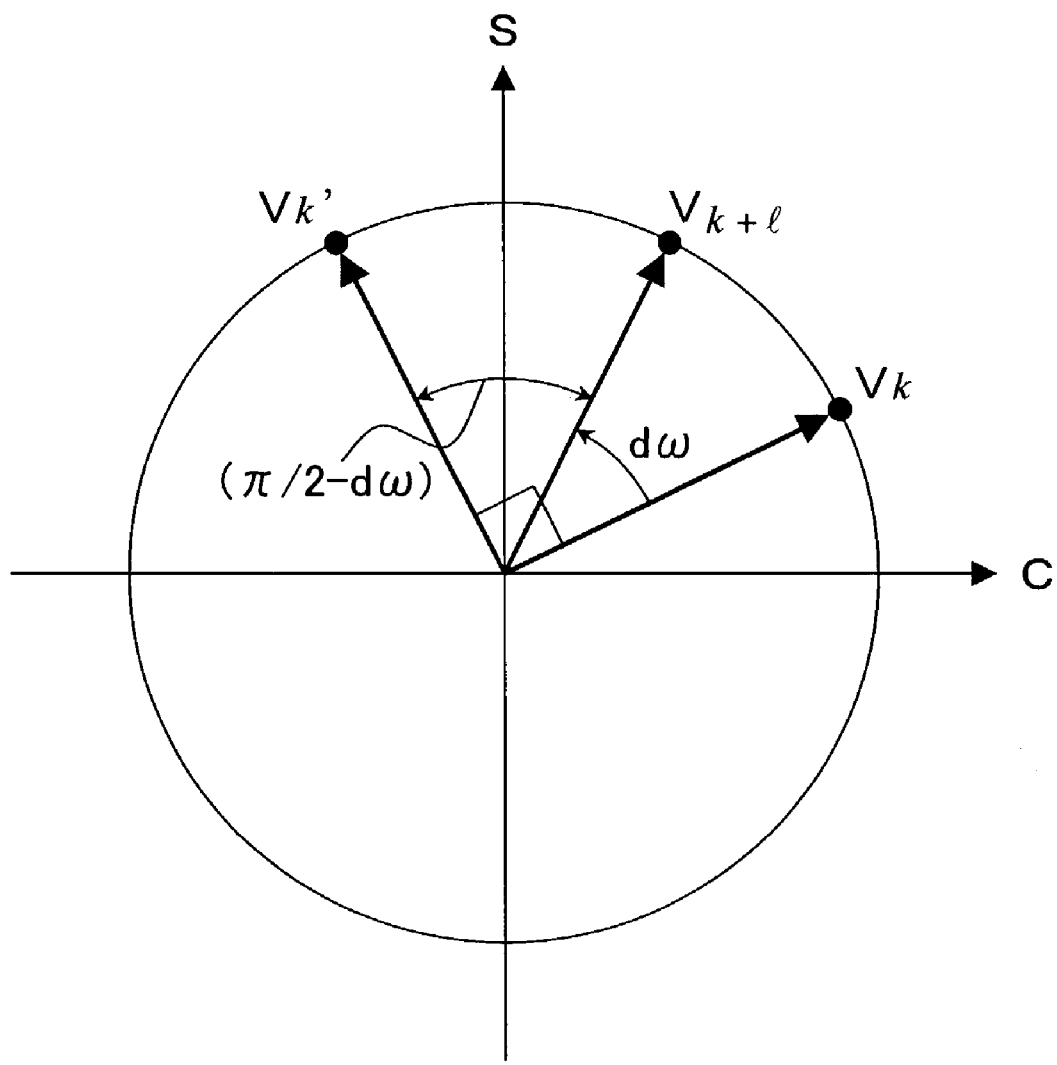
FIG. 31 is an explanatory diagram of a change rate dω of the phase error which is expressed by an internal angle of the vector of the block which is distant on the reference circle of the C-S correlation space.

Such a relation is obtained as follows when it is expressed by vectors of a reference circle of the correlation space in FIG. 31. First, vectors Vk and V(k+l) are set as follows.

$$V_k = (C_{sk}, C_{ck}) \qquad (40)$$
$$V_{k+l} = (C_{s(k+l)}, C_{c(k+l)}) \qquad (41)$$

where, assuming that the change rate $\omega d$ of $\Delta\omega k$ is set to $$d\omega = \Delta\omega_{(k+l)} - \Delta\omega_k \qquad (42)$$

the change rate $d\omega$ is equal to an inner product of the vectors Vk and V(k+l). That is, it is given by the following equations.

$$\cos(d\omega) = (v_{(k+l)}, v_k)/|v_{(k+l)}| \cdot |v_k| \qquad (43)$$
$$\cos(\pi/2 - d\omega) = (v_{(k+l)}, v_k')/|v_{(k+l)}| \cdot |v_k| \qquad (44)$$

where, $V_k' = (-C_{ck}, C_{sk})$

Since the change rate $d\omega$ which is given as an inner product of the vectors Vk and V(k+l) is relatively small, it can be approximated by the following equation.

$$d\omega \approx \sin(d\omega) = -(v_{(k+l)}, v_k')/|v_{(k+l)}| \cdot |v_k| \qquad (45)$$

Therefore, the frequency offset $\Delta f$ can be obtained by the following equations.

$$\Delta f = K_0 d\omega = -K_0(v_{(k+l)}, v_k')/|v_{(k+l)}| \cdot |v_k| \qquad (46)$$
$$= \frac{K_0(C_{s(k+l)} \cdot C_{ck} - C_{c(k+l)} \cdot C_{sk})}{\sqrt{C_{s(k+l)}^2 + C_{C(k+l)}^2} \cdot \sqrt{C_{sk}^2 + C_{ck}^2}}$$

Figure 32:
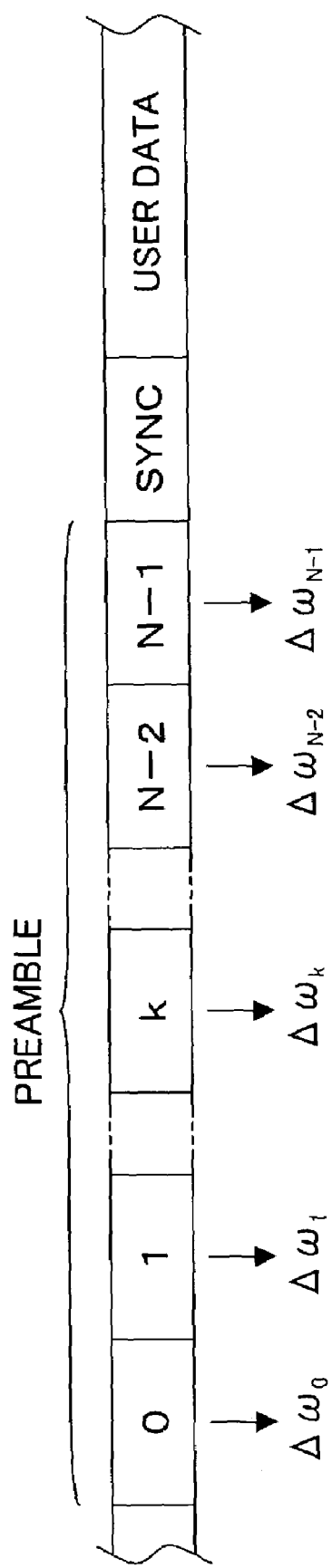
FIG. 32 is an explanatory diagram of a preamble including N blocks.
Figure 33:
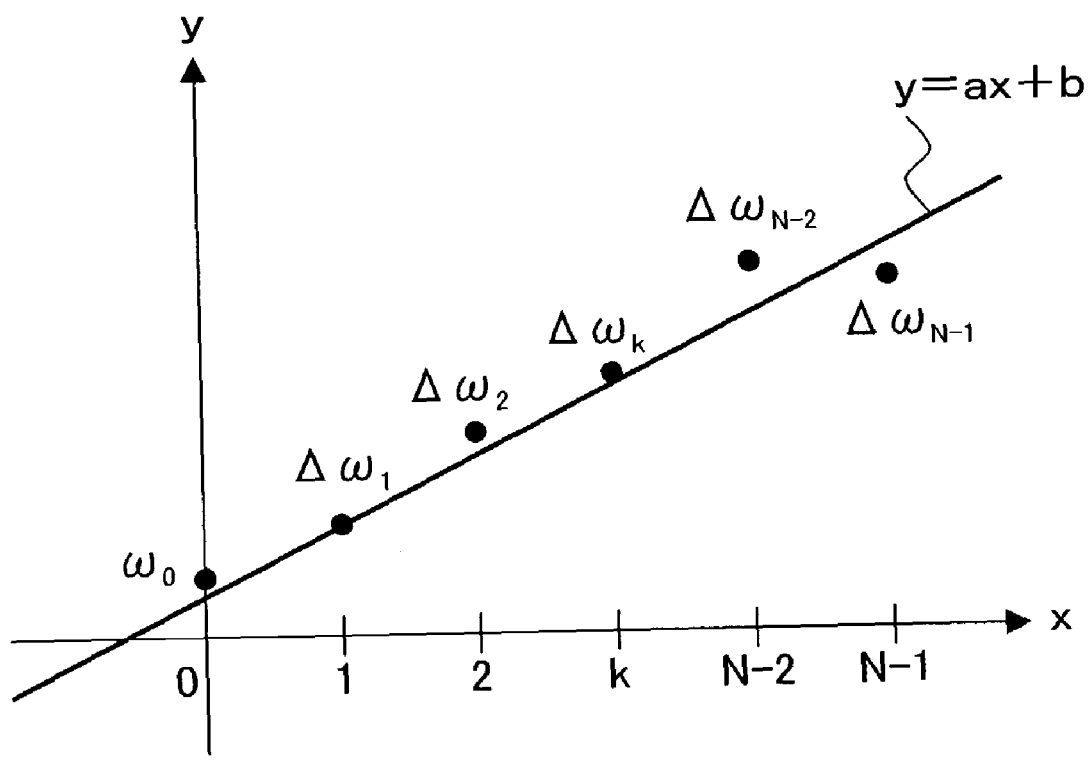
FIG. 33 is an explanatory diagram of a regression line according to a method of least squares.

The circuit of the frequency offset detector 72 shown in FIGS. 25A and 25B sequentially executes arithmetic operations according to the equations (46) and outputs the frequency offset $\Delta f$. The phase error $\Delta\omega k$ of each block in the preamble increases or decreases in proportion to the frequency offset $\Delta f$. Now, assuming that N blocks are included in the preamble as shown in FIG. 32, when a regression line y=ax+b of FIG. 31 according to the method of least squares is obtained from $$\{\Delta\omega k\} \text{ where, } 0 \leq k < N$$

an inclination (a) corresponds to the frequency offset $\Delta f$.

A value which controls a frequency f of the symbol rate in the loop of the timing recovery using the digital PLL in FIG. 23 is an output value Oep(t) of the loop filter 74. The following relation exists between the output value Oep(t) of the loop filter 74 and the frequency f of the symbol rate.

$$f = 1/T = K_v O_{ep}(t) + f_0 \qquad (47)$$

where,
$f_0$: self-running oscillating frequency of the oscillator
$K_v$: gain of the oscillator Therefore, if an initial value of the loop filter 74 is equal to ($\Delta f/Kv$), the frequency offset $\Delta f$ at the start of the loop operation can be compensated. Specifically speaking, since the loop filter 74 is constructed by a primary low pass filter as shown in FIGS. 25A and 25B, it is sufficient to initialize an output of the integrator 226 of the loop filter 74 so as to be equal to (Δf/Kv). That is, the frequency offset Δf detected by the frequency offset detector 72 is multiplied by (1/Kv) by the amplifier 218 and inputted as (Δf/Kv) to one of the input terminals of the selector 232 of the loop filter 74. The input (Δf/Kv) is selected by the selecting operation of the selector 232 in response to the initialization control signal E3 which is obtained at the timing of time t2 in FIG. 24E and stored into the register 230. (Δf/Kv) in the register 230 is selected as an initial output of the integrator 226 which is outputted from the adder 228, inputted to the adder 224, and inputted as an initial output of the loop filter 74 to the digital accumulator 65 at the next stage. The selector 220 of the loop filter 74 selects a fixed value "0" when the loop filter/enable signal E4 is not obtained. When the loop filter/enable signal E4 is obtained, the selector 220 selects the output of the error detector 76. The selector 220 outputs the selected signal. As mentioned above, according to the invention, since the frequency offset can be preliminarily detected in the preamble interval, by initializing the loop filter 74 by the detected frequency offset, the frequency offset is set to "0". In this state, the preamble signal is inputted and the loop lead-in by the digital PLL can be performed. Thus, the steady-state phase error and the lead-in time can be improved. Further, the lead-in range of the frequency offset can be widened.

Training of Oversampling Equalizer

Figure 34:
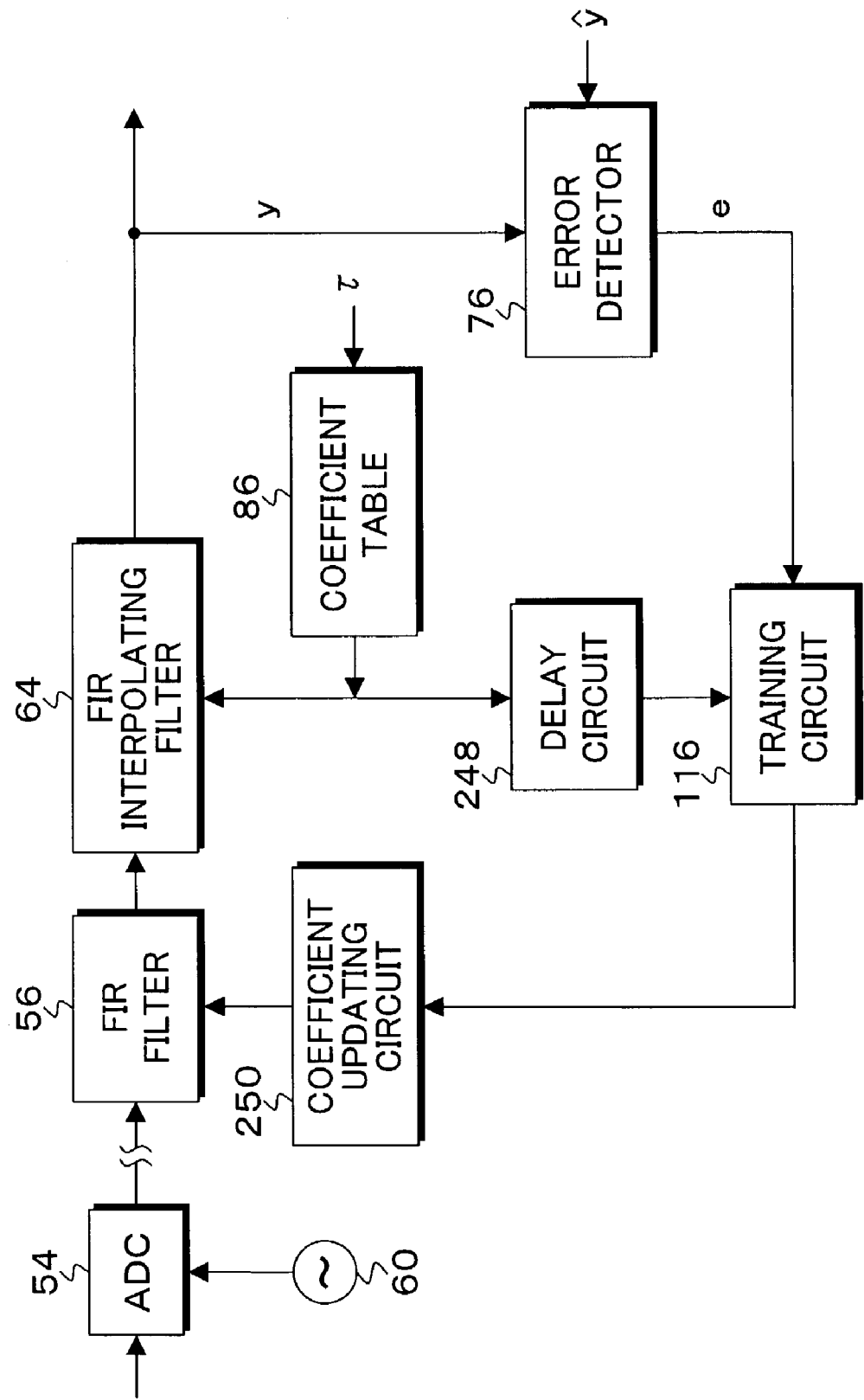
FIG. 34 is a block diagram showing an equalizer training portion of a signal interpolation type loop of the oversampling in FIGS. 10A and 10B.

FIG. 34 shows a circuit unit regarding the training of the oversampling equalizer in the embodiment of FIGS. 12A and 12B. The circuit unit is constructed by: the A/D converter 54; the clock oscillator 60; the FIR filter 56 which functions as an oversampling equalizer; the FIR interpolating filter 64; the error detector 76; the coefficient table 86; a delay circuit 248; the training circuit 116; and further, a coefficient updating circuit 250. The FIR filter 56 functions as an oversampling equalizer and executes waveform equalization with respect to the sampling signals which were oversampled by the A/D converter 54 for the symbol rate. The signal is down-sampled to the symbol rate by the FIR interpolating filter 64 and outputted to the Viterbi decoder 66 in FIGS. 12A and 12B. The training circuit 116 is provided to train coefficients of the oversampling equalizer using the FIR filter 56. A discrimination error (e) between the symbol rate output of the FIR interpolating filter 64 and the symbol discrimination output from the Viterbi decoder 66 in FIGS. 12A and 12B is inputted from the error detector 76 to the training circuit 116. When the discrimination error (e) of the symbol rate inputted from the error detector 76 is fed back to the FIR filter 56, the training circuit 116 executes an inverse interpolation to the oversampling signal. As will be clearly explained hereinlater, in the inverse interpolation, an interpolating process of the equalization error from the symbol rate to the sampling rate is executed by a digital signal processing circuit provided in the training circuit 116. When the interpolating process of the equalization error from the symbol rate to the sampling rate is executed, the dependent type FIR filter inputs the tap coefficients from the FIR interpolating filter 64 selected by the timing reproduction loop via the delay circuit 248 and uses them.

Figure 35:
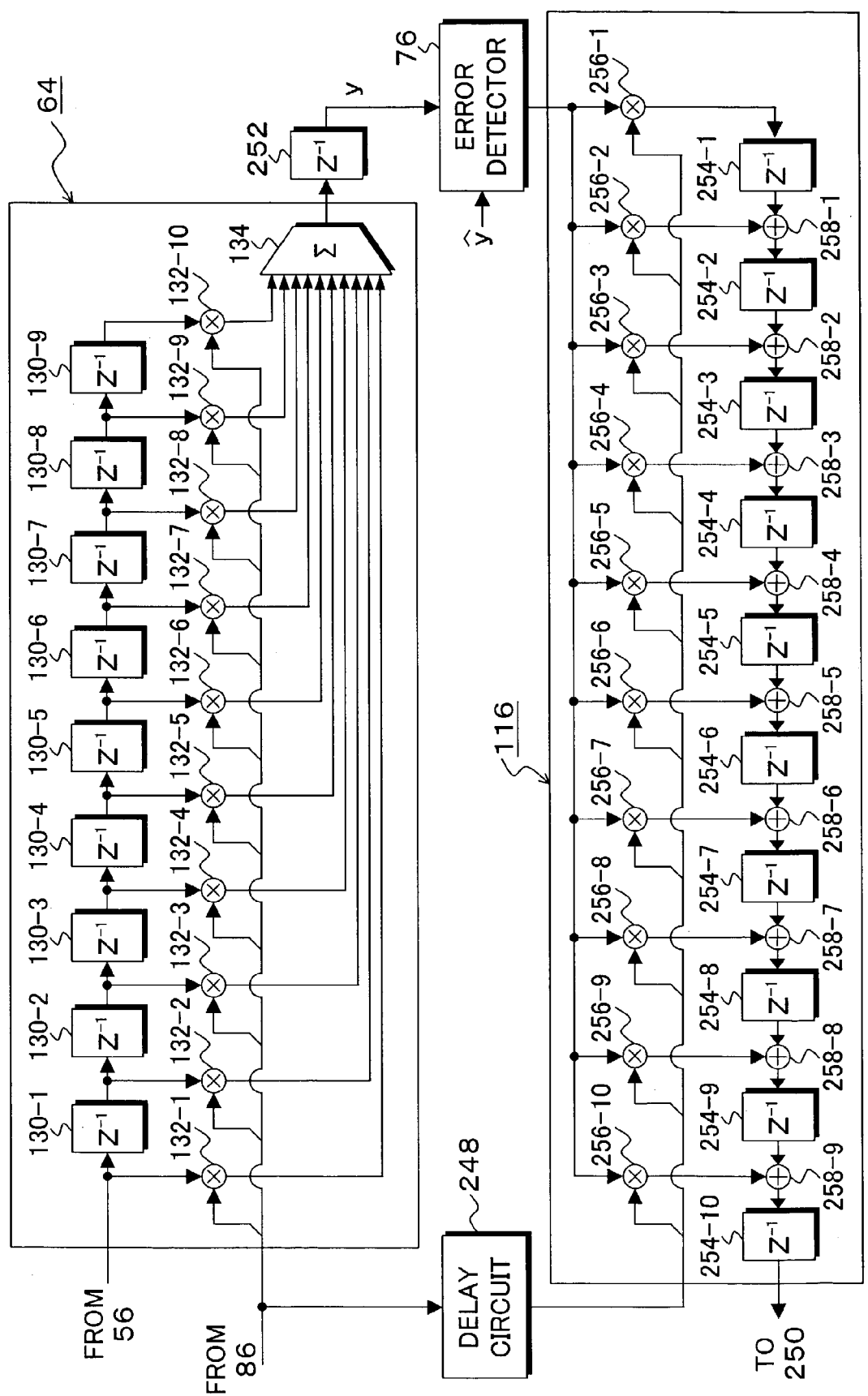
FIG. 35 is a circuit diagram of a specific embodiment of an FIR interpolating filter and a training circuit in FIG. 34.

FIG. 35 is a circuit diagram showing a specific example of the FIR interpolating filter 64 and training circuit 116 in FIG. 34. Although the FIR interpolating filter 64 is fundamentally the same as the FIR interpolating filter described with respect to the zero phase start in FIGS. 12A and 12B, the filter has a construction of 8 taps in FIGS. 14A and 14B, while the filter in the embodiment has a construction of 10 taps. That is, according to the FIR interpolating filter 64, delay circuits 130-1 to 130-9 are cascade-connected, multipliers 132-1 to 132-10 are provided on the tap side of those delay circuits, respectively. Those multipliers receive the tap coefficients according to the phase error μ from the coefficient table 86 in FIG. 34 and multiply tap outputs by the tap coefficients. Multiplication outputs from the multipliers are finally added by the adder 134. An equalization signal (y) which was down-sampled to the symbol rate is outputted to the error detector 76 via a delay circuit 252. The training circuit 116 is constructed by a dependent type FIR filter. The dependent type FIR filter inputs the discrimination error (e) of the symbol rate from the error detector 76 to multipliers 256-1 to 256-10. The tap coefficients which are supplied from the coefficient table 86 in FIG. 34 to the FIR interpolating filter 64 are inputted to those multipliers via the delay circuit 248 and multiplied. Those multipliers multiply the inputted discrimination error (e) by the inputted tap coefficients, respectively. Multiplication outputs of the multipliers 256-1 to 256-10 are added by adders 258-1 to 258-9 of a circuit constructed by alternately cascade-connecting delay circuits 254-1 to 254-10 and the adders 258-1 to 258-9, respectively, thereby inversely interpolating the discrimination error (e) of the symbol rate into the sampling rate and outputting a resultant signal to the coefficient updating circuit 250 in FIG. 34.

Figure 36:
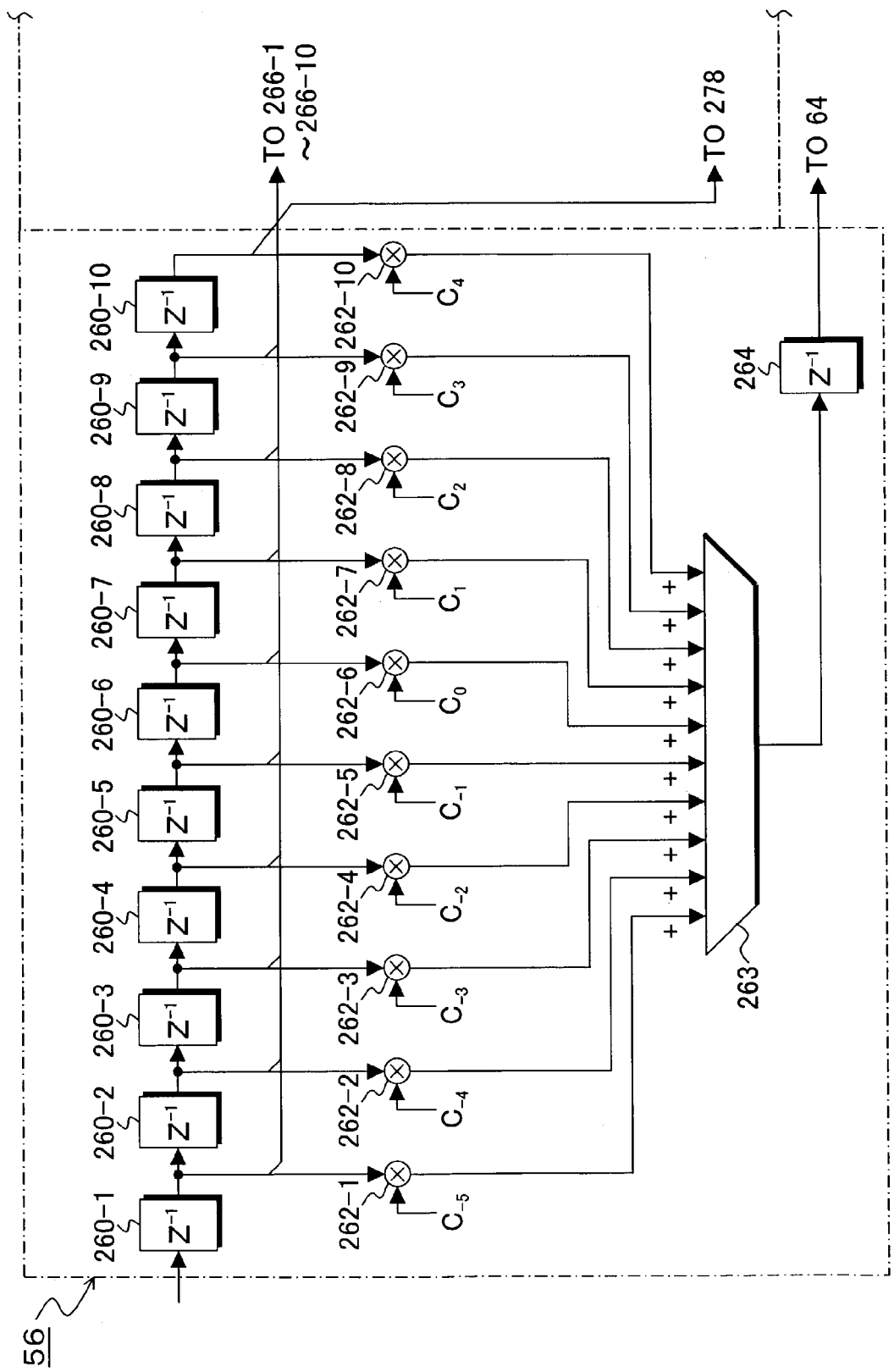
FIG. 36 is a circuit diagram of a specific embodiment of an FIR filter in FIG. 34.
Figure 37A:
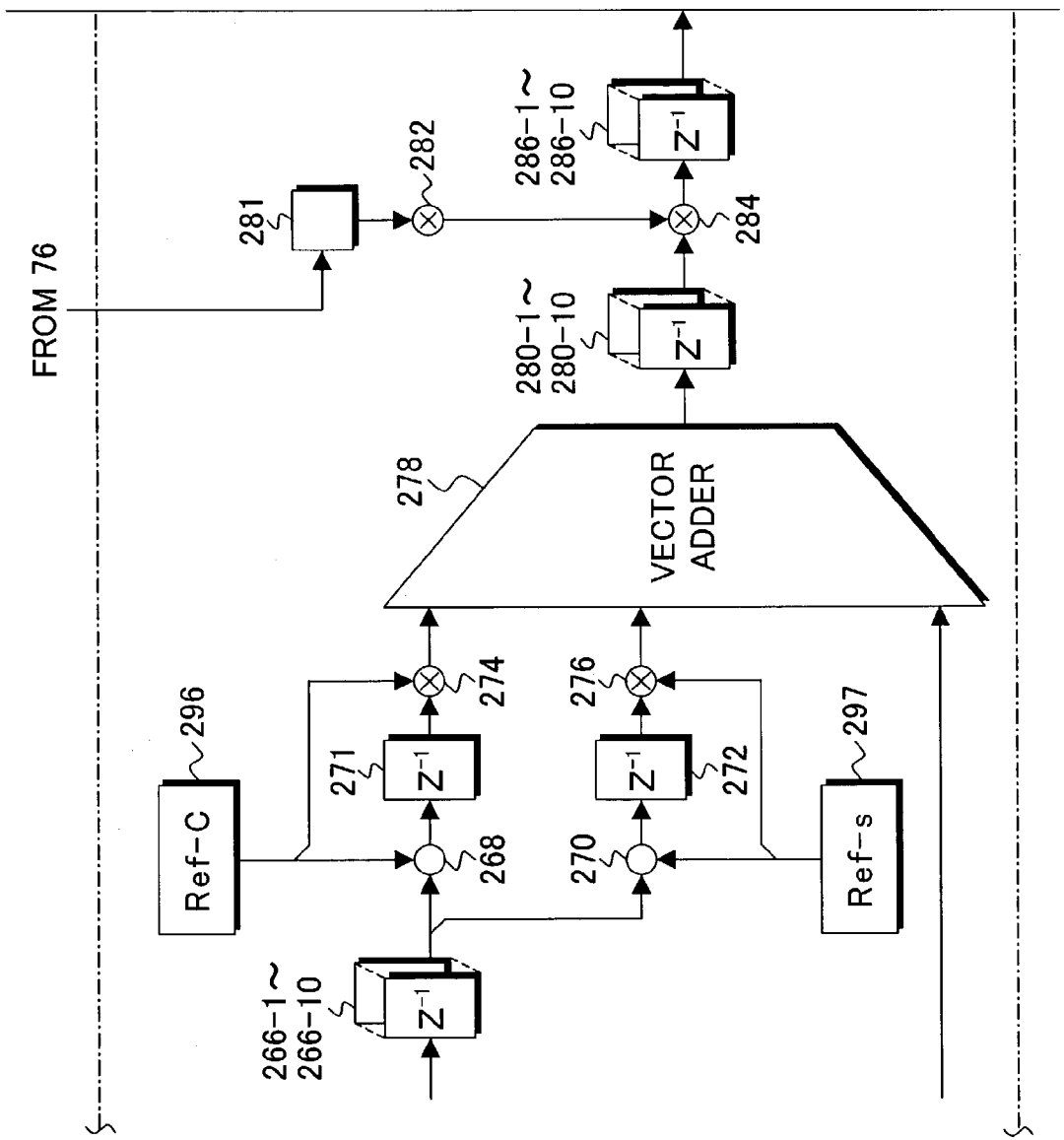
FIGS. 37A and 37B are circuit diagrams of the coefficient updating circuit and are a sequel to FIG. 36.
Figure 37B:
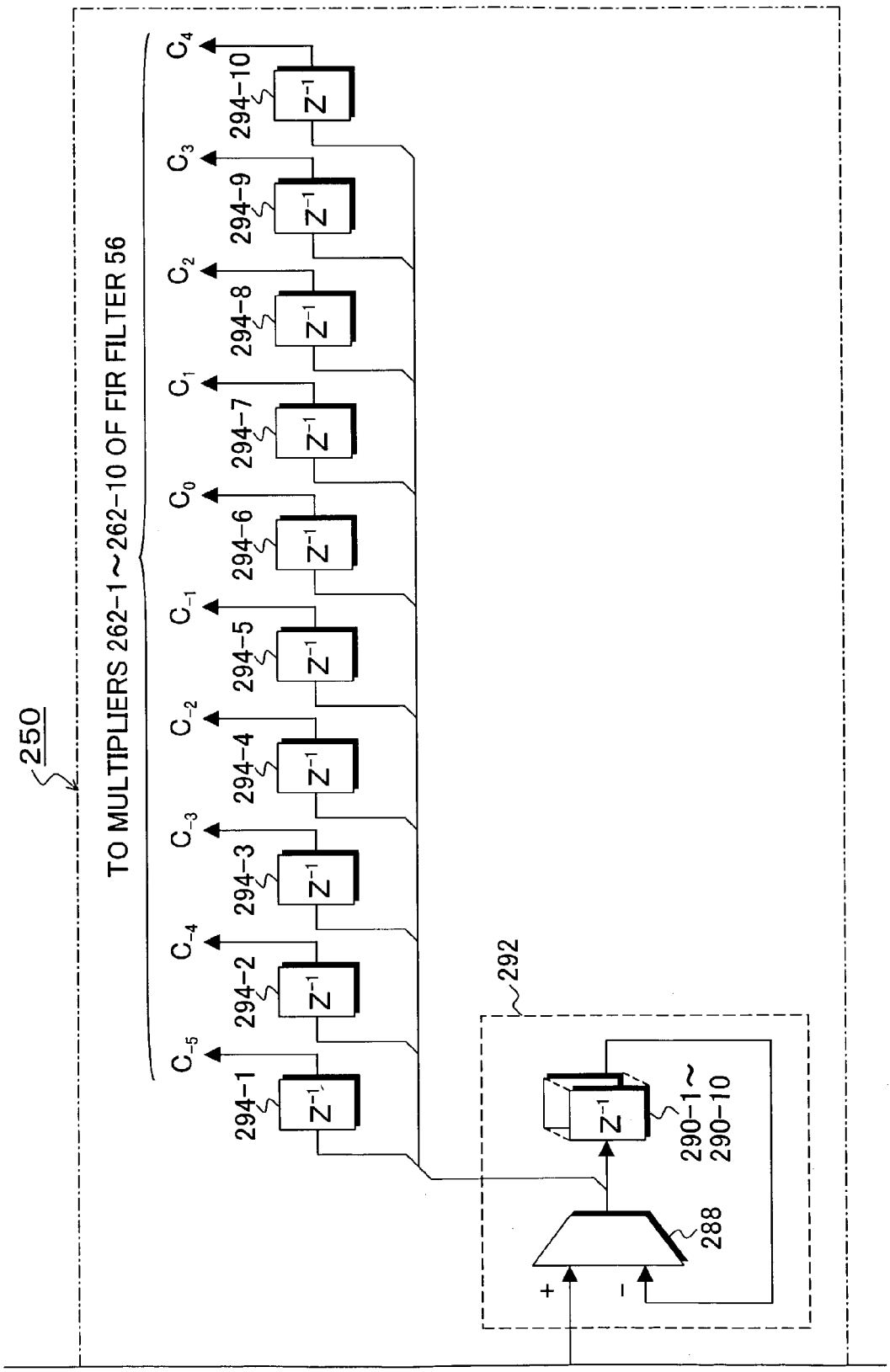

FIG. 36 shows a specific circuit construction of the FIR filter 56 which functions as an oversampling equalizer in FIG. 34. The coefficient updating circuit 250 subsequent to the FIR filter 56 is shown in FIGS. 37A and 37B. According to the FIR filter 56 which functions as an oversampling equalizer, delay circuits 260-1 to 260-10 are cascade-connected and their tap outputs are inputted to multipliers 262-1 to 262-10 and multiplied by tap coefficients $C_{-5}$ to $C_4$ which are given from the coefficient updating circuit 250 in FIGS. 37A and 37B. Multiplication outputs of those multipliers are added by an adder 263. An oversampled sampling signal is waveform-equalized via a delay circuit 264 and a resultant signal is outputted to the FIR interpolating filter 64 at the next stage. The portion of the coefficient updating circuit 250 provided for the FIR filter 56 forms preamble restricting conditions for preventing the adjustment of coefficients in the preamble interval from being made. As a circuit unit to set the preamble restricting conditions, subsequently to delay circuits 266-1 to 266-10 for delaying ten tap outputs of the FIR filter 56, inner product units 268 and 270, delay circuits 271 and 272, and scalar product arithmetic operating units 274 and 276 are provided in parallel. Outputs of the scalar product arithmetic operating units 274 and 276 and the ten tap outputs of the FIR filter 56 are added by a vector adder 278 and ten outputs of (e) bits are outputted. The cosine reference signal Ref-c is inputted from a register 296 to the inner product unit 268 and scalar product arithmetic operating unit 274. The sine reference signal Ref-s is inputted from a register 297 to the inner product unit 270 and scalar product arithmetic operating unit 276.

Subsequently to the vector adder 278 in FIG. 37A, delay circuits 280-1 to 280-10 corresponding to ten outputs of (b) bits in FIG. 37A are provided. Outputs of those delay circuits are inputted to one input terminal of a multiplier 284. An output of a multiplier 282 is supplied to the other input terminal of the multiplier 284. The output of the dependent type FIR filter provided for the training circuit 116 in FIG. 34, that is, the discrimination error (e) which was up-sampled to the sampling rate from the symbol rate is inputted to the multiplier 282. The discrimination error (e) is multiplied by the phase error μ as a gain and a resultant signal is outputted from the multiplier 282. Subsequently to the multiplier 284, delay circuits 286-1 to 286-10 corresponding to ten outputs of (b) bits are provided. Outputs of those delay circuits are inputted to an LMS loop 292 comprising a vector adder 288 and delay circuits 290-1 to 290-10 in FIG. 37B. In order to minimize the discrimination error, the LMS loop 292 adjusts the tap coefficients $C_{-5}$ to $C_4$ to the FIR filter 56 which functions as an oversampling equalizer and outputs them to the FIR filter 56 side via delay circuits 294-1 to 294-10.

FIG. 38 shows a specific example of the inner product unit 268 provided on the coefficient updating circuit 250 side shown in FIGS. 37A and 37B. The delay circuits 266-1 to 266-10 on the input side are also shown. According to the inner product unit 268, the tap outputs of the conventional delay circuits 266-1 to 266-10 are delayed in parallel by a delay circuit 295. Thereafter, multipliers 298-1 to 298-10 multiply the delayed outputs by Ref0 to Ref9 as values of a cosine reference Ref-n set by the register 296. Multiplication values are added by an adder 300, thereby obtaining an inner product. A construction of the other inner product unit 270 provided in parallel with the inner product unit 268 is similar to that of the inner product unit 268 except for a different point that, in the inner product unit 270, a reference which is set by the register 297 is a sine wave.

Details of the training of the oversampling equalizer having the construction shown in FIGS. 34 to 38 will now be described. In the timing reproduction loop of the oversampling signal interpolating type as shown in FIG. 34, all signal processes are executed at the sampling period of the sampling rate Ts. The period of the sampling rate Ts is shorter than that of the symbol rate T. Signal discrimination is made by the symbol rate T. The discrimination error e(t) from the error detector 76 is a difference between an equalization signal y^(t) which is obtained after completion of the equalization by the FIR filter 56 and the signal interpolation by the FIR interpolating filter 64 and an ideal discrimination value of the target response. The timing reproduction loop, the AGC loop, and the adaptive equalization of the oversampling equalizer are controlled so as to minimize the discrimination error e(t). The discrimination error e(t) is obtained by the following equation.

$$e(t) = y(t) - \hat{y}(t) \quad (48)$$

Since the discrimination error e(t) is a signal sampled by the symbol rate, it is impossible to directly feed it back to an oversampled adaptive equalizer and execute coefficient training by an LMS method (method of least squares).

Figure 39:
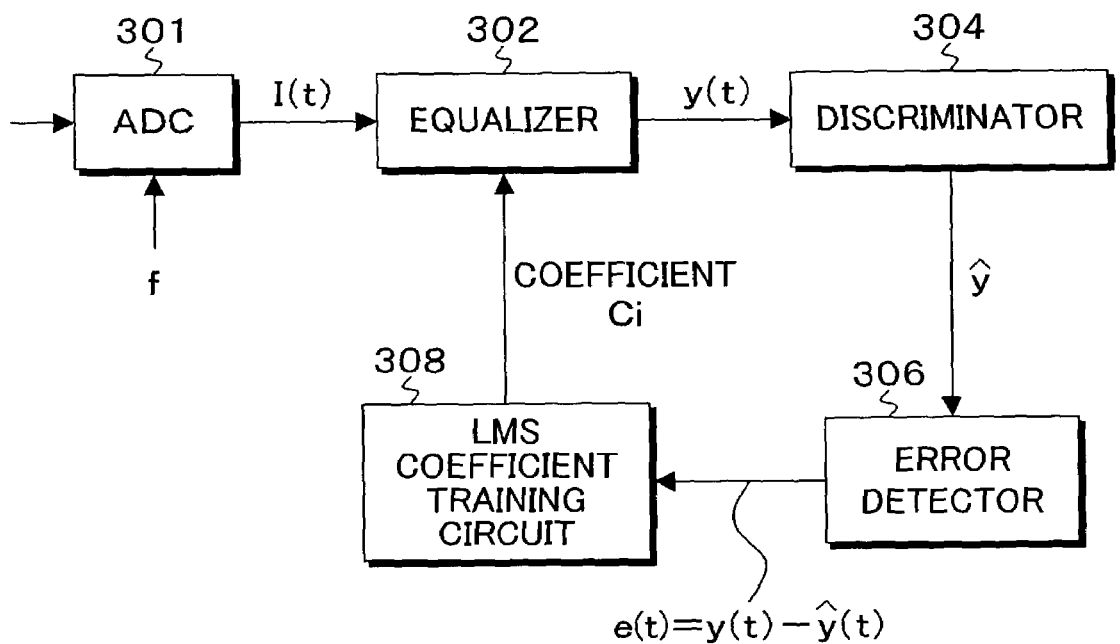
FIG. 39 is a block diagram of a reproduction timing loop for performing the training according to the conventional LMS method.

FIG. 39 shows a training loop of a conventional general adaptive equalizer. That is, a signal I(t) which was sampled by an A/D converter 301 is waveform-equalized by an equalizer 302. A resultant equalization signal y(t) is inputted to a discriminator 304, thereby discriminating the signal. A discrimination value y^ of the discriminator 304 is inputted to an error detector 306, so that the discrimination error e(t) which is given by the equation (48) is obtained. An LMS coefficient training circuit 308 controls coefficients of the equalizer 302 so as to minimize the discrimination error e(t). According to the coefficient training of the conventional LMS method, training according to the following equation is executed.

$$C_i\{(n+1)T\} = C_i(nT) - \alpha \cdot e(nT) \cdot I(nT) \quad (49)$$

However, although the coefficient training by the conventional LMS method as shown in FIG. 39 can be realized in case of the signals all of which have the sampling periods of the symbol rate, according to the timing reproduction loop of the oversampling signal interpolating type as a target of the invention, the training in which the discrimination error e(t) is directly fed back to the equalizer 302 cannot be performed. Therefore, in the invention, as shown in FIG. 34, the discrimination error e(t) from the error detector 76 is inversely interpolated from the symbol rate to the sampling rate by the training circuit 116.

Figure 40:
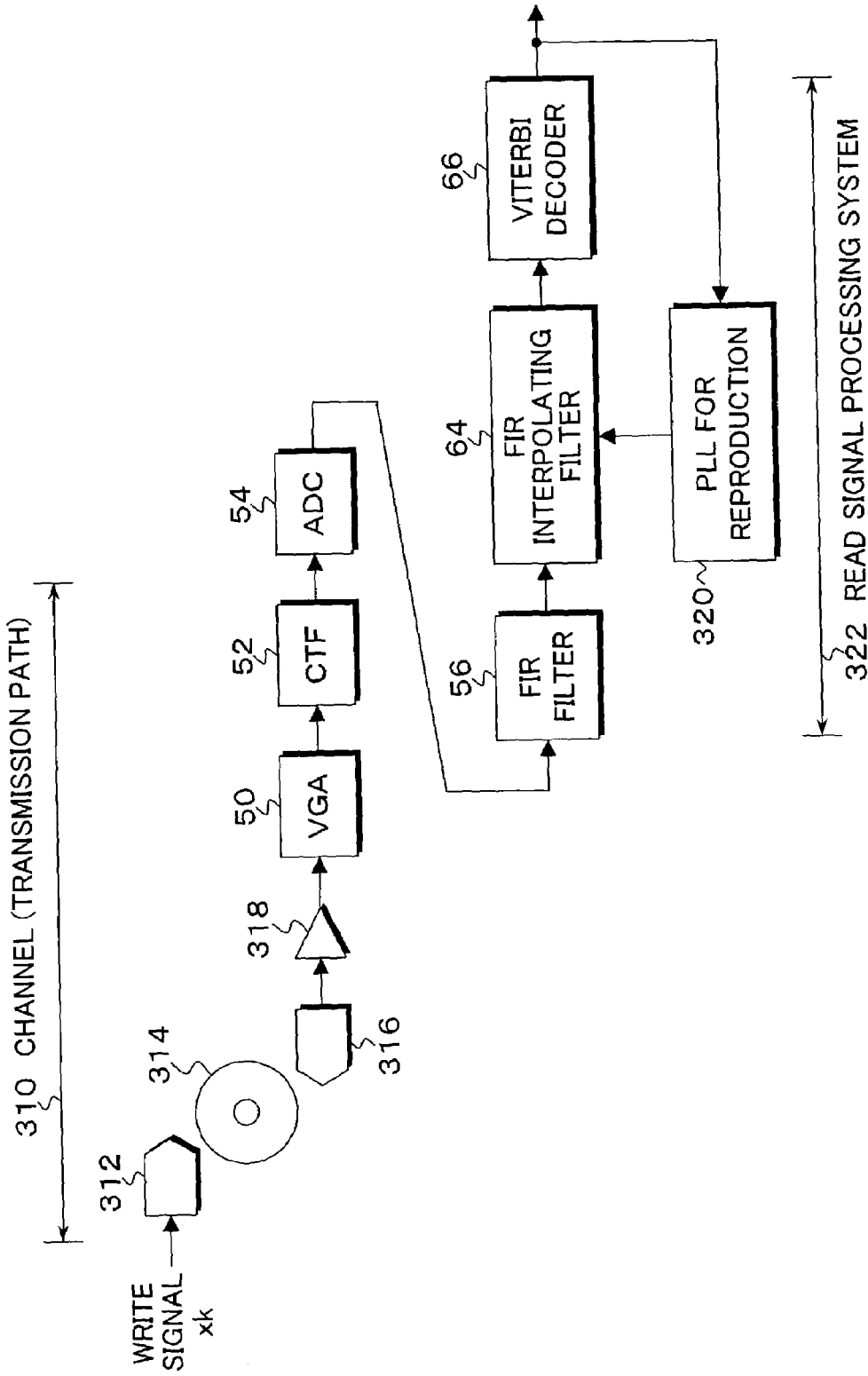
FIG. 40 is a block diagram of a reading system serving as a training target of the invention having a timing reproduction loop according to the signal interpolation of the oversampling type.

FIG. 40 shows a channel and a reading system of a magnetic recording and reproducing apparatus having the timing reproduction loop of the oversampling signal interpolating type. That is, a channel (transmission path) 310 comprises: a write head 312; a medium 314; a read head 316; an amplifier 318; the variable gain amplifier 50; the CT filter 52; the A/D converter 54; the FIR filter 56 functioning as an adaptive equalizer; the FIR interpolating filter 64 for down-sampling from the sampling rate to the symbol rate; the Viterbi decoder 66; and a PLL 320 for timing reproduction. Among them, the portion in a range from the FIR filter 56 functioning as an adaptive equalizer to the Viterbi decoder 66 corresponds to a read signal processing system 322.

Figure 41:
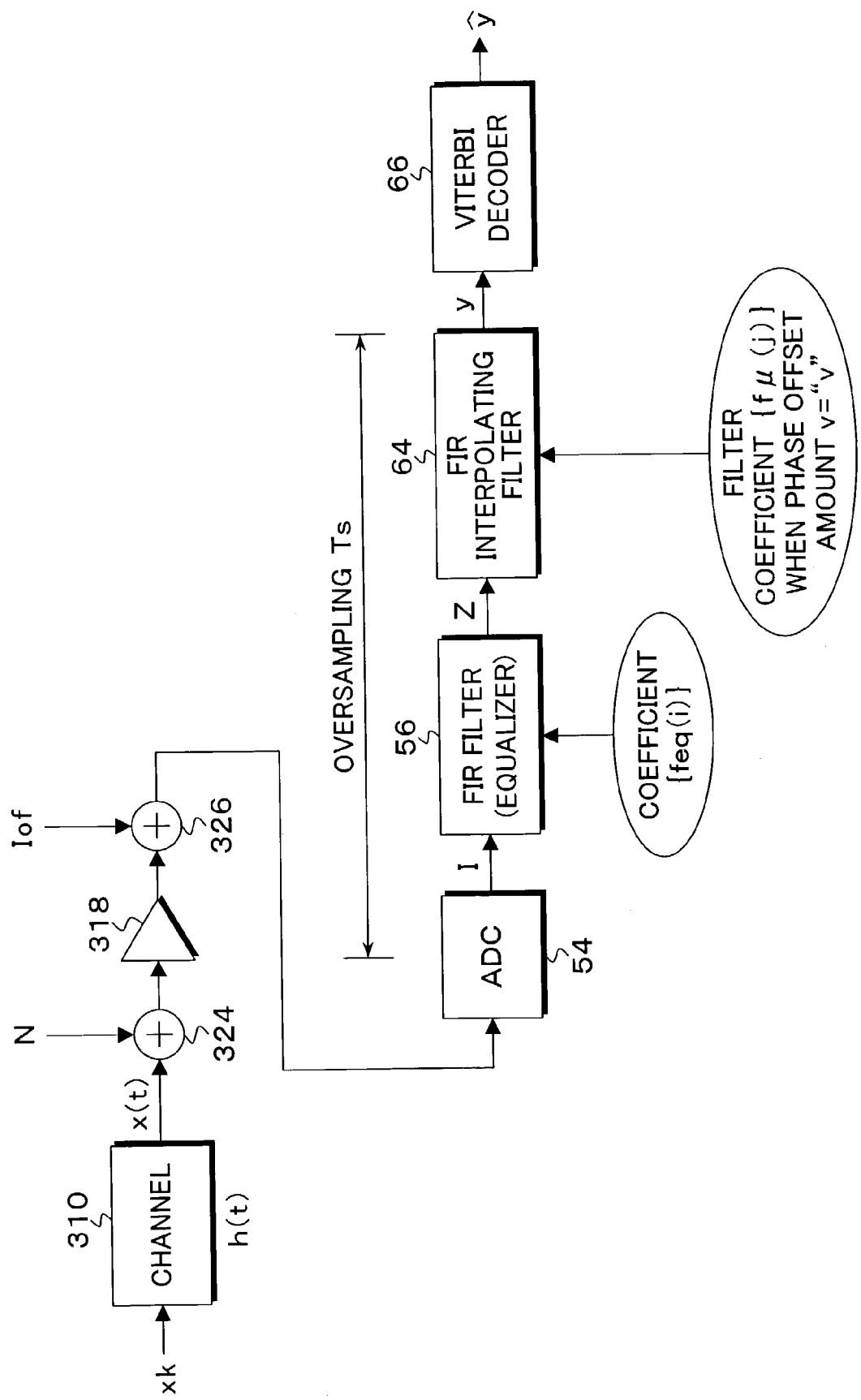
FIG. 41 is an explanatory diagram showing a signal and a rate in each unit in the timing reproduction loop in FIG. 40.

FIG. 41 shows the read channel side for the channel 310 in FIG. 40 and shows a signal in each section and its rate. The signal xk of the symbol rate T is inputted to the channel 310. A noise N is multiplexed to the signal xk as a read signal x(t) by an adder 324. The signal is amplified by the amplifier 318. A DC offset Iof is added to the amplified signal by an adder 326. The resultant signal is sampled by the A/D converter 54 and becomes a sampling signal I. The signal is waveform-equalized by the FIR filter 56 functioning as an oversampling equalizer and becomes an equalization signal Z. The signal is subjected to the interpolation of the down-sampling from the sampling rate Ts to the symbol rate T by the FIR interpolating filter 64, becomes the equalization signal (y), and is inputted to the Viterbi decoder 66. The discrimination signal y^ is obtained from the Viterbi decoder 66. In the timing reproduction system of the signal interpolation of the oversampling type as mentioned above, the portion in a range from the A/D converter 54 to the FIR interpolating filter 64 handles the oversampled signal of the sampling rate Ts and the other portion handles the signal of the symbol rate T. Therefore, each signal in the timing reproduction loop of the signal interpolation of the oversampling type as shown in FIG. 41 is defined as follows. First, the read signal x(t) which is obtained from the channel 310 is obtained as follows.

$$x(t) = \sum_{k=-\infty}^{\infty} x_k \cdot h(t - kT) \quad (50)$$

where, $x_k = \{+1, -1\}$ h(t): channel response

The signal which is oversampled by the A/D converter 54, that is, the sampling signal I obtained after completion of the A/D conversion is obtained as follows.

$$I(l \cdot T_s) = I(mT - \mu T_s) \quad (51)$$
$$= A \cdot \{x(lT_s) + N(lT_s)\} + I_{of}$$
$$= A\{x(mT - \mu T_s) + N(mT - \mu T_s)\} + I_{of}$$

where,

μ: phase error amount (0<μ<1)
A: AGC gain
N(t): noise
$I_{of}$: DC offset

Subsequently, a tap length and filter coefficients as coefficients of the FIR filter 56 which functions as an oversampling equalizer are assumed as follows. That is, the tap length is obtained by the following equation.

$$N_{eq}(=N_{eq2}-N_{eq1}+1) \tag{52}$$

The filter coefficients are as follows.

$$f_{eq}(i)=\{f_{eq}(N_{eq2}), f_{eq}(N_{eq1}+1), \ldots, f_{eq}(-1), f_{eq}(0), f_{eq}(1), \ldots, f_{eq}(N_{eq2})\} \tag{53}$$

Therefore, the equalizer output Z of the FIR filter 56 is as follows.

$$Z(lT_s) = \sum_{i=N_{eq1}}^{N_{eq2}} f_{eq}(i) I\{(l-i)T_s\} \tag{54}$$

Subsequently, as coefficients of the FIR interpolating filter 64 for performing the shifting process according to the phase offset amount μ, the tap length is set as follows.

$$N_{ip}(=N_{ip2}-N_{ip1}+1) \tag{55}$$

The filter coefficients are as follows.

$$f\mu(i)=\{f_\mu(N_{ip1}), f_\mu(N_{ip1}+1), \ldots f\mu(-1), f_\mu(0), f_\mu(1), \ldots f_\mu(N_{ip2})\} \tag{56}$$

Therefore, the output of the FIR interpolating filter 64 is as follows.

$$\begin{aligned} y_\mu(mT) &= \sum_{j=N_{ip1}}^{N_{ip2}} f_\mu(j) \cdot Z\{(l-j)T_s\} \\ &= \sum_{j=N_{ip1}}^{N_{ip2}} f_\mu(j) \cdot Z\{(mT-\mu T_s) - jT_s\} \\ &= \sum_{j=N_{ip1}}^{N_{ip2}} f_\mu(j) \cdot Z\{mT - (\mu+j)T_s\} \\ &= \sum_{j=N_{ip1}}^{N_{ip2}} f_\mu(j) \cdot \left\{ \sum_{i=N_{eq1}}^{N_{eq2}} f_{eq}(j) I(mT - (\mu+i+j)T_s \right\} \end{aligned} \tag{57}$$

Figure 42:
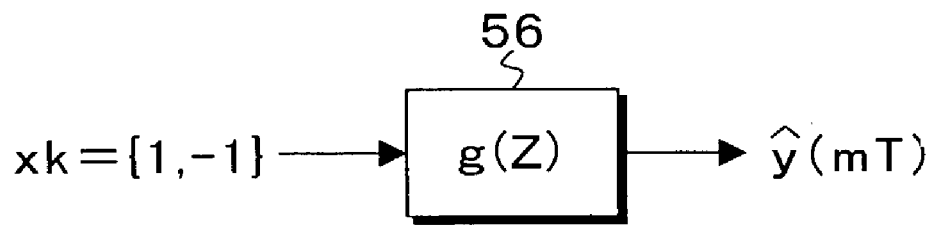
FIG. 42 is an explanatory diagram of target characteristics of an equalizer for performing coefficient training of the invention.

Subsequently, a coefficient training method of the FIR filter 56 which functions as an oversampling equalizer will be described. First, as shown in FIG. 40, target characteristics (transfer function of the PR system) serving as a target of the equalization with respect to the FIR filter 56 are assumed to be g(T). In this case, an ideal equalization signal by the FIR filter 56 in FIG. 42 is as follows.

$$\hat{y}(mT) = \sum_{k=-\infty}^{\infty} x_k \cdot g\{(m-k)T\} \tag{58}$$

Subsequently, the restricting conditions of the FIR filter 56 serving as an oversampling equalizer will be described. Ordinarily, in the coefficient training of the equalizer, conditions such that input signals {x, k} have random patterns and there is no correlation between their information are used as a prerequisite. Therefore, if the training is performed in the preamble interval of the periodic pattern, the coefficients are not optimized. Thus, with respect to the interval of the preamble signal, restricting conditions such that the values of the coefficients are not changed due to the training have to be added. First, when the equalizer output of the FIR filter 56 is expressed by using the tap length and the filter coefficients, it is as follows.

$$\begin{aligned} H_{eq}(Z) &= \sum_{i=N_{eq1}}^{N_{eq2}} f_{eq}(i) \cdot Z^{-(i-N_{eq1})} \\ &= f_{eq}(N_{eq1}) \cdot Z^0 + f_{eq}(N_{eq1}+1)Z^{-1} + \cdots + f_{eq}(N_{eq2})Z^{-N_{eq1}+N_{eq2}} \end{aligned} \tag{59}$$

Frequency characteristics of the equalizer are expressed by $$H_{eq}(e^{j\omega})$$

Since the preamble pattern has a sine wave of $$\omega_p = (2\pi/4T \cdot T_s) \tag{60}$$

the frequency characteristics are as follows.

$$H_{eq}(e^{j\omega_p}) = C \tag{61}$$

Therefore, in the FIR filter 56, as restricting conditions such that the coefficient values are not changed due to the training by the preamble signal, it is sufficient that the restricting conditions of the equations (59) and (61) are satisfied. Now, assuming that $$C(i) = e^{j(\pi/2 \cdot T_s/T)i} \tag{62}$$

the restricting conditions are as follows.

$$C = \sum_{i=N_{eq1}}^{N_{eq2}} C(i) \cdot f_{eq}(i) = C_{st}\{f_{eq}(i)\} \tag{63}$$

With respect to the coefficients of the equalizer, the training is executed so as to minimize a square error average of the equalizer output y(t) and the ideal output y(t). The square error for this purpose is as follows.

$$\begin{aligned} mse &= \langle \{e(mT)\}^2 \rangle \\ &= \langle \{y_\mu(mT) - \hat{y}(mT)\}^2 \rangle \end{aligned} \tag{64}$$

where,

μ: phase error amount $$lT_s = mT - \mu T_s$$

The restricting conditions of the equations (63) and the square error of the equations (64) as mentioned above are functions of several variables in which coefficients {feq(i)} are set to variables and are as follows. C denotes a constant.

$$\begin{cases} Z = mse(\{f_{eq}(i)\}) \\ C = C_{st}(\{f_{eq}(i)\}) \end{cases} \quad (65)$$

A Lagrange's undetermined multiplier method is used to obtain a minimum value of Z in the equations (65). That is, assuming that coefficients which can obtain an extreme value of a square error Z are set to $$A = \{f_a(i)\} \quad (66)$$

the restricting conditions and the square error satisfy the following equations.

$$\begin{cases} 1/2 \cdot \dfrac{\partial}{\partial f_{eq}(i)} \{mse - 2\lambda(C_{st} - C)\} = 0 \\ C_{st}(A) = C \end{cases} \quad (67)$$

When the equations (67) are developed by using a square error mse in the equations (64) and the equalizer output in the equation (54), they become as follows.

$$\begin{aligned} 0 &= \frac{1}{2} \cdot \frac{\partial}{\partial f_{eq}(i)} \cdot \{mse - \lambda(C_{st} - C)\} \\ &= \left\langle e(mT) \cdot \frac{\partial}{\partial f_{eq}(i)} \cdot y_\mu(mT) \right\rangle - \lambda C(i) \\ &= \left\langle e(mT) \cdot \sum_{j=N_{ip1}}^{N_{ip2}} f_\mu(j) I\{mT - (i+j+\mu)T_s\} \right\rangle - \lambda C(i) \\ &= \left\langle e(mT) \cdot \sum_{j=N_{ip1}}^{N_{ip2}} f_\mu(j) \cdot I\{mT - \mu T_s - (i+j)T_s\} \right\rangle - \lambda C(i) \end{aligned} \quad (68)$$

In the equations (68), since $f_\mu(j)$ denotes a filter coefficient of the sampling rate Ts, a variable conversion is executed in $$mT - \mu T_s = lT_s \quad (69)$$

in the first term.

At this time, the filter coefficient $f_\mu(j)$ is a jth coefficient of the FIR interpolating filter 64 at time $1T_s$ in which a frequency offset at this time is set to μ. To clarify it, $$f_{\mu(lT_s)}(j)$$

is assumed.

The discrimination error can be approximated by the following equation.

$$e(mT) = e(lT_s + \mu T_s) \approx e(lT_s) \quad (70)$$

Therefore, a result of the variable conversion in the equations (68) becomes as follows.

$$0 = \left\langle e(lT_s) \cdot \sum_{j=N_{ip1}}^{N_{ip2}} f_{\mu(lT_s)}(j) \cdot I\{lT_s - (i+j)T_s\} \right\rangle - \lambda C(i) \quad (71)$$

Since the first term of the right side in the equation (71) denotes an average value, there is no correlation between (i) and (j), they do not depend on each other, and a time shift is possible. Therefore, when the equation (71) is time-shifted, it becomes as follows.

$$0 = \left\langle I(lT_s - iT_s) \cdot \sum_{j=N_{ip1}}^{N_{ip2}} f_{\mu(lT_s + jT_s)}(j) \cdot e(lT_s + jT_s) \right\rangle - \lambda C(i) \quad (72)$$

Since the discrimination error is given by the following equation $$e_r(lT_s) = \sum_{j=N_{ip1}}^{N_{ip2}} f_{\mu(lT_s + jT_s)}(j) \cdot e(lT_s + jT_s) \quad (73)$$

the equation (72) becomes as follows.

$$0 = \langle [I\{(l-i)T_s\} - \lambda C(i)] \cdot e_r(lT_s) \rangle \quad (74)$$

In the equation (74), $$I\{(l-i)T_s\} - \lambda C(i)$$

denotes that coefficients feq(i) are restricted onto a plane which is parallel with $$\text{Plane } \Gamma: \Sigma C(i) \cdot f_{eq}(i) = 0 \quad (75)$$

due to the restricting conditions.

Figure 43:
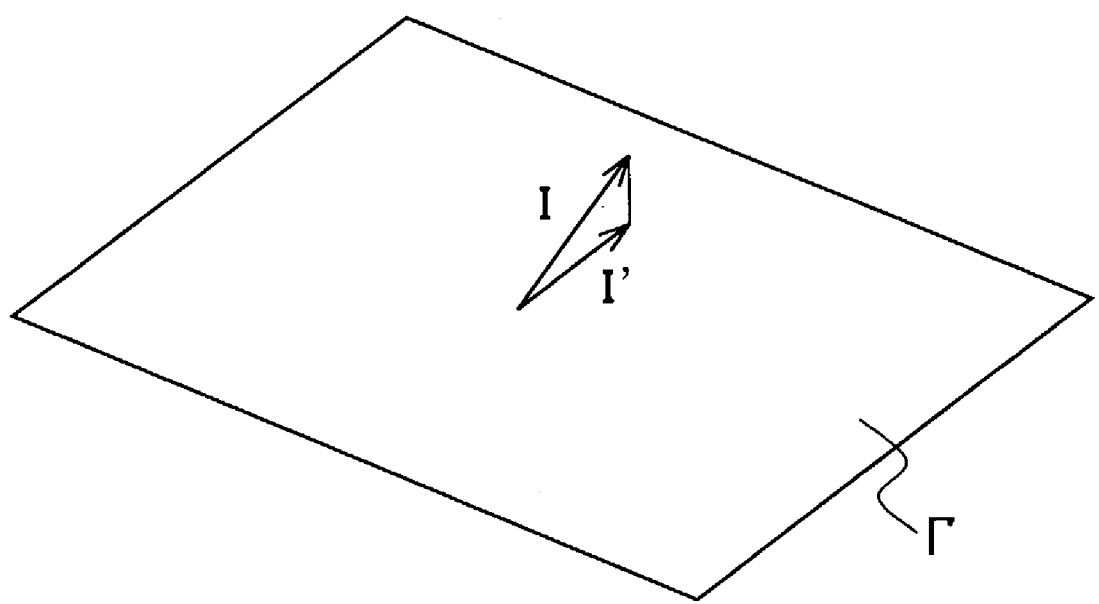
FIG. 43 is an explanatory diagram of vectors serving as restricting conditions for the preamble signal.

FIG. 43 is a diagram for explaining the restricting conditions according to the equation (74). Now, assuming that a vector I is set to $$I = \{I((l-i)T_s)\} \quad (76)$$

and a vector I' is set to a vector projected to the plane Γ, the vector I' is given by the following equation.

$$I' = I - \frac{C^T \cdot I}{C^T \cdot C} \cdot C \quad (77)$$

This means that $$0 = \langle I'(l-i)T_s \cdot e_r(lT) \rangle \quad (78)$$

and shows the condition such that the square error is equal to "0". Therefore, even if the preamble signal is fed back to the training system, the coefficient training of the equalizer is not executed in the preamble signal due to the restricting conditions of the preambles (Ref-C, Ref-S). Thus, the LMS can be always applied during the reading operation. That is, when the coefficients of the FIR filter 56 are assumed to be $$F_{eq}(t) = \begin{pmatrix} f_{eq}(N_{eq2})(t) \\ f_{eq}(N_{eq2} - 1)(t) \\ \vdots \\ f_{eq}(N_{eq1})(t) \end{pmatrix} \quad (79)$$

a recurrence formula of the LMS becomes as follows.

$$F_{eq}\{(k+1)T_s\} = F_{eq}(kT_s) - \alpha \cdot e(lT_s)\left(I(lT_s) - \frac{C^T \cdot I(lT_s)}{C^T \cdot C} \cdot C\right) \quad (80)$$

The training circuit 116 and the coefficient updating circuit 250 of the FIR filter 56 shown in FIGS. 34 to 38 execute the coefficient training by the LMS method according to the equation (80). That is, with respect to the FIR filter 56 which functions as an oversampling equalizer of the invention, by interpolating the discrimination error at the symbol rate into the sampling rate and setting the restricting conditions with respect to the preamble signal, the coefficient values are not changed due to the training by the preamble signal, and the conventional LMS method can be applied to the training of the oversampling equalizer. The coefficients of the oversampling equalizer can be trained so that the square mean of the discrimination error is certainly set to "0".

DC Offset Cancel Control and Automatic Gain Control

In the embodiment of FIGS. 12A and 12B, a DC offset cancel control loop is constructed by the DC offset removal loop filter 118, D/A converter 120, and analog adder 122. An automatic gain control loop is constructed by the AGC loop filter 124 and D/A converter 126. Therefore, an input signal amplitude by the automatic gain control for the A/D converter 54 and the DC offset cancel in the reading mode are also controlled so as to set the square error to "0" in a manner similar to the equalizer training for the FIR filter 56 as a target. First, the cancellation of the DC offset is controlled by the DC offset removal loop filter 118 in FIGS. 12A and 12B so that a product of the average of the discrimination errors (e) from the error detector 76 and the sum of the equalizer coefficients of the FIR filter is equal to "0". That is, a condition such that the square error Z which is given by the equations (64) is equal to "0" is given by the following equations.

$$\frac{1}{2} \cdot \frac{\partial}{\partial I_0} mse = \left\langle e(mT) \frac{\partial}{\partial I} y_\mu(mT) \right\rangle \quad (81)$$

$$= \left\langle e(mT) \right\rangle \sum_{N_{eq1}}^{N_{eq2}} f_{eq}(i)$$

Subsequently, the control such that the square error which is caused when the amplitude of the input signal to the A/D converter 54 is set to "0" by the AGC loop filter 124 in FIGS. 12A and 12B is made by controlling so that the average of the product of the output (y) of the FIR filter 56 and the discrimination errors (e) from the error detector 76 is equal to "0". This relation is given by the following equations.

$$\frac{1}{2} \cdot \frac{\partial}{\partial A} mse = \frac{1}{A}\left\langle e(mT)\left\{y_\mu(mT) - I_0 \sum_{N_{eq1}}^{N_{eq2}} f_{eq}(i)\right\}\right\rangle \quad (82)$$

$$= \frac{1}{A} \left\langle e(mT) y_\mu(mT) \right\rangle$$

(where, when $I_0=0$)

According to the invention as described above, the compensation due to the error detection in the preamble area at the head of the reproduction data is made by detecting the errors with respect to not only the phase but also the frequency and compensating them, so that the phase lead-in and the frequency lead-in are executed in a short time, the preamble area can be shortened, and the error range of the frequency which can be led in can be widened. Thus, the high density of the magnetic recording can be realized and the reliability in the recording and reproduction can be remarkably improved.

According to the detection of the phase offset of the invention, by obtaining the correlation by the addition average of a plurality of samples, when the phase offset is detected, influence by the noises can be suppressed. Since the discrimination result is unnecessary, the phase error is hard to occur.

According to the detection of the phase offset of the invention, since the phase error is calculated by the signal at the same timing as that of the interpolating filter which operates at the oversampled sampling rate, the accurate phase error can be fed back, thereby allowing the loop lead-in to be advanced.

According to the invention, the frequency offset is preliminarily detected in the preamble interval and the loop filter is initialized by this value, so that the loop can be led in in a state where the lead-in amount of the frequency offset is equal to "0". The steady-state phase error and the lead-in time can be improved. Further, the range where the frequency offset can be led in can be also widened.

Further, according to the invention, by inversely interpolating the discrimination error at the symbol rate into the sampling rate, the conventional LMS method can be applied to the training of the oversampling equalizer. The coefficients of the oversampling equalizer can be trained so that the square mean of the discrimination errors is equal to "0".

In the embodiment, the phase offset and the frequency offset are detected from the preamble area at the head of the sector data, the correcting state is initially set, and thereafter, while the data is read out from the buffer, the phase lead-in and the frequency lead-in in the preamble area are executed. However, it is also possible to construct the apparatus in a manner such that only the frequency offset is detected from the preamble area, the correcting state is initially set, and thereafter, while the data is read out from the buffer, the phase lead-in and the frequency lead-in in the preamble area are executed.

Although the above embodiment has been described with respect to an example of using the Viterbi decoder as a decoding of the data, the invention is not limited to such an example. An iterative type code which has been proposed as a new coding/decoding method in place of the Viterbi decoder, that is, a low density parity check coding method or a turbo coding/decoding method can be also used.

The invention incorporates many proper modifications without departing from the objects of the invention and losing the advantages thereof. Further, the invention is not limited by the numerical values shown in the foregoing embodiment.

Moreover, although the foregoing embodiment has been shown and described with respect to the example of the recording and reproduction of the magnetic disk, the invention can be also similarly applied to information recording and reproduction of other media such as MO, optical disk, magnetic tape, and the like.

What is claimed is:

1. An information recording and reproducing apparatus for recording and reproducing information onto/from a magnetic recording medium, comprising a timing recovery unit which detects a phase offset and a frequency offset from a head area of reproduction data and initially corrects them;

wherein said timing recovery unit comprises:
a buffer memory which stores discrete data obtained by sampling a head reproduction signal by a fixed clock;
a phase offset detector which detects a phase offset from a data head area in parallel with data writing into the buffer;
a frequency offset detector which detects a frequency offset from the data head area in parallel with the data writing into the buffer; and
a PLL which initially sets correcting states of the detected phase offset and frequency offset.

2. The information recording and reproducing apparatus according to claim 1, wherein said reproduction data is sector data constructed by a preamble, a sync mark, and user data, and said timing recovery unit detects a phase offset and a frequency offset from the preamble and initially corrects them.

3. The information recording and reproducing apparatus according to claim 1, wherein said buffer memory starts the reading operation from a head of the write data at a point when the writing of the reproduction data into the head area is finished.

4. The apparatus according to claim 1, wherein:
said PLL comprises:
a phase comparator which detects a phase difference between data before decoding and decoded data;
a loop filter which presets said detected frequency offset and phase offset, inputs a phase difference from said phase comparator, and outputs a correct sampling time; and
an FIR interpolating filter which corrects a discrete value sampled on the basis of a sampling time outputted by said loop filter into a discrete value synchronized with the original clock.

5. An information recording and reproducing apparatus for recording and reproducing information onto/from a magnetic recording medium, comprising a timing recovery unit which detects a frequency offset from a head area of reproduction data and initially corrects them;

wherein said timing recovery unit comprises:
a buffer memory which stores discrete data obtained by sampling a head reproduction signal by a fixed clock;
a frequency offset detector which detects a frequency offset from a data head area in parallel with data writing into the buffer; and
a PLL which initially sets correcting states of said frequency offset, and then, performs phase lead-in and frequency lead-in in the head area while reading out the data from said buffer memory.

6. A signal decoding circuit which records and reproduces information onto/from a magnetic recording medium, comprising:
a timing recovery unit which detects a phase offset and a frequency offset from a head area of reproduction data and initially corrects them;
wherein said timing recovery unit comprises:
a buffer memory which stores discrete data obtained by sampling a head reproduction signal by a fixed clock;
a phase offset detector which detects a phase offset from a data head area in parallel with data writing into the buffer;
a frequency offset detector which detects a frequency offset from the data head area in parallel with the data writing into the buffer; and
a PLL which initially sets correcting states of the detected phase offset and frequency offset.

7. The circuit according to claim 6, wherein said reproduction data is sector data constructed by a preamble, a sync mark, and user data, and said timing recovery unit detects a phase offset from the preamble and initially corrects them.

8. The circuit according to claim 6, wherein said buffer memory starts the reading operation from a head of the write data at a point when the writing of the reproduction data into the head area is finished.

9. The circuit according to claim 6, wherein:
said PLL comprises:
a phase comparator which detects a phase difference between data before decoding and decoded data;
a loop filter which presets said detected frequency offset and phase offset, inputs a phase difference from said phase comparator, and outputs a correct sampling time; and
an FIR interpolating filter which corrects a discrete value sampled on the basis of a sampling time outputted by said loop filter into a discrete value synchronized with the original clock.

10. A signal decoding circuit which records and reproduces information onto/from a magnetic recording medium, comprising a timing recovery unit which detects a frequency offset from a head area of reproduction data and initially corrects them;

wherein said timing recovery unit comprises:
a buffer memory which stores discrete data obtained by sampling a head reproduction signal by a fixed clock;
a frequency offset detector which detects a frequency offset from a data head area in parallel with data writing into the buffer; and
a PLL which initially sets correcting states of said frequency offset, and then, performs phase head-in and frequency lead-in in the head area while reading out the data from said buffer memory.

11. A method for recording and reproducing information onto/from a magnetic recording medium, comprising the steps of:
writing discrete data obtained by sampling a head reproduction signal by a fixed clock into a buffer memory;
detecting a phase offset from the data head area in parallel with data writing into said buffer memory;
detecting a frequency offset from the data head area in parallel with data writing into said buffer memory; and
performing phase lead-in and frequency lead-in in the head area while reading out the data from said buffer memory, after initially setting correcting states of said phase offset and frequency offset.

12. The method according to claim 11, wherein said reproduction data is sector data constructed by a preamble, a sync mark, and user data, and said timing recovery unit detects a phase offset and a frequency offset from the preamble and initially corrects them.

13. The method according to claim 11, wherein said buffer memory starts the reading operation from a head of the write data at a point when the writing of the reproduction data into the head area is finished.

14. The method for recording and reproducing information onto/from a magnetic recording medium, comprising the steps of:
writing discrete data obtained by sampling a head reproduction signal by a fixed clock into a buffer memory;

detecting a frequency offset from the data head area in parallel with data writing into said buffer memory; and performing phase lead-in and frequency lead-in in the head area while reading out the data from said buffer memory, after initially setting correcting states of said phase offset and frequency offset.

* * * * *